United States Patent
Ogata

(10) Patent No.: US 7,852,733 B2
(45) Date of Patent: Dec. 14, 2010

(54) APPARATUS FOR REPRODUCING SIGNAL FROM MULTI-LAYERED OPTICAL DISK USING MULTIPLE PHOTO DETECTORS

(75) Inventor: Tetsuya Ogata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 261 days.

(21) Appl. No.: 10/586,478

(22) PCT Filed: Feb. 9, 2005

(86) PCT No.: PCT/JP2005/002362

§ 371 (c)(1), (2), (4) Date: Jul. 18, 2006

(87) PCT Pub. No.: WO2005/078714

PCT Pub. Date: Aug. 25, 2005

(65) Prior Publication Data

US 2008/0239891 A1      Oct. 2, 2008

(30) Foreign Application Priority Data

Feb. 16, 2004   (JP)   .............................. 2004-037814

(51) Int. Cl.
*G11B 7/00* (2006.01)
(52) U.S. Cl. ................................. 369/112.01
(58) Field of Classification Search ............. 369/44.24, 369/44.37, 94, 112, 112.15, 44.41
See application file for complete search history.

(56) References Cited

U.S. PATENT DOCUMENTS

| | | | | |
|---|---|---|---|---|
| 4,631,397 A | * | 12/1986 | Ohsato et al. ............ | 250/201.4 |
| 5,161,139 A | * | 11/1992 | Inoue et al. .............. | 369/44.23 |
| 5,532,987 A | * | 7/1996 | Fujita et al. .............. | 369/44.24 |
| 5,923,632 A | * | 7/1999 | Kato et al. ............... | 369/112.07 |
| 6,377,520 B2 | * | 4/2002 | Freeman et al. .......... | 369/44.23 |
| 6,442,125 B1 | | 8/2002 | Maeda et al. | |
| 6,480,444 B2 | * | 11/2002 | Tada et al. ............... | 369/44.27 |
| 6,522,616 B1 | * | 2/2003 | Magnitski et al. ........... | 369/103 |
| 6,563,099 B2 | * | 5/2003 | Kimura et al. ........... | 250/201.5 |
| 7,065,009 B1 | * | 6/2006 | Hasegawa et al. ........ | 369/44.23 |
| 2002/0070328 A1 | | 6/2002 | Kimura et al. | |

(Continued)

FOREIGN PATENT DOCUMENTS

EP         1 220 210 A2         7/2002

(Continued)

*Primary Examiner*—Brian E Miller
*Assistant Examiner*—Mark L Fischer
(74) *Attorney, Agent, or Firm*—Dickstein Shapiro LLP

(57) ABSTRACT

An optical pickup apparatus for shining light on and detecting reflected light from an optical disk having two recording layers. The apparatus includes a light source, an optical system situated on a path of a light beam returning from the optical disk, the optical system including a light condensing optical unit, a light beam regulating unit, and one or more photo detectors, situated between a position where the light reflected by the first recording layer contained in the partial light beam is condensed and a position where the light reflected by the second recording layer contained in the partial light beam is condensed, the one or more photo detectors having a first photo detecting section to detect the light reflected by the first recording layer and a second photo detecting section to detect the light reflected by the second recording layer.

18 Claims, 40 Drawing Sheets

U.S. PATENT DOCUMENTS

| | | |
|---|---|---|
| 2003/0214898 A1 | 11/2003 | Ogata et al. |
| 2005/0094507 A1* | 5/2005 | Ogasawara .............. 369/44.26 |
| 2005/0122879 A1 | 6/2005 | Hirai et al. |

FOREIGN PATENT DOCUMENTS

| | | |
|---|---|---|
| JP | 62-192939 | 8/1987 |
| JP | 8-329513 A | 12/1996 |
| JP | 10-11786 | 1/1998 |
| JP | 11-242824 | 9/1999 |
| JP | 2001-273640 | 10/2001 |
| JP | 2002-298345 | 10/2002 |
| WO | WO 96/20473 | 7/1996 |

* cited by examiner

※K2<K1

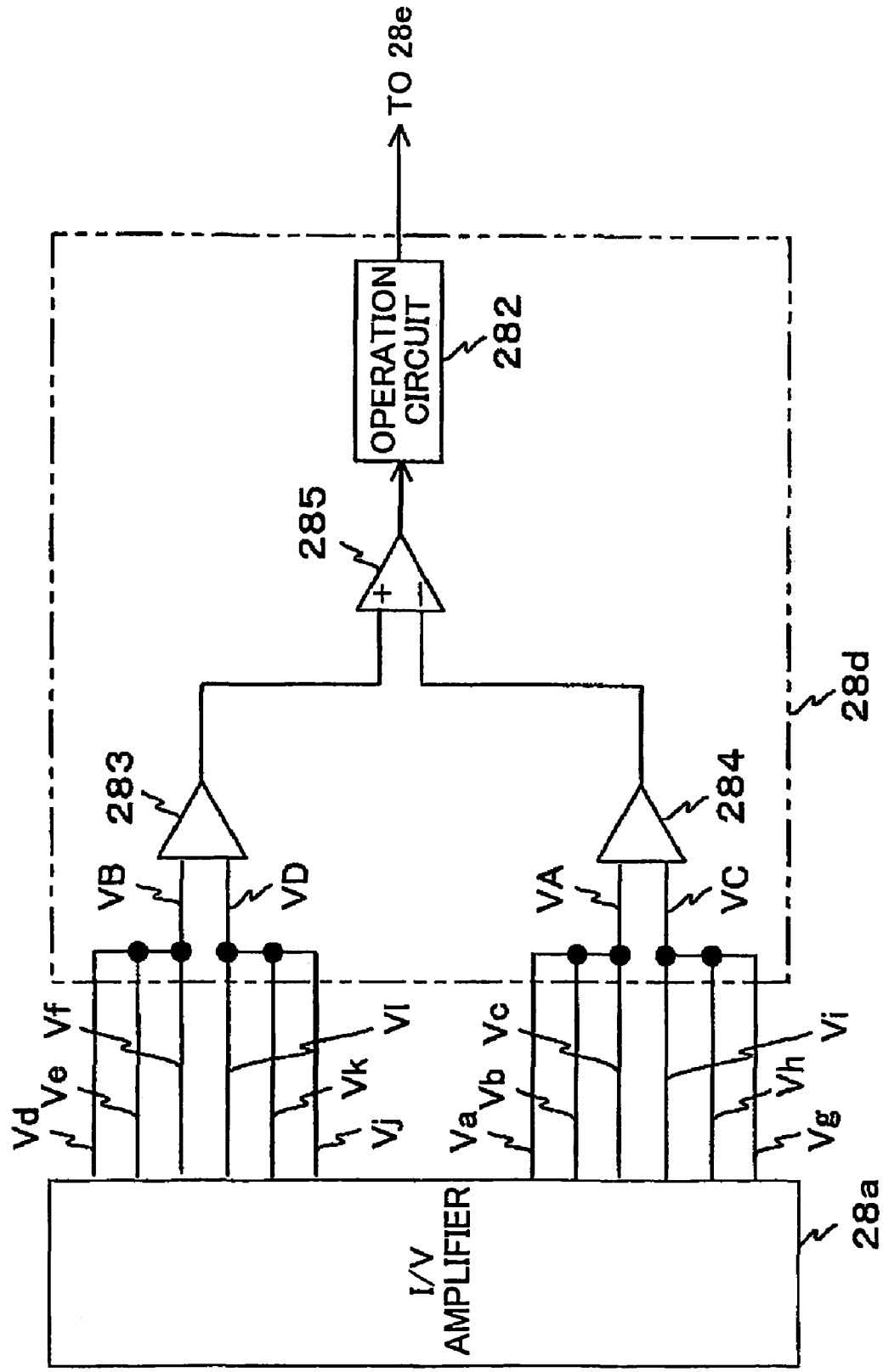

APPARATUS FOR REPRODUCING SIGNAL FROM MULTI-LAYERED OPTICAL DISK USING MULTIPLE PHOTO DETECTORS

TECHNICAL FIELD

The present invention generally relates to optical pickup apparatuses and optical disk apparatuses. The present invention particularly relates to an optical pickup apparatus which shines a light beam on an optical disk having two recording layers to receive reflected light from the optical disk, and also relates to an optical disc apparatus which performs at least reproduction of information from an optical disk having two recording layers among recording, reproducing, and erasing of information.

BACKGROUND ART

With the recent development of the digital technology and improvement of data compression technologies, optical disks such as DVDs (digital versatile disks) have been attracting attention as a record medium for recording information such as music, movies, photographs, computer software, etc. (hereinafter also referred to as "contents"). As the price of optical disks goes down, optical disc apparatuses that use the optical disks as information recording medium have spread in the market.

The size of information of contents tends to increase year by year, which leads to an expectation for a further increase in the recording capacity of optical disks. As a means to increase the recording capacity of an optical disk, the record layer may be made into a multi-layered structure. Extensive developments are underway with respect to the optical disks having a plurality of recording layers (hereinafter also referred to as multi-layered disks) and also with respect to the optical disc apparatuses for accessing such multi-layered disks.

In the multi-layered disks, a wide gap between the record layers may cause deterioration of a signal reproduced from a selected record layer due to the effect of spherical aberration. There is thus a trend toward the narrowing of gaps between the record layers. As the gaps between the record layers narrow, however, inter-layer crosstalk occurs, so that a light beam returning from the multi-layered disk ends up including not only reflected light (hereinafter referred to as signal light) coming from the selected recording layer but also a significant amount of reflected light (hereinafter referred to as aberrant light) coming from other recording layers different from the selected recording layer. The S/N ratio of the reproduced signal may thus deteriorate.

In consideration of this, devices have been developed for reducing inter-layer crosstalk at the time of reproduction from a multi-layered disk (e.g., Patent Document 1 through Patent Document 3).

The apparatuses disclosed in Patent Document 1 through Patent Document 3, however, allow signal light and aberrant light to interfere with each other prior to reaching the photo detecting surface of the photo detecting device. This causes fluctuation in the amount of received light with respect to individual photo detecting devices, which may result in a drop in the S/N ratio of the reproduced signal.

[Patent Document 1] Japanese Patent Application Publication No. 2001-273640

[Patent Document 2] Japanese Patent Application Publication No. 10-11786

[Patent Document 3] International Patent Application Publication No. WO96/20473

Accordingly, there is a need for an optical pickup apparatus that can separate reflected light components from each other with sufficient precision when the reflected light components come from two recording layers of an optical disk.

There is another need for an optical disc apparatus which can reproduce information with sufficient precision when the information is obtained from an optical disk having two recording layers.

DISCLOSURE OF INVENTION

It is a general object of the present invention to provide an optical pickup apparatus and an optical disc apparatus that substantially obviate one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by an optical pickup apparatus and an optical disc apparatus particularly pointed out in the specification in such full, clear, concise, and exact terms as to enable a person having ordinary skill in the art to practice the invention.

To achieve these and other advantages in accordance with the purpose of the invention, the invention provides an optical pickup apparatus for shining light on an optical disk having two recording layers and for detecting reflected light from the optical disk. The optical disc apparatus includes a light source, an optical system situated on a path of a light beam returning from the optical disk inclusive of light reflected by a first recording layer of the optical disk and light reflected by a second recording layer of the optical disk, the optical system including a light condensing optical unit to turn the returning light beam into a condensing light beam, and a light beam regulating unit to extract from the condensing light beam a partial light beam corresponding to part of a cross section of the condensing light beam, and one or more photo detectors, situated between a position where the light reflected by the first recording layer contained in the partial light beam is condensed and a position where the light reflected by the second recording layer contained in the partial light beam is condensed, the one or more photo detectors having a first photo detecting section to detect the light reflected by the first recording layer and a second photo detecting section to detect the light reflected by the second recording layer.

According to at least one of the embodiments, a light beam emitted from the light source is shone on the optical disk having two recording layers (first recording layer and second recording layer), and a returning light beam inclusive of light reflected by the first recording layer and light reflected by the second recording layer enters the light condensing unit. The light condensing unit turns the returning light into a condensing light beam. A partial light beam that is part of the condensing light beam is then detected by one or more photo detectors. The one or more photo detectors is situated between the condensing point of the light reflected by the first recording layer contained in the partial light beam and the condensing position of the light reflected by the second recording layer contained in the partial light beam, and have a first photo detecting section to detect the light reflected by the first recording layer and a second photo detecting section to detect the light reflected by the second recording layer. With this provision, the light reflected by the first recording layer and the light reflected by the second recording layer are obtained separately from each other without mutual interference. This achieves highly precise separation of reflected light beams traveling from the two recording layers of the optical disk.

According to another aspect of the present invention, the light beam regulating unit is a light splitting unit configured to split the condensing light beam into a plurality of light beams, the partial light beam corresponding to at least one of the plurality of light beams.

According to another aspect of the present invention, the plurality of light beams includes a first light beam and a second light beam, and the one or more photo detectors includes a first photo detector having a photo detecting section to detect the light reflected by the first recording layer contained in the first light beam and a photo detection section to detect the light reflected by the second recording layer contained in the first light beam, and a second photo detector having a photo detecting section to detect the light reflected by the first recording layer contained in the second light beam and a photo detection section to detect the light reflected by the second recording layer contained in the second light beam.

According to another aspect of the present invention, the light splitting unit is a light splitting prism.

According to another aspect of the present invention, the light splitting unit is a hologram having a first hologram area and a second hologram area, the first light beam being diffraction created by the first hologram area, and the second light beam being diffraction created by the second hologram area.

According to another aspect of the present invention, the first light beam and the second light beam are diffractions of different orders.

According to another aspect of the present invention, the first hologram area and the second hologram area have respective, different lens functions.

According to another aspect of the present invention, the first light beam and the second light beam are diffractions of an identical order.

According to another aspect of the present invention, the light source, the light splitting unit, and the one or more photo detectors are placed in a single housing and configured as a single package.

According to another aspect of the present invention, a drive unit is further provided, configured to drive the light condensing unit in a direction of an optical axis of the light condensing unit.

According to another aspect of the present invention, a drive unit is further provided, configured to drive the one or more photo detectors in a direction of an optical axis in respect of a photo detecting surface of the one or more photo detectors.

According to another aspect of the present invention, an opto-electrical device is further provided, having a refractive index changing in response to an applied voltage, the opto-electrical device situated on a path of the condensing light beam traveling from the light condensing unit.

According to another aspect of the present invention, an optical disc apparatus for reproducing information from an optical disk having two recording layers, includes the optical pickup apparatus as described above, a signal obtaining unit configured to obtain a signal from a selected one of the two recording layers of the optical disk in response to an output signal of the optical pickup apparatus, and a reproducing unit configured to reproduce the information based on the signal obtained by the signal obtaining unit.

This optical disc apparatus is provided with the optical pickup apparatus as described above, so that the signal obtaining unit can easily obtain the signal from the selected one of the two recording layers, resulting in the reproducing unit reproducing information recorded in the selected one of the two recording layers with sufficient precision. That is, the reproduction of information from an optical disk having two recording layers is successfully performed with satisfactory precision.

According to another aspect of the present invention, the signal obtaining unit is configured to select an output signal inclusive of only the signal from the selected one of the two recording layers among output signals of the optical pickup apparatus.

According to another aspect of the present invention, the signal obtaining unit is configured to subtract a signal component corresponding to another one of the two recording layers from the output signal of the optical pickup apparatus.

According to another aspect of the present invention, an optical disc apparatus for reproducing information from an optical disk having two recording layers includes the optical pickup apparatus having the drive unit as described above, a drive control unit configured to control the drive unit in response to a signal indicative of which one of the two recording layers is selected for reproduction, a signal selecting unit configured to select an output signal inclusive of only a signal from the selected one of the two recording layers among output signals of the optical pickup apparatus, and a reproducing unit configured to reproduce the information based on the signal obtained by the signal selecting unit.

The optical disc apparatus described above is provided with the optical pickup apparatus having the drive unit, and the drive control unit controls the drive unit according to which one of the two recording layers is selected for reproduction. This provides for the signal selecting unit to easily select an output signal including only the signal from the selected one of the two recording layers among the output signals of the optical pickup apparatus. As a result, the reproducing unit can reproduce information recorded in the selected one of the two recording layers with sufficient precision. That is, the reproduction of information from an optical disk having two recording layers is successfully performed with satisfactory precision.

According to another aspect of the present invention, an optical disc apparatus for reproducing information from an optical disk having two recording layers includes the optical pickup apparatus having the opto-electrical device, a switching unit configured to control the refractive index of the opto-electrical device in response to a signal indicative of which one of the two recording layers is selected for reproduction, a signal selecting unit configured to select an output signal inclusive of only a signal from the selected one of the two recording layers among output signals of the optical pickup apparatus, and a reproducing unit configured to reproduce the information based on the signal selected by the signal selecting unit.

The optical disc apparatus described above is provided with the optical pickup apparatus having the opto-electrical device, and the switching unit controls the refractive index of the opto-electrical device according to which one of the two recording layers is selected for reproduction. This provides for the signal selecting unit to select an output signal including only the signal from the selected one of the two recording layers among the output signals of the optical pickup apparatus. As a result, the reproducing unit can reproduce information recorded in the selected one of the two recording layers with sufficient precision. That is, the reproduction of

BRIEF DESCRIPTION OF DRAWINGS

FIG. 30 is a drawing showing a variation of the RF signal detecting circuit of FIG. 29.

BEST MODE FOR CARRYING OUT THE INVENTION

In the following, embodiments of the present invention will be described with reference to the accompanying drawings.

First Embodiment

Figure 1:
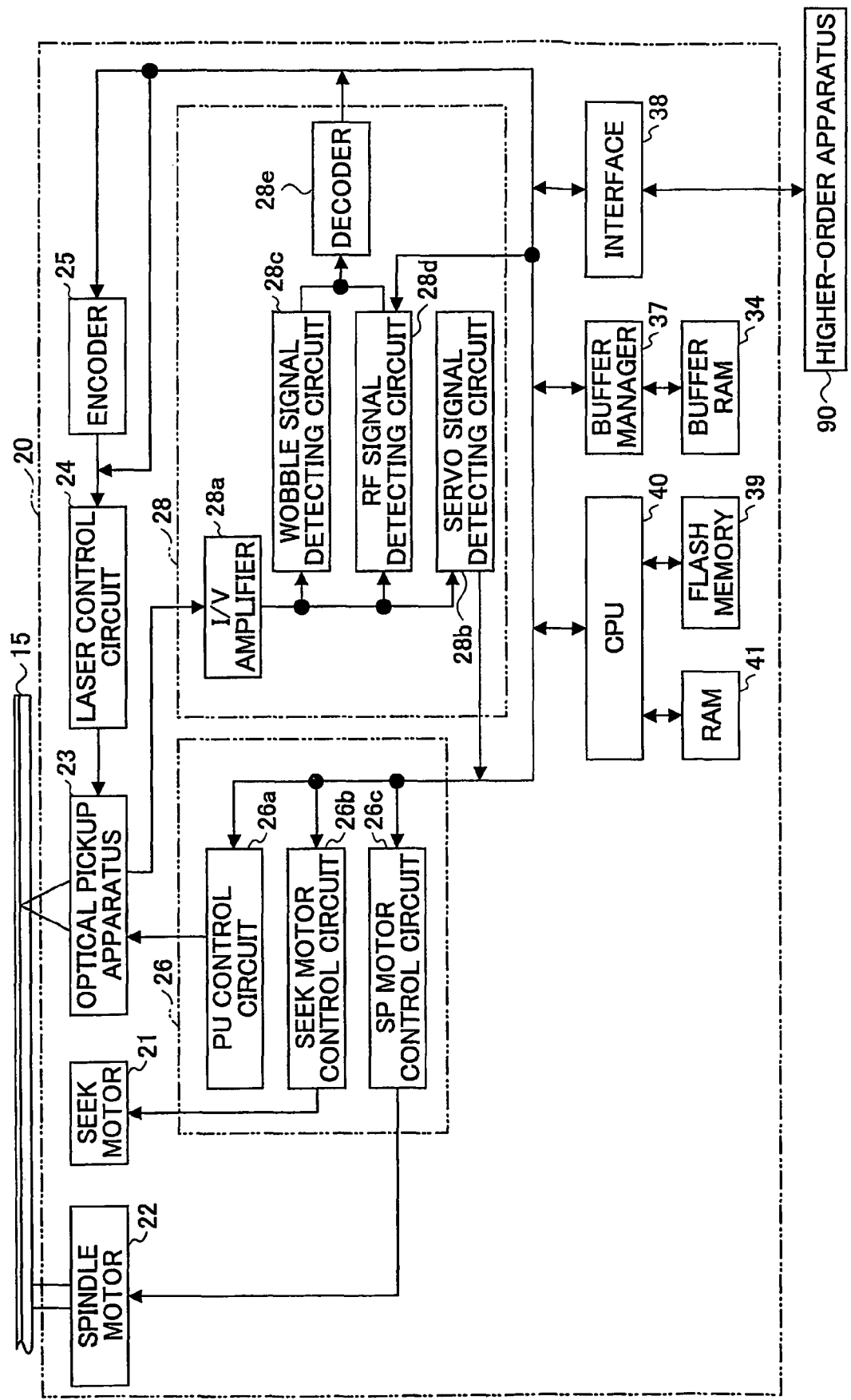
FIG. 1 is a drawing showing a schematic configuration of an optical disc apparatus according to a first embodiment.

A first embodiment of the present invention will be described with reference to FIG. 1 through FIG. 10. FIG. 1 is a drawing showing a schematic configuration of an optical disc apparatus 20 according to the first embodiment.

The optical disc apparatus 20 shown in FIG. 1 includes a spindle motor 22 for revolving an optical disk 15, an optical pickup apparatus 23, a seek motor 21 for driving the optical pickup apparatus 23 in the sledge direction, a laser control circuit 24, an encoder 25, a servo control circuit 26, a reproduced signal processing circuit 28, a buffer RAM 34, a buffer manager 37, an interface 38, a flash memory 39, a CPU 40, and a RAM 41. Arrows shown in FIG. 1 only illustrate the flows of main signals and information items, and are not intended to represent all the connections between the blocks.

According to the first embodiment, the optical disc apparatus 20 is designed to conform to an optical disk having two recording layers, for example. That is, the optical disk 15 is a dual-layered disk.

Figure 2:
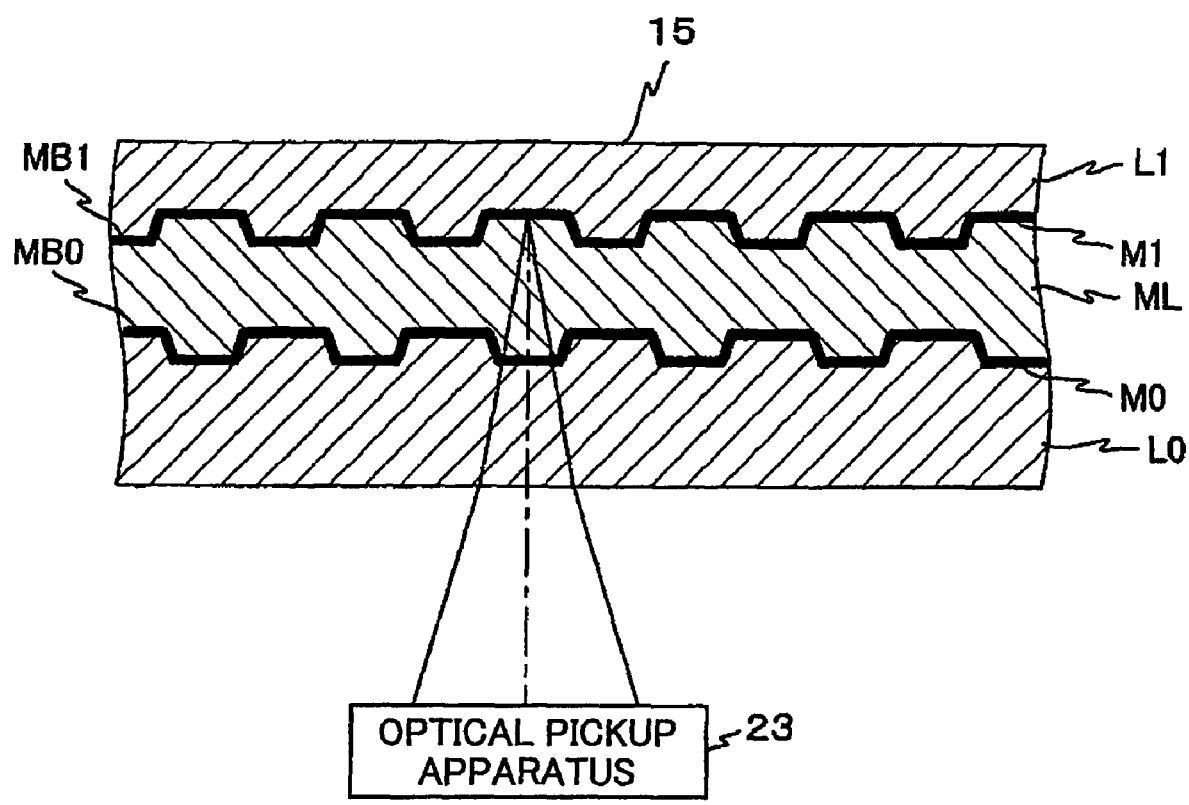
FIG. 2 is a drawing showing an example of the structure of an optical disk.

FIG. 2, is a drawing showing an example of the structure of the optical disk 15. As shown in FIG. 2, the optical disk 15 includes a substrate L0, a recording layer M0 (first recording layer), an intermediate layer ML, a recording layer M1 (second recording layer), and a substrate L1 in the named order from the side facing the optical pickup apparatus 23. In each recording layer, a track is formed in spiral form, and information is recorded along the track. A translucent film MB0 made of silicon, silver, aluminum, etc., is situated between the recording layer M0 and the intermediate layer ML. Further, a metal reflective film MB1 made of silver, aluminum, etc., is provided between the recording layer M1 and the substrate L1. As an example, the optical disk 15 is a dual-layered recordable disk, and is designed to be suitable for light having a wavelength of 660 nm like commercially available DVDs.

The optical pickup apparatus 23 focuses laser light on a recording layer (hereinafter referred to as "selected recording layer") selected among the two recording layers of the optical disk 15, and receives a light beam that is reflected light from the optical disk 15. FIG. 3A is a drawing showing an example of the construction of the optical pickup apparatus 23. As shown in FIG. 3A, the optical pickup apparatus 23 includes a light source unit 51, a coupling lens 52, a beam splitter 54, an objective lens 60, a condenser lens 58 serving as optical condenser device, a light blocking plate 59, a photo detector PD serving as an optical detector, a condenser lens actuator AC1 serving as a means to drive the condenser lens 58 in the direction of the optical axis, and an objective lens driving system (i.e., focusing actuator AC2 and tracking actuator (not shown)) for driving the objective lens 60.

The light source unit 51 is implemented by use of a semiconductor laser LD, which serves as a light source for emitting laser light having a wavelength of 660 nm. According to the first embodiment, the laser light emitted from the light source unit 51 has the maximum strength in the +X direction. On the +X side of the light source unit 51 is situated the coupling lens 52, which turns a light beam emitted from the light source unit 51 into parallel light.

The beam splitter 54 is situated on the +X side of the coupling lens 52. The beam splitter 54 lets the light beam from the coupling lens 52 pass through, and splits the light beam (returning light beam) reflected by the optical disk 15 to direct it in the −Z direction. On the +X side of the beam splitter 54 is situated the objective lens 60, which condenses the light beam passing through the beam splitter 54 onto the selected recording layer.

The condenser lens 58 is provided on the −Z side of the beam splitter 54, and turns the returning light beam directed in the −Z direction by the beam splitter 54 into a condensing light beam.

The light blocking plate 59 blocks the condensing light beam from the condenser lens 58 on the +X side of the optical axis of the condenser lens 58. The condensing light beam on the −X side of the optical axis of the condenser lens 58 travels as a detection-purpose light beam (portion of the condensing light beam) toward the photo detecting surface of the photo detector PD.

Figure 3B:
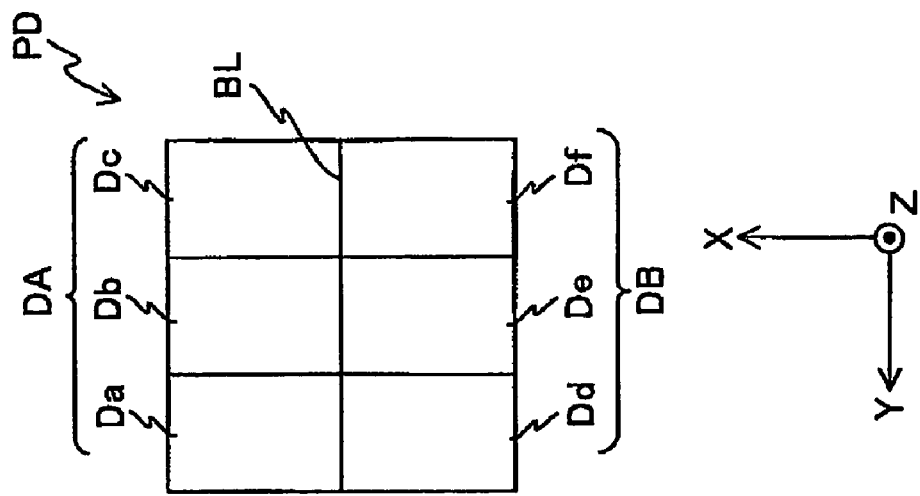
FIG. 3B is a drawing showing an example of the photo detecting surface of a photo detector.
Figure 3A:
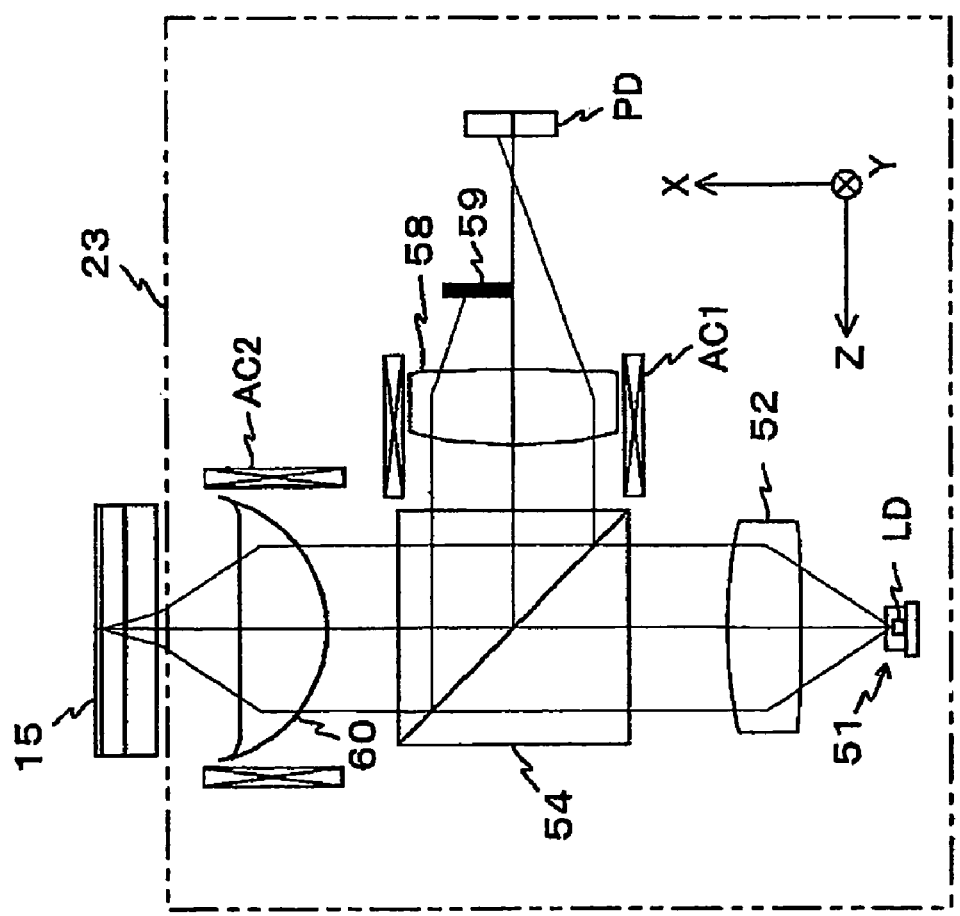
FIG. 3A is a drawing showing an example of the construction of an optical pickup apparatus.

FIG. 3B is a drawing showing an example of the photo detecting surface of the photo detector PD. As shown in FIG. 3B, the photo detecting surface of the photo detector PD is divided into a photo detecting area DA and a photo detecting area DB by a dividing line BL extending in the direction corresponding to the direction (i.e., tracking direction) perpendicular to the tangent of the track. The photo detecting area DA is further divided into three photo detecting sub-areas Da, Db, and Dc by two dividing lines perpendicular to the dividing line BL. By the same token, the photo detecting area DB is further divided into three photo detecting sub-areas Dd, De, and Df by two dividing lines perpendicular to the dividing line BL. Each photo detecting sub-area generates an optoelectronic conversion signal responsive to the amount of received light. The generated optoelectronic conversion signals are supplied to the reproduced signal processing circuit 28.

The focusing actuator AC2 serves to drive by fine pitches the objective lens 60 in the focusing direction that corresponds to the optical axis of the objective lens 60. The tracking actuator (not shown) serves to drive the objective lens 60 by fine pitches in the tracking direction.

With reference to FIG. 1 again, the reproduced signal processing circuit 28 includes an I/V amplifier 28a, a servo signal detecting circuit 28b, a wobble signal detecting circuit 28c, a RF signal detecting circuit 28d, and a decoder 28e.

The I/V amplifier 28a converts the optoelectronic conversion signals from the photo detector PD into voltage signals, and amplifies these signals with a predetermined gain. In this example, the output signal of the I/V amplifier 28a corresponding to the optoelectronic conversion signal from the photo detecting sub-area Da is denoted as Va, the output signal of the I/V amplifier 28a corresponding to the optoelectronic conversion signal from the photo detecting sub-area Db denoted as Vb, and the output signal of the I/V amplifier 28a corresponding to the optoelectronic conversion signal from the photo detecting sub-area Dc denoted as Vc. Further, the output signal of the I/V amplifier 28a corresponding to the optoelectronic conversion signal from the photo detecting sub-area Dd is denoted as Vd, the output signal of the I/V amplifier 28a corresponding to the optoelectronic conversion signal from the photo detecting sub-area De denoted as Ve, and the output signal of the I/V amplifier 28a corresponding to the optoelectronic conversion signal from the photo detecting sub-area Df denoted as Vf.

As shown in equation (1) shown below, the signal (denoted as VA) made by adding up the signals Va, Vb, and Vc is the output signal of the I/V amplifier 28a corresponding to the photo detecting area DA. As shown in equation (2) shown below, the signal (denoted as VB) made by adding up the signals Vd, Ve, and Vf is the output signal of the I/V amplifier 28a corresponding to the photo detecting area DB.

$$VA = Va + Vb + Vc \tag{1}$$

$$VB = Vd + Ve + Vf \tag{2}$$

The servo signal detecting circuit 28b detects servo signals such as a focus error signal and a track error signal based on the output signals of the I/V amplifier 28a. The servo signals detected in this manner are supplied to the servo control circuit.

The wobble signal detecting circuit 28c detects a wobble signal based on the output signals of the I/V amplifier 28a. The RF signal detecting circuit 28d detects a RF signal based on the output signals of the I/V amplifier 28a. The decoder 28e extracts address information and synchronizing signals from the wobble signal. The extracted address information is supplied to the CPU 40, and the extracted synchronizing signals are supplied to the encoder 25. Further, the decoder 28e performs a decoding process and error detection process with respect to the RF signal. Upon finding error, the decoder 28e performs an error correction process, and stores reproduced data in the buffer RAM 34 via the buffer manager 37.

The servo control circuit 26 includes a PU control circuit 26a, a seek motor control circuit 26b, and an SP motor control circuit 26c.

Figure 4:
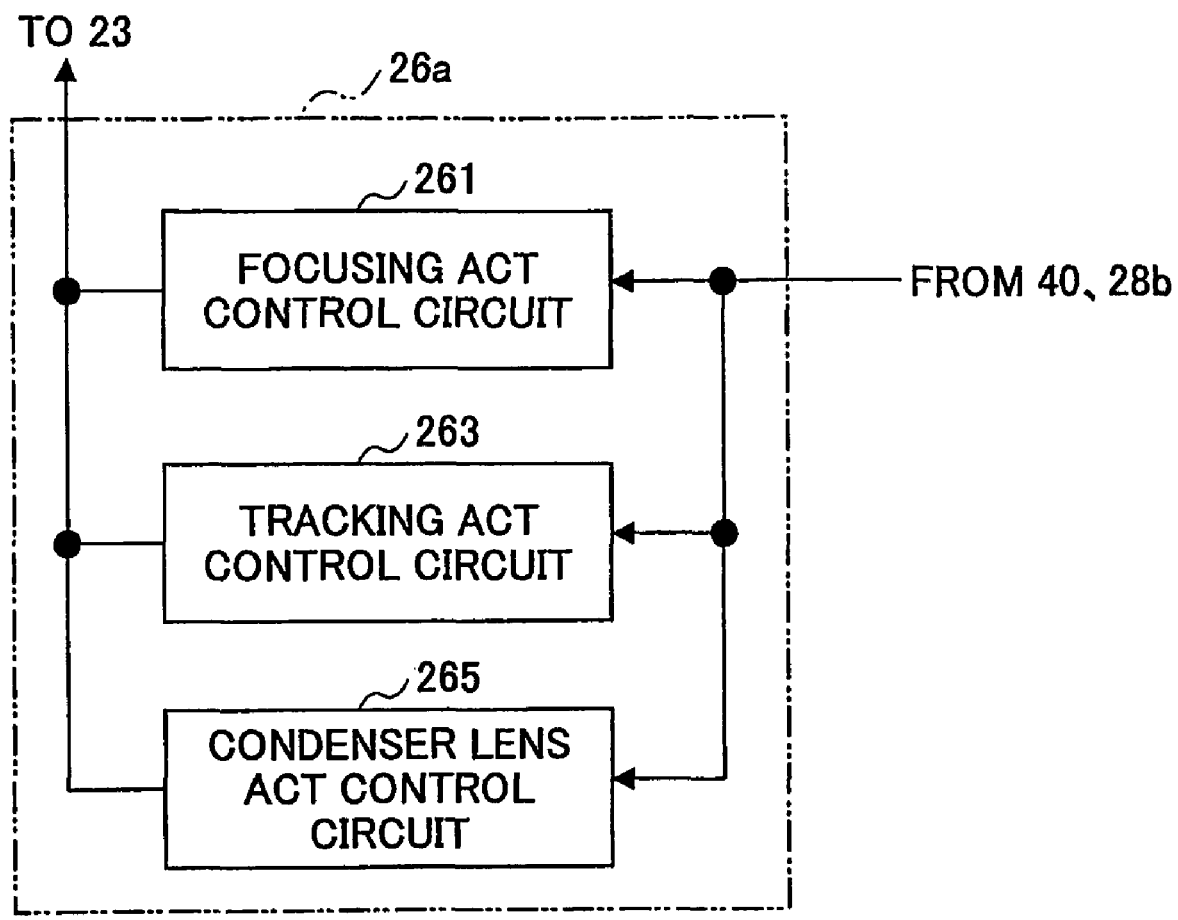
FIG. 4 is a drawing showing an example of the construction of a PU control circuit.

FIG. 4 is a drawing showing an example of the construction of the PU control circuit 26a. As shown in FIG. 4, the PU control circuit 26a includes a focusing ACT control circuit 261 for generating a signal (hereinafter referred to as a first driving signal for sake of convenience) driving the focusing actuator AC2, a tracking ACT control circuit 263 for generating a signal (hereinafter referred to as a second driving signal for sake of convenience) driving the tracking actuator (not shown), and a condenser lens ACT control circuit 265 for generating a signal (hereinafter referred to as a third driving signal for sake of convenience) driving the condenser lens actuator AC1.

The focusing ACT control circuit 261 generates the first driving signal based on the recording layer signal indicative of the selected recording layer supplied from the CPU 40 such that the position of the objective lens 60 in the focusing direction is set to either the position corresponding to the recording layer M0 (hereinafter referred to as a first lens position) or the position corresponding to the recording layer M1 (hereinafter referred to as a second lens position). This serves to condense the light beam passing through the beam splitter 54 on the selected recording layer. It should be noted that when the objective lens 60 is situated at the second lens position, the gap between the objective lens 60 and the optical disk 15 is narrower than when it is situated at the first lens position (see FIG. 5A and FIG. 5B).

The focusing ACT control circuit 261 adjusts the first driving signal in response to the focus error signal such that focus error is corrected. This achieves focus control.

The tracking ACT control circuit 263 generates the second driving signal based on the track error signal such that track error is corrected. This achieves tracking control.

The condenser lens ACT control circuit 265 generates the third driving signal based on the recording layer signal from the CPU 40 such that the position of the condenser lens 58 in the direction of the optical axis of the condenser lens 58 is set to either the position corresponding to the recording layer M0 (hereinafter referred to as a first corresponding position) or the position corresponding to the recording layer M1 (hereinafter referred to as a second corresponding position). A further description will later be given of the first corresponding position and the second corresponding position.

With reference to FIG. 1, the seek motor control circuit 26b generates a signal for driving the seek motor 21 in response to instruction from the CPU 40. The driving signal generated in this manner is supplied to the seek motor 21.

The SP motor control circuit 26c generates a signal for driving the spindle motor 22 in response to instruction from the CPU 40. The driving signal generated in this manner is supplied to the spindle motor 22. The SP motor control circuit 26c further adjusts the signal for driving the spindle motor 22 such that the linear velocity (or angular velocity) of the spindle motor 22 is maintained at specified speed during reproduction or recording operation.

The buffer RAM 34 temporarily stores data (record data) to be recorded on the optical disk 15, data (reproduced data) reproduced from the optical disk 15, etc. The input/output of data into/from the buffer RAM 34 is managed by the buffer manager 37.

The encoder 25 retrieves the record data stored in the buffer RAM 34 via the buffer manager 37 in response to instruction from the CPU 40. The encoder 25 modulates the data, adds error correction codes, etc., thereby generating a write signal to be supplied to the optical disk 15. The write signal generated in this manner is supplied to the laser control circuit 24.

The laser control circuit 24 controls the power of laser light emitted from the semiconductor laser LD. At the time of recording, for example, the laser control circuit 24 generates a signal for driving the semiconductor laser LD based on the conditions for recording the write signal, the characteristics of light emission of the semiconductor laser LD, etc.

The interface 38 is a two-way communication interface to communicate with a higher-order apparatus 90 (e.g., personal computer), and complies with interface standards such as ATAPI (AT Attachment Packet Interface) and SCSI (Small Computer System Interface). At the time of reproduction, the reproduced data stored in the buffer RAM 34 is supplied on a sector-by-sector basis to the higher-order apparatus 90 via the interface 38. At the time of recording, the record data is supplied from the higher-order apparatus 90 via the interface 38 for storage in the buffer RAM 34 via the buffer manager 37.

The flash memory 39 is structured to include a program area and a data area. The program area of the flash memory 39 stores programs written in such a code as to be decodable by the CPU 40. The data area of the flash memory 39 stores the recoding conditions, the characteristics of light emission of the semiconductor laser LD, etc.

The CPU 40 controls the operations of the individual parts as described above according to the programs stored in the program area of the flash memory 39. The CPU 40 also stores data necessary for control or the like in the RAM 41 and the buffer RAM 34.

In the following, a description will be given of the light beam returning from the optical disk 15.

Figure 5A:
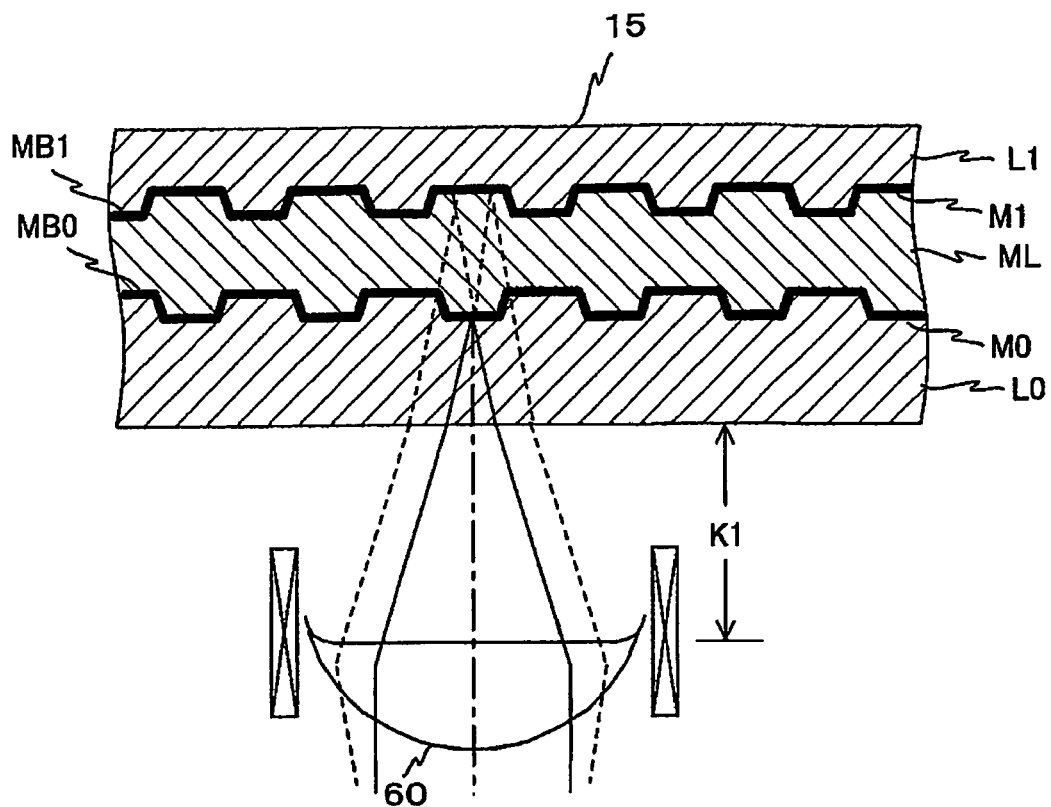
FIGS. 5A and 5B are illustrative drawings for explaining signal light and aberrant light, respectively.

When the selected recording layer is the recording layer M0, the objective lens 60 is positioned at the first lens position as shown in FIG. 5A serving as a non-limiting example. With this positioning, the light beam emitted from the semiconductor laser LD is condensed on the recording layer M0 by the objective lens 60. The light beam reflected by the translucent film MB0 enters the objective lens 60 as signal light. A light beam passing through the translucent film MB0 is reflected by the metal reflective film MB1 to enter the objective lens 60 as aberrant light.

Figure 5B:
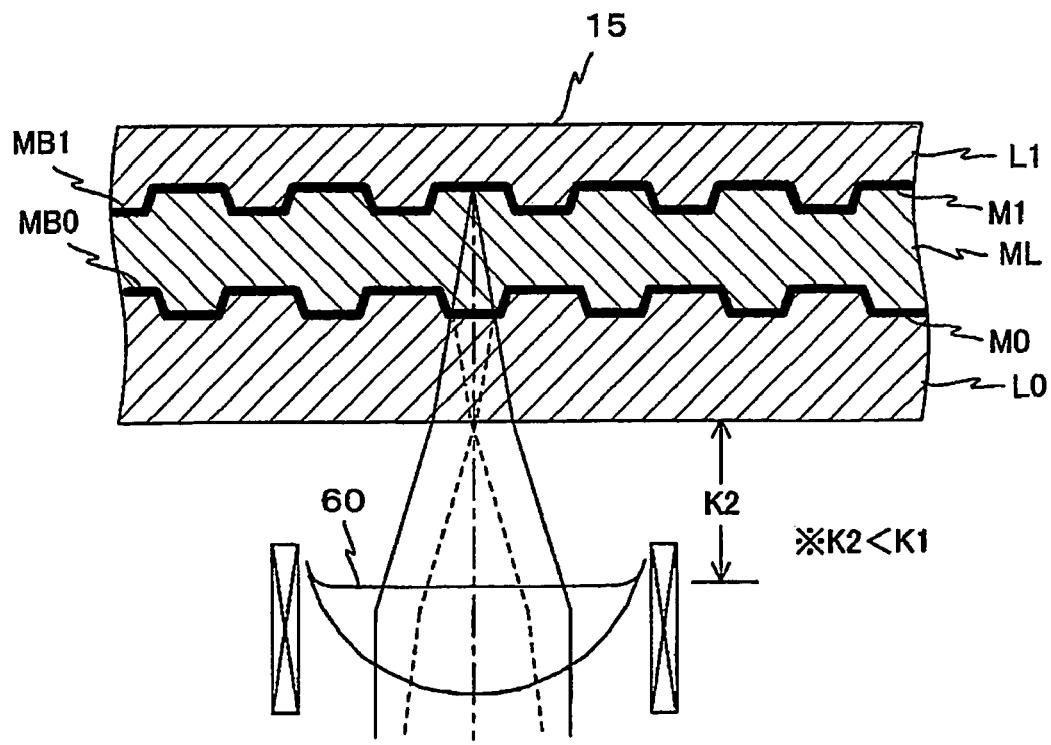

When the selected recording layer is the recording layer M1, the objective lens 60 is positioned at the second lens position as shown in FIG. 5B serving as a non-limiting example. With this positioning, the light beam emitted from the semiconductor laser LD is condensed on the recording layer M1 by the objective lens 60. The light beam reflected by the metal reflective film MB1 enters the objective lens 60 as signal light. A light beam reflected by the translucent film MB0 enters the objective lens 60 as aberrant light.

Namely, the returning light beam always includes a light beam (hereinafter also referred to as a first reflected light beam) reflected by the translucent film MB0 and a light beam (hereinafter also referred to as a second reflected light beam) reflected by the metal reflective film MB1, regardless of which one of the recording layers is the selected recording layer. When the selected recording layer is the recording layer M0, the first reflected light beam is the signal light, and the second reflected light beam is the aberrant light. When the selected recording layer is the recording layer M1, on the other hand, the second reflected light beam is the signal light, and the first reflected light beam is the aberrant light. Accordingly, the detection-purpose light beam also includes a signal light component and an aberrant light component. The aberrant light component causes a drop in the S/N ratio when the reproduced signal processing circuit 28 detects various signals, so that the signal light component included in the detection-purpose light beam needs to be separated from the aberrant light component.

The translucent film MB0 and the metal reflective film MB1 are spaced apart in the focusing direction. It follows that the point (F1) at which the first reflected light beam condenses does not coincide with the point (F2) at which the second reflected light beam condenses. That is, these points will be spaced apart from each other in the direction of the optical axis of the condenser lens 58. Between the light condensing point (F1) and the light condensing point (F2), the detection-purpose light beam includes only the second reflected light beam on the +X side of the optical axis of the condenser lens 58 and only the first reflected light beam on the −X side.

In consideration of this, the photo detector PD is arranged between the light condensing point F1 and the light condensing point F2 at such a position (hereinafter also referred to as separating photo detecting position) that the photo detecting area DA covers the +X side of the optical axis of the condenser lens 58, and the photo detecting area DB covers the −X side. This makes it possible to detect the first reflected light beam and the second reflected light beam separately from each other.

Figure 6A:
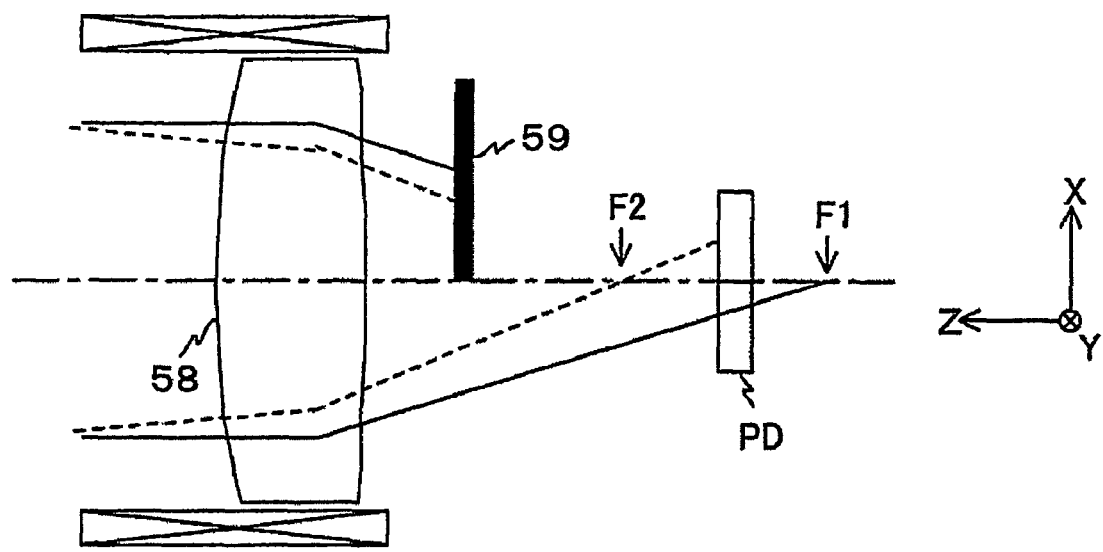
FIGS. 6A through 6C are illustrative drawings for explaining the relationship between the position of a photo detector and the condensing points of signal light and aberrant light, the signal light and aberrant light detected by each photo detecting area, and signals output from the respective photo detecting areas, respectively, when the selected recording layer is a recording layer M0.
Figure 7A:
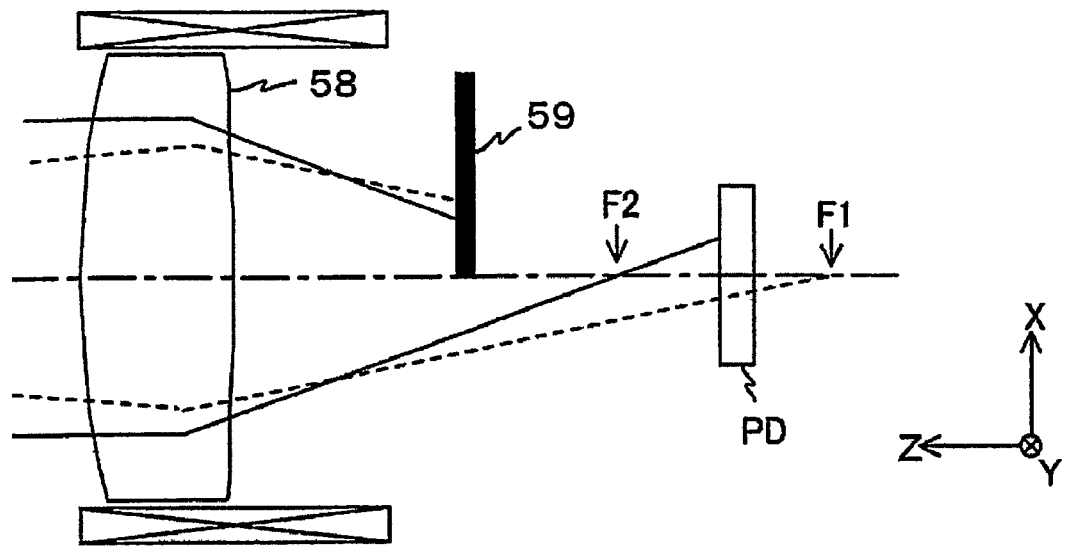
FIGS. 7A through 7C are illustrative drawings for explaining the relationship between the position of a photo detector and the condensing points of signal light and aberrant light, the signal light and aberrant light detected by each photo detecting area, and signals output from the respective photo detecting areas, respectively, when the selected recording layer is a recording layer M1.

As shown in FIGS. 5A and 5B, however, the distance between the objective lens 60 and the optical disk 15 differs between when the selected recording layer is the recording layer M0 and when the selected recording layer is the recording layer M1. Because of this, the light condensing point F1 and the light condensing point F2 vary, depending on whether the selective recording layer is the recording layer M0 or the recording layer M1. In order to place the photo detector PD at the separating photo detecting position regardless of which one of the recording layers is the selected recording layer, the condenser lens ACT control circuit 265 controls the position of the condenser lens 58. As shown in FIG. 6A serving as a non-limiting example, the condenser lens 58 is positioned at the first corresponding position such that the photo detector PD is positioned at the separating photo detecting position when the selected recording layer is the recording layer M0. As shown in FIG. 7A serving as a non-limiting example, the condenser lens 58 is positioned at the second corresponding position such that the photo detector PD is positioned at the separating photo detecting position when the selected recording layer is the recording layer M1.

Figure 6B:
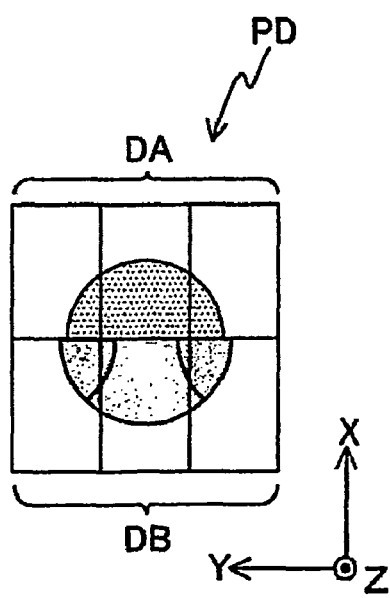
Figure 6C:
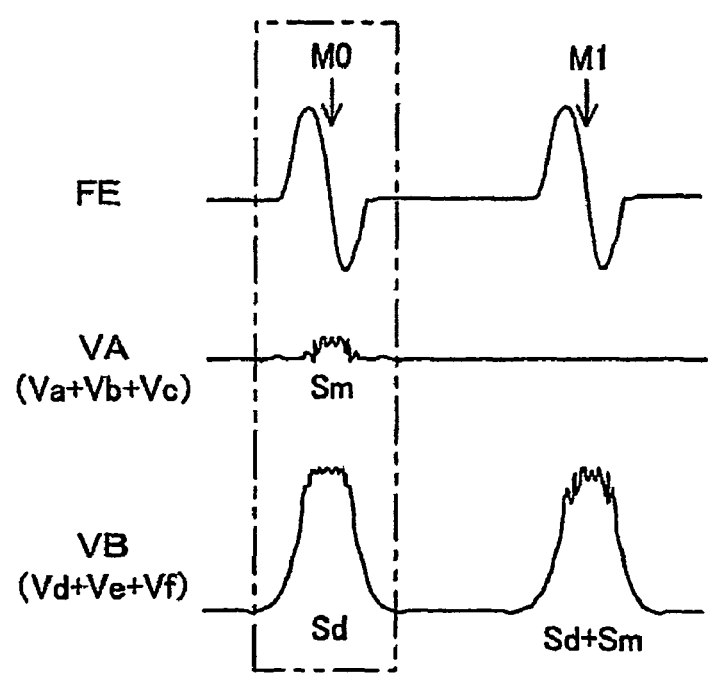

Accordingly, when the selected recording layer is the recording layer M0, the photo detecting area DA of the photo detector PD detects the aberrant light component, and the photo detecting area DB detects the signal light component, as shown in FIG. 6B serving as a non-limiting example. Namely, the signal VA is a signal Sm that is almost entirely comprised of the aberrant light component with almost no signal light component, and signal VB is a signal Sd that is almost entirely comprised of the signal light component with almost no aberrant light component (see FIG. 6C). In FIG. 6C, FE represents the focus error signal.

Figure 7B:
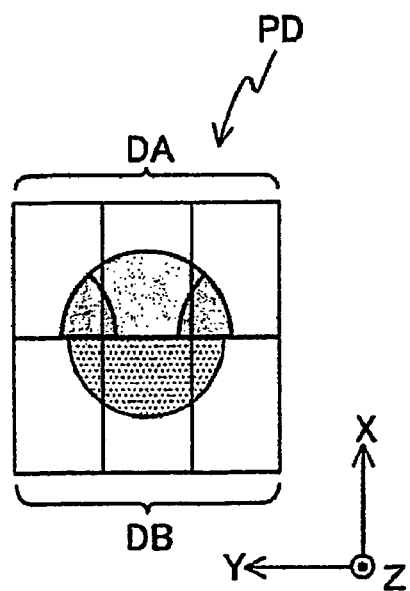
Figure 7C:
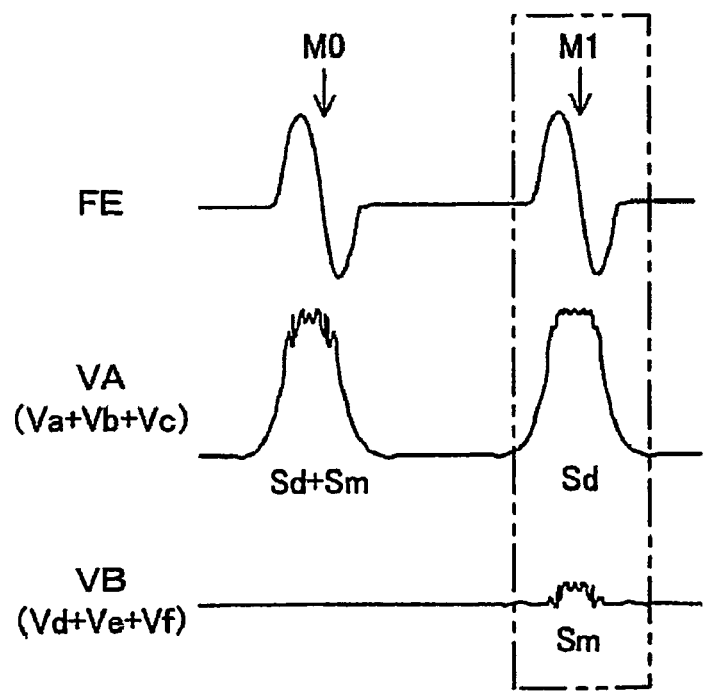

On the other hand, when the selected recording layer is the recording layer M1, the photo detecting area DA of the photo detector PD detects the signal light component, and the photo detecting area DB detects the aberrant light component, as shown in FIG. 7B serving as a non-limiting example. Namely, the signal VA is the signal Sd that is almost entirely comprised of the signal light component with almost no aberrant light component, and the signal VB is the signal Sm that is almost entirely comprised of the aberrant light component with almost no signal light component (see FIG. 7C).

Figure 8:
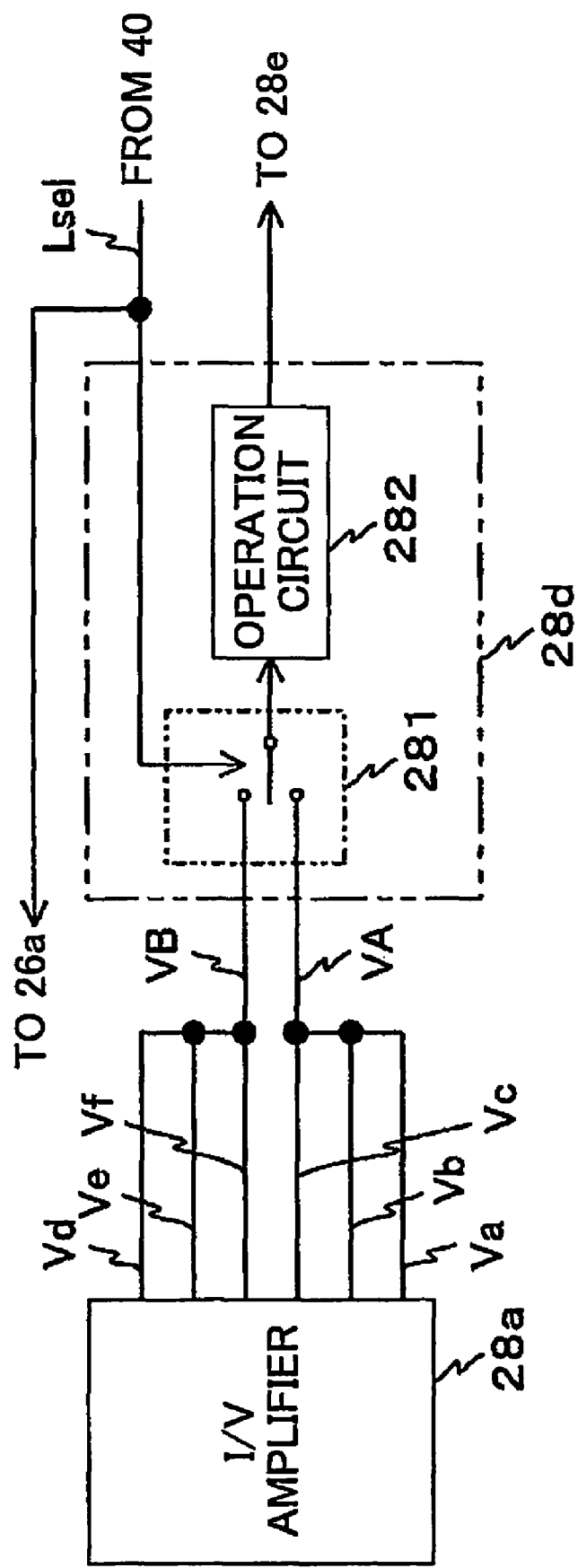
FIG. 8 is a drawing showing an example of the construction of a RF signal detecting circuit.

FIG. 8 is a drawing showing an example of the construction of the RF signal detecting circuit 28d. As shown in FIG. 8, the RF signal detecting circuit 28d includes a changeover switch 281 that selects either the signal VB or the signal VA in response to the recording layer signal Lsel supplied from the CPU 40, and also includes an operation circuit 282 that obtains an RF signal based on the output signal of the changeover switch 281. The changeover switch 281 selects the signal VB when the selected recording layer is the recording layer M0, and selects the signal VA when the selected recording layer is the recording layer M1. With this provision, it is possible to obtain the RF signal with sufficient precision.

The servo signal detecting circuit 28b detects the track error signal based on a differential between the signal Vd and signal Vf of the I/V amplifier 28a when the selected recording layer is the recording layer M0. The servo signal detecting circuit 28b detects the track error signal based on a differential between the signal Va and signal Vc of the I/V amplifier 28a when the selected recording layer is the recording layer M1.

The servo signal detecting circuit 28b detects the focus error signal FE by extracting lower-frequency components of the signal VB when the selected recording layer is the recording layer M0. The servo signal detecting circuit 28b detects the focus error signal FE by extracting lower-frequency components of the signal VA when the selected recording layer is the recording layer M1.

Figure 9A:
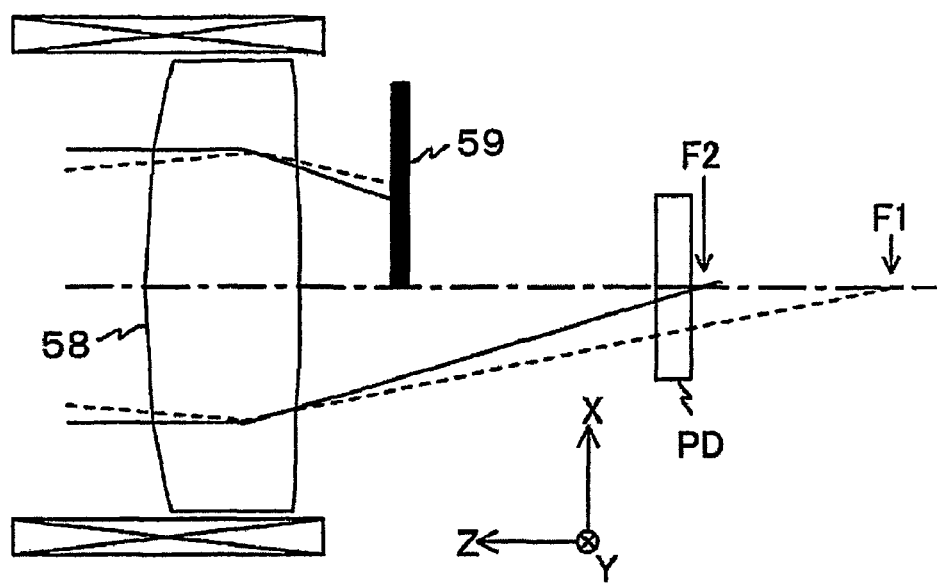
FIGS. 9A through 9C are illustrative drawings for explaining the relationship between the position a photo detector and the condensing points of signal light and aberrant light, the signal light and aberrant light detected by each photo detecting area, and signals output from the respective photo detecting areas, respectively, when the position of a condenser lens is not controlled in response to a change of the selected recording layer from the recording layer M0 to the recording layer M1.
Figure 9B:
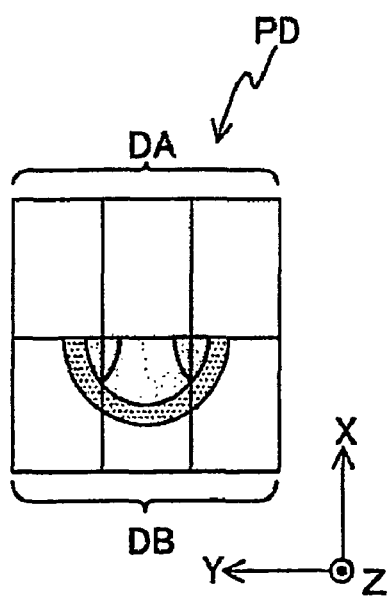
Figure 9C:
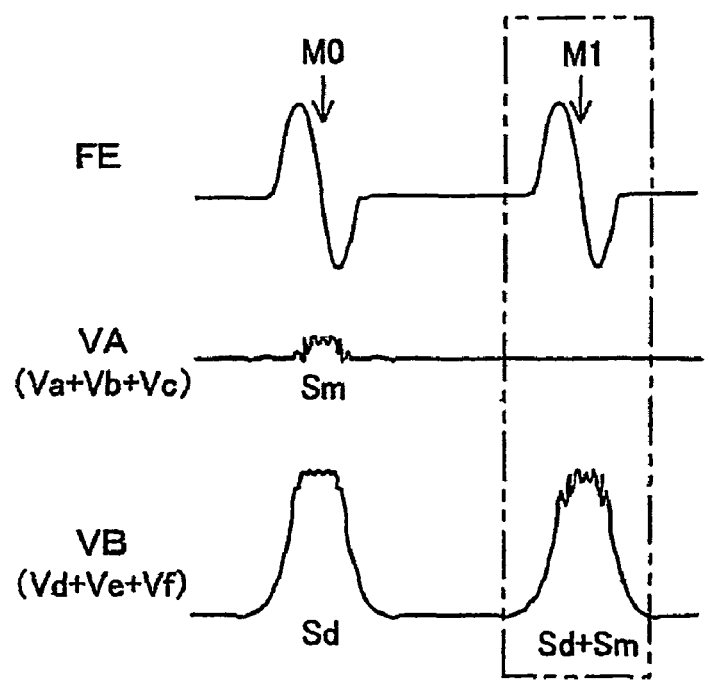

If the position of the condenser lens 58 is not changed when the selected recording layer is changed from the recording layer M0 to the recording layer M1, F1 and F2 end up being positioned behind the photo detector PD (on the −Z side thereof) as shown in FIG. 9A serving as a non-limiting example. In this case, as shown in FIG. 9B serving as a non-limiting example, the photo detecting area DB detects the signal light component mixed with the aberrant light component. The aberrant light component and signal light component cannot be separated from each other (see FIG. 9C).

As can be understood from the above description, the optical disc apparatus 20 according to the first embodiment uses the RF signal detecting circuit 28d as a signal selecting means and the decoder 28e as a reproducing means. Further, the condenser lens ACT control circuit 265 serves as a drive controlling means.

According to the optical pickup apparatus 23 of the first embodiment as described above, a light beam emitted from the semiconductor laser LD (light source) condenses on the selected recording layer of the optical disk 15 having two recording layers, and a returning light beam inclusive of the light reflected by the recording layer M0 (first recording layer) and the light reflected by the recording layer M1 (second recording layer) is turned into a condensing light beam by the condenser lens 58 (optical condenser device). The light blocking plate 59 blocks approximately half the condensing light beam, and the remaining half of the condensing light beam passes by the light blocking plate 59. The condensing light beam (part of the condensing light beam) passing by the light blocking plate 59 includes the light reflected by the recording layer M0 condensing at F1 and the light reflected by the recording layer M1 condensing at F2. The photo detector PD (optical detector) is positioned between F1 and F2, such that the photo detecting area DB detects the light reflected by the recording layer M0, and the photo detecting area DA detects the light reflected by the recording layer M1. As a result, the light reflected by the recording layer M0 and the light reflected by the recording layer M1 can be separated from each other without mutual interference. This makes it possible to separate the reflected light components from the two recording layers of an optical disk with sufficient precision.

Further, the condenser lens actuator AC1 for driving the condenser lens 58 is provided. This provides for the photo detector PD to be positioned between F1 and F2 regardless of which one of the recording layers is selected.

According to the optical disc apparatus of the first embodiment, the RF signal detecting circuit 28d selects a signal corresponding to the selected recording layer among the output signals of the optical pickup apparatus 23 so as to detect the RF signal. Since the optical pickup apparatus 23 outputs an optoelectronic conversion signal corresponding to the reflected light from the selected one of the two recording layers with sufficient precision, an S/N ratio can be improved with respect to the RF signal detected by the RF signal detecting circuit 28d. As a result, the decoder 28e can reproduce information recorded in the selected recording layer with sufficient precision. Namely, the reproduction of information from an optical disk having two recording layers can be achieved with satisfactory precision.

Figure 10:
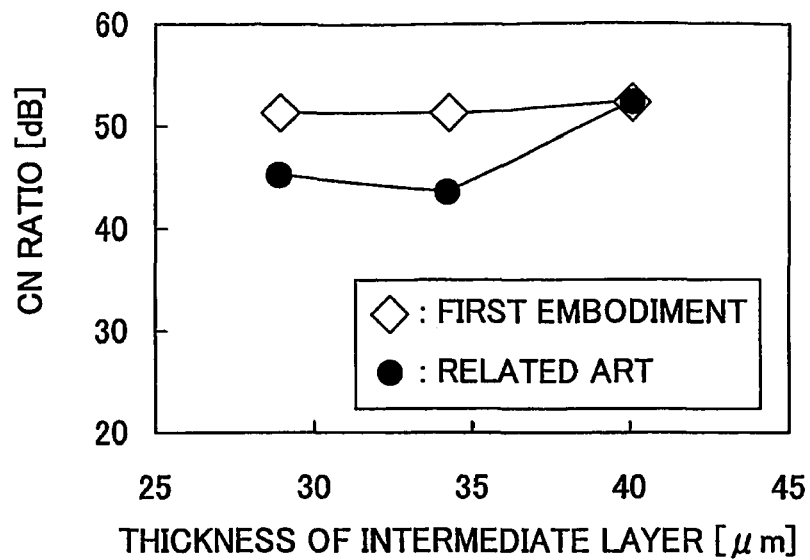
FIG. 10 is a diagram for explaining the relationships between a CN ratio of a RF signal and the thickness of an intermediate layer.

As shown in FIG. 10 serving as a non-limiting example, a drop in the CN ratio (i.e., carrier-noise ratio) in the reproduced signal can be reduced compared with the related-art configuration even if the thickness of the intermediate layer ML decreases. FIG. 10 is a drawing showing the measurements of a CN ratio in the reproduced signal that is obtained by reproducing 5 T continuous marks.

With the provision of the condenser lens ACT control circuit 265, the position of the condenser lens 58 is controlled such that the photo detector PD is situated between F1 and F2 regardless which one of the recording layers is selected. No matter which recording layer is selected, therefore, information recorded in the selected recording layer is reproduced with sufficient precision.

Second Embodiment

In the following, a description will be given of a second embodiment of the present invention with reference to FIG. 1 through FIG. 14C.

Figure 11:
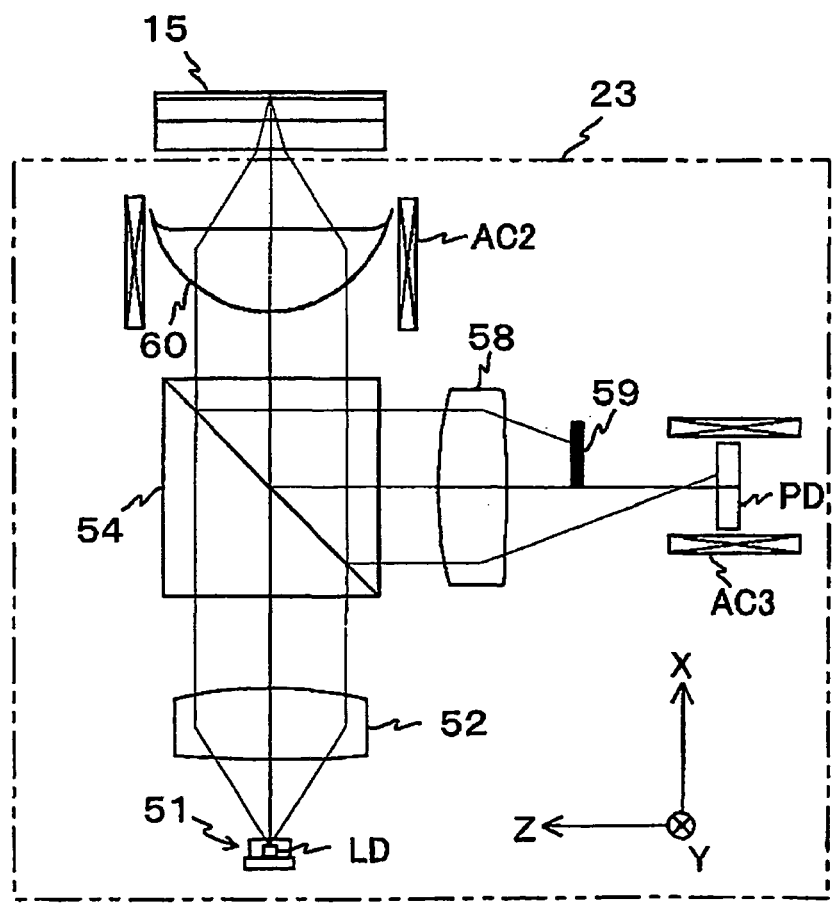
FIG. 11 is a drawing showing an example of the construction of the optical pickup apparatus according to a second embodiment of the present invention.
Figure 12:
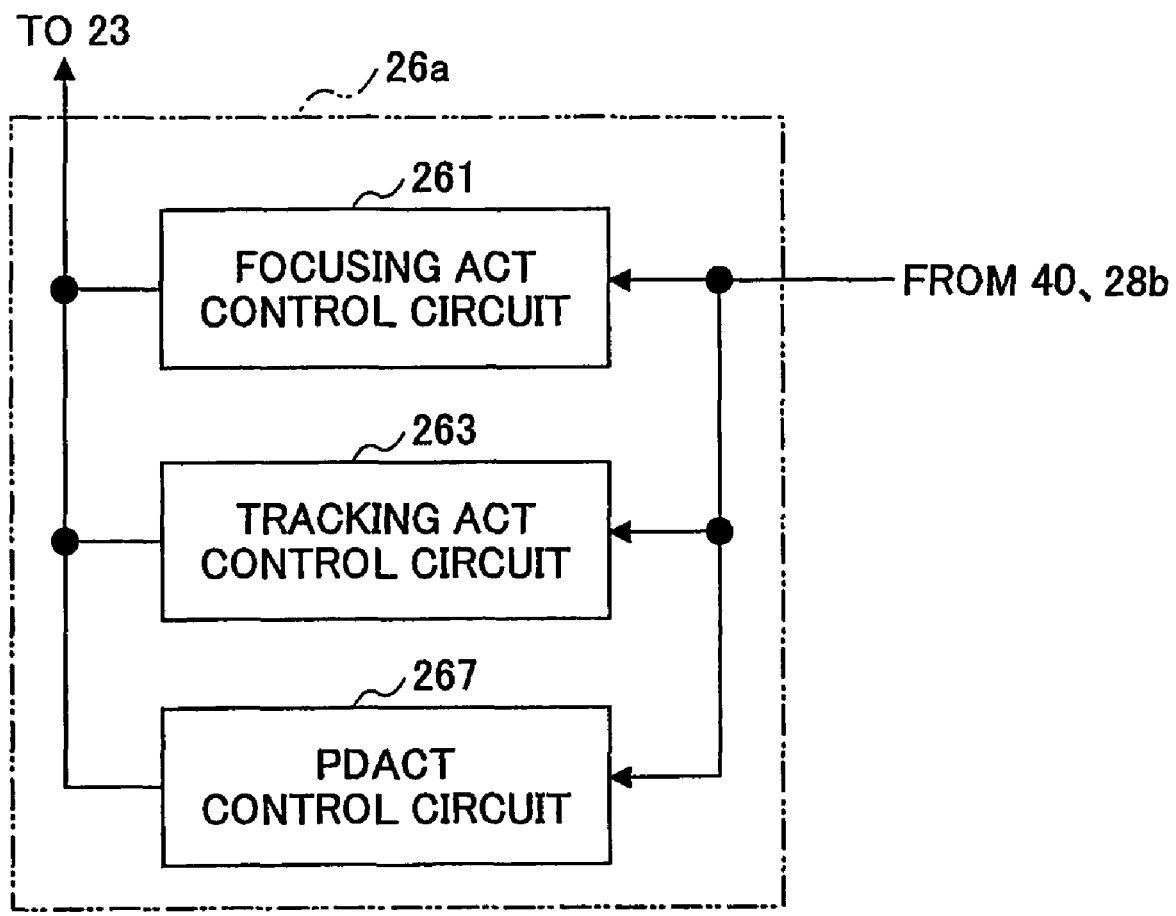
FIG. 12 is a block diagram showing an example of the construction of a PU control circuit for use with the optical pickup apparatus of FIG. 11.

The second embodiment is a variation of the first embodiment. The second embodiment differs from the first embodiment in that, as shown in FIG. 11 serving as a non-limiting example, the photo detector PD is driven rather than driving the condenser lens 58 in the optical pickup apparatus 23. Namely, a photo detector actuator AC3, in place of the condenser lens actuator AC1, is provided as a means to drive the photo detector PD in the direction of the optical axis of the photo detecting surface. Consequently, as shown in FIG. 12 serving as a non-limiting example, the PU control circuit 26a includes a PDACT control circuit 267 for generating a signal (hereinafter referred to as a fourth drive signal for sake of convenience) for driving the photo detector actuator AC3. The PDACT control circuit 267 is provided in place of the condenser lens ACT control circuit 265. Most other aspects of the construction are the same as in the first embodiment. In the following, a description will be given by focusing attention on the differences between the first embodiment and the second embodiment. The same or substantially same elements as those of the first embodiment are referred to by the same numerals, and a description thereof will be simplified or omitted.

Figure 13A:
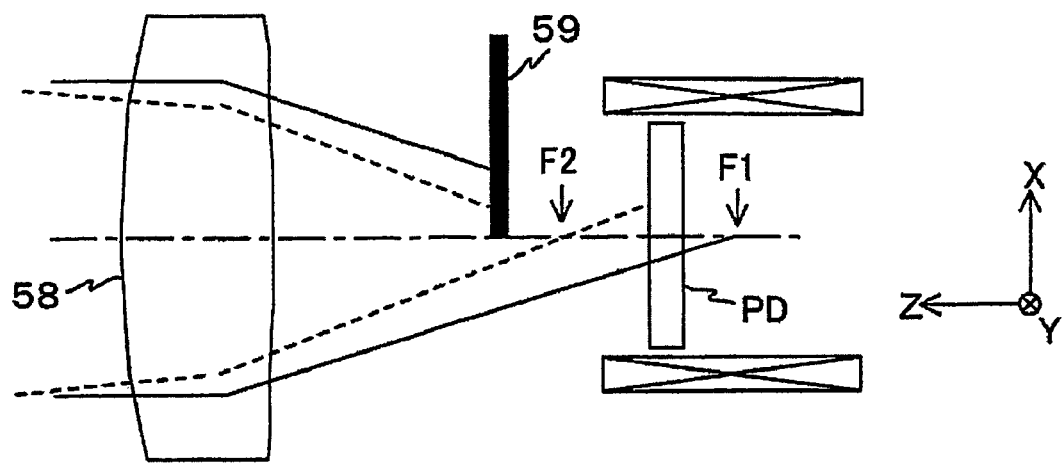
FIGS. 13A through 13C are illustrative drawings for explaining the relationship between the position of a photo detector and the condensing points of signal light and aberrant light, the signal light and aberrant light detected by each photo detecting area, and signals output from the respective photo detecting areas, respectively, when the selected recording layer is the recording layer M0 with respect to the optical pickup apparatus of FIG. 11.
Figure 14A:
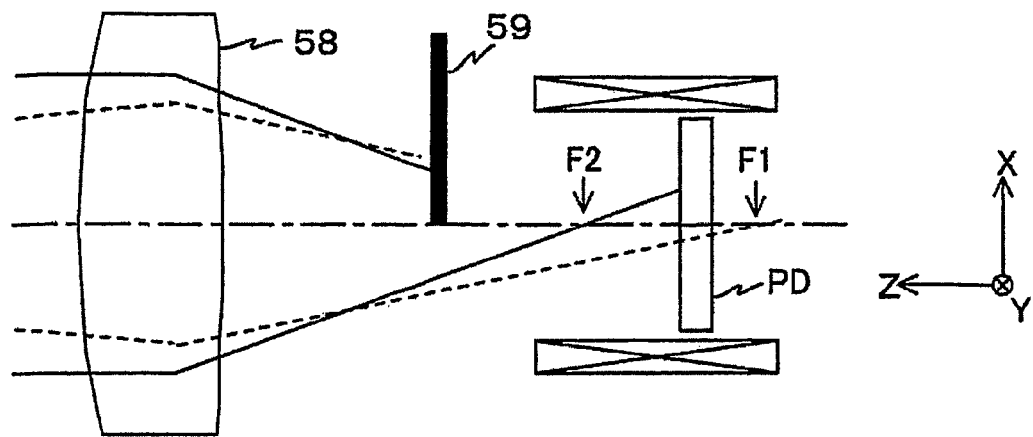
FIGS. 14A through 14C are illustrative drawings for explaining the relationship between the position of a photo detector and the condensing points of signal light and aberrant light, the signal light and aberrant light detected by each photo detecting area, and signals output from the respective photo detecting areas, respectively, when the selected recording layer is the recording layer M1 with respect to the optical pickup apparatus of FIG. 11.

The PDACT control circuit 267 generates the fourth drive signal such as to position the photo detector PD at the separating photo detecting position in response to the recording layer signal supplied from the CPU 40. When the selected recording layer is the recording layer M0, as shown in FIG. 13A serving as a non-limiting example, the photo detector PD is driven in the +Z direction. When the selected recording layer is the recording layer M1, as shown in FIG. 14A serving as a non-limiting example, the photo detector PD is driven in the −Z direction.

Figure 13B:
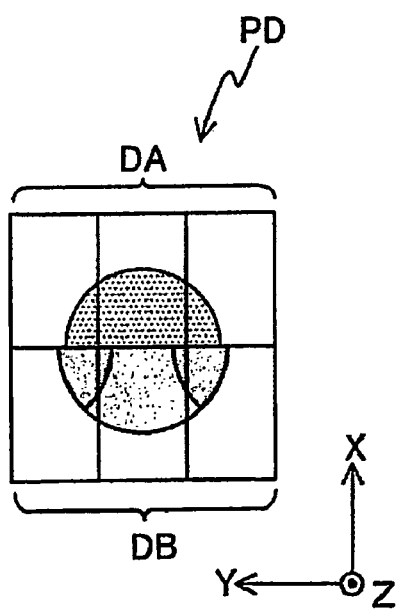
Figure 13C:
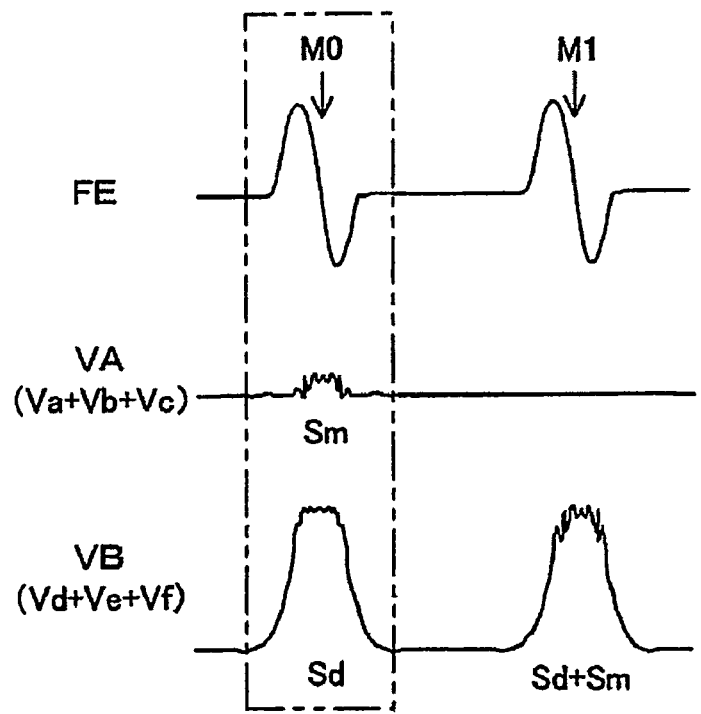

As a result, when the selected recording layer is the recording layer M0, the photo detecting area DA of the photo detector PD detects the aberrant light component, and the photo detecting area DB detects the signal light component in the same manner as in the first embodiment, as shown in FIG. 13B serving as a non-limiting example. Namely, the signal VA is a signal Sm that is almost entirely comprised of the aberrant light component with almost no signal light component, and signal VB is a signal Sd that is almost entirely comprised of the signal light component with almost no aberrant light component (see FIG. 13C).

Figure 14B:
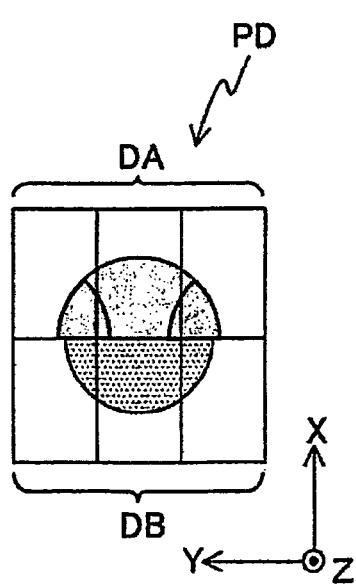
Figure 14C:
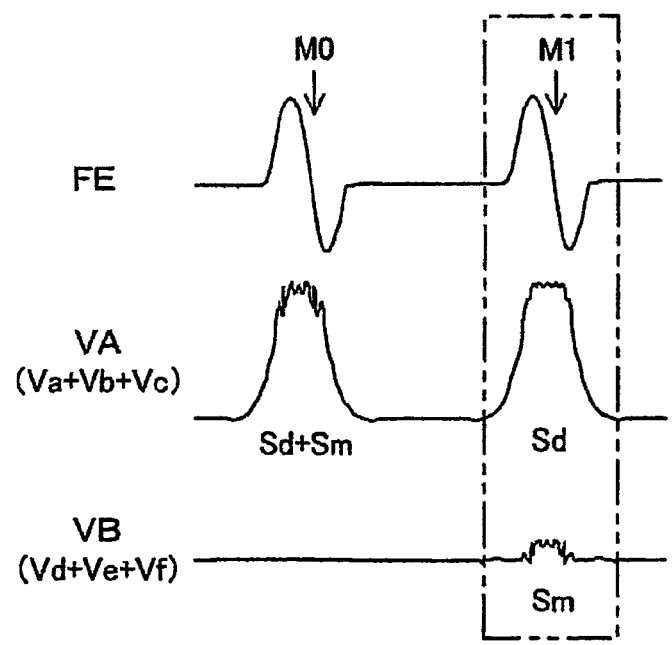

On the other hand, when the selected recording layer is the recording layer M1, the photo detecting area DA of the photo detector PD detects the signal light component, and the photo detecting area DB detects the aberrant light component in the same manner as in the first embodiment, as shown in FIG. 14B serving as a non-limiting example. Namely, the signal VA is the signal Sd that is almost entirely comprised of the signal light component with almost no aberrant light component, and the signal VB is the signal Sm that is almost entirely comprised of the aberrant light component with almost no signal light component (see FIG. 14C).

The RF signal detecting circuit 28d selects the signal VB to detect the RF signal as in the first embodiment when the selected recording layer is the recording layer M0, and selects the signal VA to detect the RF signal when the selected recording layer is the recording layer M1. Accordingly, as in the first embodiment, the RF signal is successfully obtained with sufficient precision.

The servo signal detecting circuit 28b detects the track error signal and the focus error signal FE in the same manner as in the first embodiment.

According to the second embodiment of the optical pickup apparatus as described above, the photo detecting area DB detects the light reflected by the recording layer M0, and the photo detecting area DA detects the light reflected by the recording layer M1. As a result, the light reflected by the recording layer M0 and the light reflected by the recording layer M1 can be separated from each other without mutual interference. This makes it possible to separate the reflected light components from the two recording layers of an optical disk with sufficient precision.

Further, the provision of the photo detector actuator AC3 for driving the photo detector PD achieves the proper positioning of the photo detector PD between F1 and F2 regardless of which recording layer is selected.

According to the optical disc apparatus of the second embodiment, further, the optical pickup apparatus 23 outputs an optoelectronic conversion signal corresponding to the reflected light from the selected one of the two recording layers with sufficient precision, which makes it possible to reproduce information recorded in the selected recording layer with sufficient precision in the same manner as in the first embodiment. Namely, the reproduction of information from an optical disk having two recording layers can be achieved with satisfactory precision.

Further, the provision of the PDACT control circuit 267 makes it possible to control the position of the photo detector PD at a proper position between F1 and F2 regardless of which recording layer is selected. Accordingly, no matter which recording layer is selected, it is possible to reproduce the information recorded in the selected recording layer with sufficient precision.

Third Embodiment

In the following, a description will be given of a third embodiment with reference to FIG. 15 through FIG. 18B.

Figure 15:
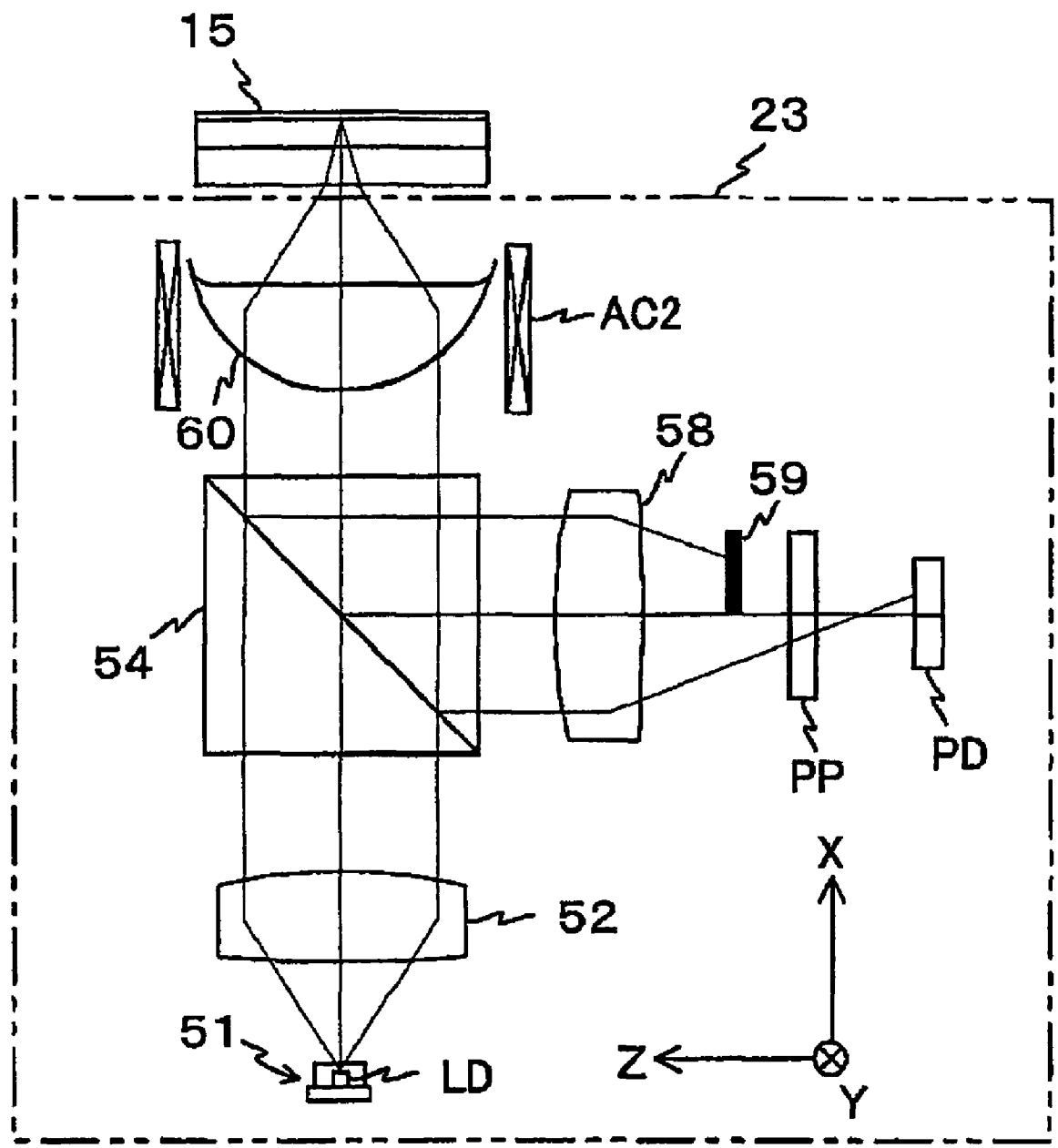
FIG. 15 is a drawing showing an example of the construction of the optical pickup apparatus according to a third embodiment of the present invention.
Figure 16:
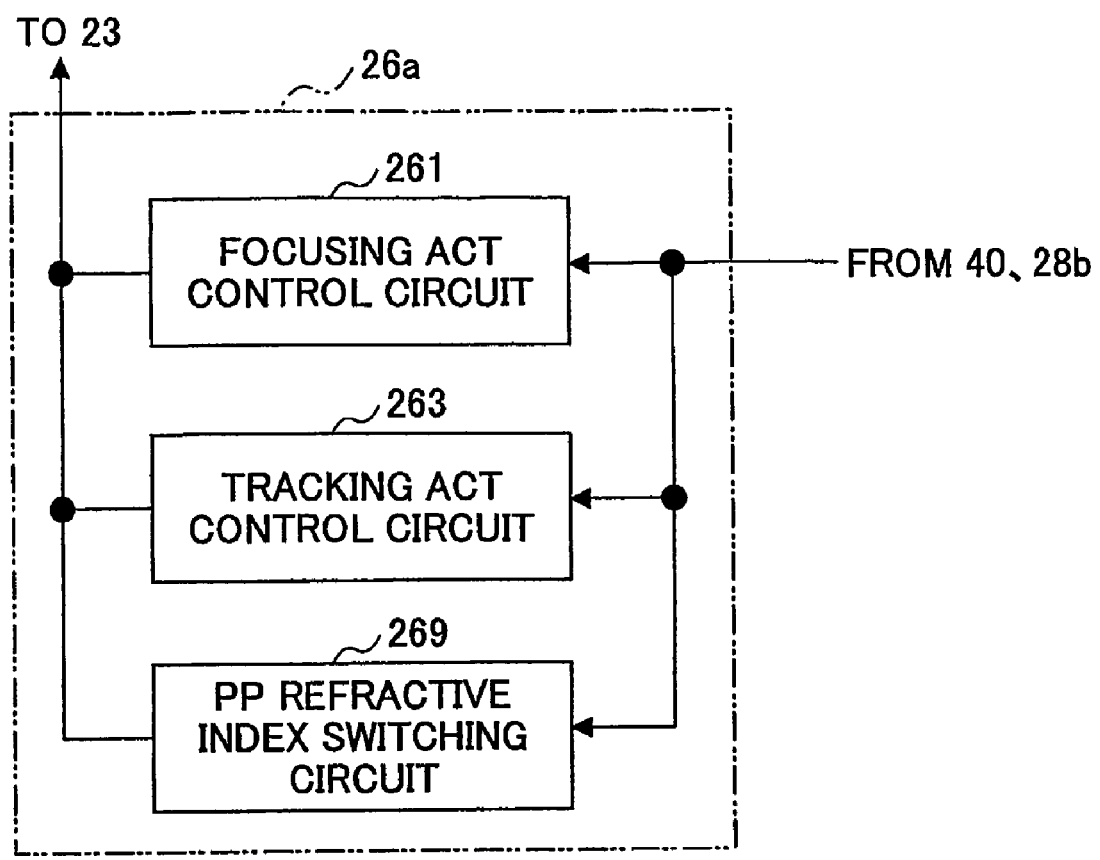
FIG. 16 is a block diagram, showing an example of the construction of a PU control circuit for use with the optical pickup apparatus of FIG. 15.

The third embodiment is a variation of the first embodiment. The third embodiment differs from the first embodiment in that a liquid crystal device pp serving as an optoelectrical device having its refractive index changing in response to an applied voltage is provided between the light blocking plate 59 and the photo detector PD in the optical pickup apparatus 23 as shown in FIG. 15 serving as a non-limiting example, and in that the condenser lens actuator AC1 is not provided. Consequently, as shown in FIG. 16 serving as a non-limiting example, the PU control circuit 26a includes a PP refractive index switching circuit 269 serving as a switching means for generating a voltage signal applied to the liquid crystal device PP. The PP refractive index switching circuit 269 is provided in place of the condenser lens ACT control circuit 265. Most other aspects of the construction are the same as in the first embodiment. In the following, a description will be given by focusing attention on the differences between the first embodiment and the third embodiment. The same or substantially same elements as those of the first embodiment are referred to by the same numerals, and a description thereof will be simplified or omitted.

The PP refractive index switching circuit 269 generates the voltage signal in response to the recording layer signal supplied from the CPU 40. The voltage signal is generated such that the refractive index of the liquid crystal device PP is set to either a refractive index corresponding to the recording layer M0 (hereinafter referred to as a first refractive index) or a refractive index corresponding to the recording layer M1 (hereinafter referred to as a second refractive index).

Figure 17B:
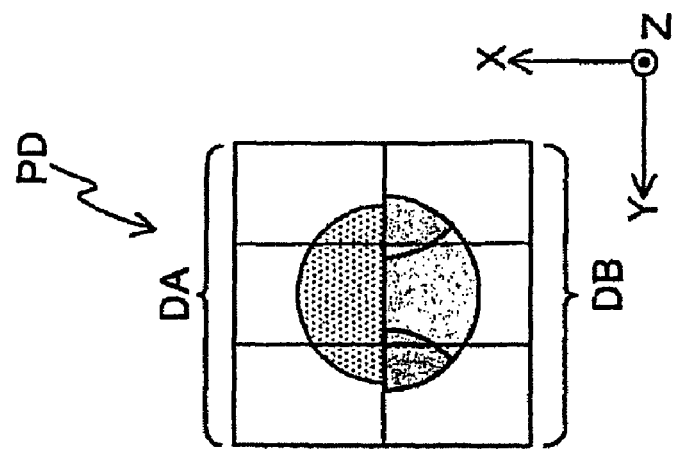
FIGS. 17A and 17B are illustrative drawings for explaining the relationship between the position of a photo detector and the condensing points of signal light and aberrant light, and the signal light and aberrant light detected by each photo detecting area, respectively, when the selected recording layer is the recording layer M0 with respect to the optical pickup apparatus of FIG. 15.
Figure 17A:
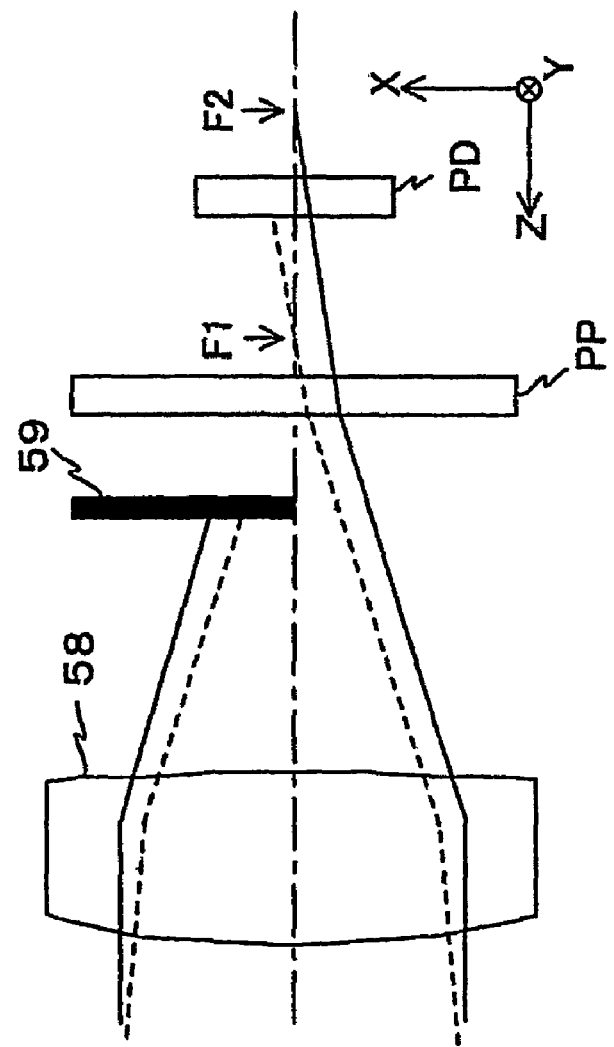
Figure 18A:
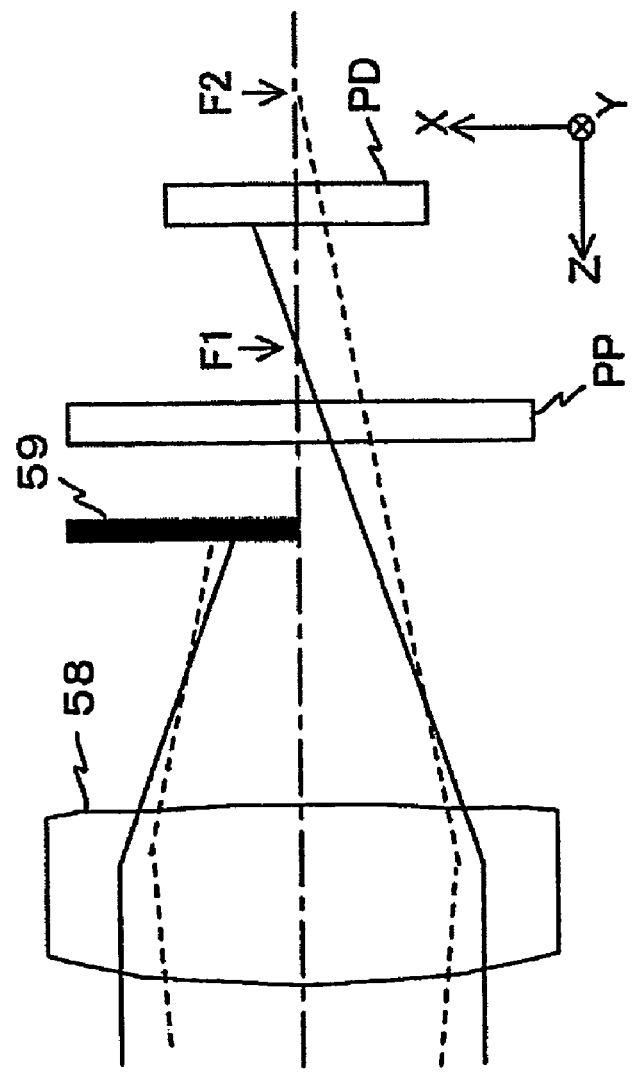
FIGS. 18A and 18B are illustrative drawings for explaining the relationship between the position of a photo detector and the condensing points of signal light and aberrant light, and the signal light and aberrant light detected by each photo detecting area, respectively, when the selected recording layer is the recording layer M1 with respect to the optical pickup apparatus of FIG. 15.

The refractive index is equal to the first refractive index when the photo detector PD is positioned at the separating, photo detecting position in the case of the selected recording layer being the recording layer M0, as shown in FIG. 17A serving as a non-limiting example. The refractive index is equal to the second refractive index when the photo detector PD is positioned at the separating photo detecting position in the case of the selected recording layer being the recording layer M1, as shown in FIG. 18A serving as a non-limiting example.

Accordingly, when the selected recording layer is the recording layer M0, as shown in FIG. 17B serving as a non-limiting example, the photo detecting area DA receives the aberrant light component, and the photo detecting area DB receives the signal light component in the same manner as in the first embodiment.

Figure 18B:
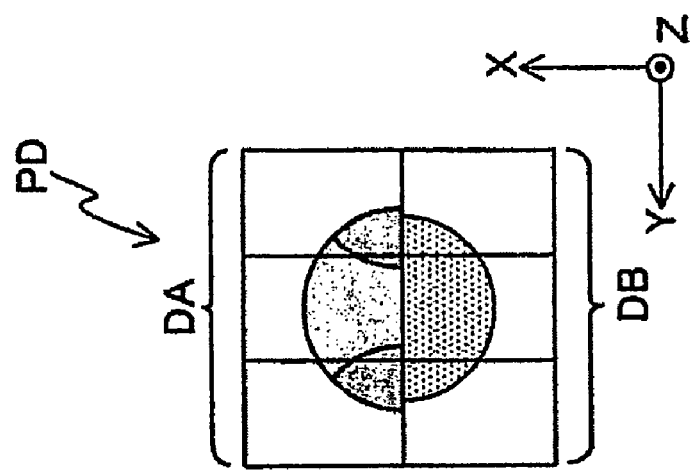

Further, when the selected recording layer is the recording layer M1, as shown in FIG. 18B serving as a non-limiting example, the photo detecting area DA receives the signal light component, and the photo detecting area DB receives the aberrant light component in the same manner as in the first embodiment.

The RF signal detecting circuit 28d selects the signal VB to detect the RF signal as in the first embodiment when the selected recording layer is the recording layer M0, and selects the signal VA to detect the RF signal when the selected recording layer is the recording layer M1. Accordingly, as in the first embodiment, the RF signal is successfully obtained with sufficient precision.

The servo signal detecting circuit 28b detects the track error signal and the focus error signal FE in the same manner as in the first embodiment.

According to the third embodiment of the optical pickup apparatus as described above, the photo detecting area DB detects the light reflected by the recording layer M0, and the photo detecting area DA detects the light reflected by the recording layer M1 in the same manner as in the first embodiment. As a result, the light reflected by the recording layer M0 and the light reflected by the recording layer M1 can be separated from each other without mutual interference. This makes it possible to separate the reflected light components from the two recording layers of an optical disk with sufficient precision.

Further, the provision of the liquid crystal device PP having its refractive index changing in response to the applied voltage achieves the proper positioning of the photo detector PD between F1 and F2 regardless of which recording layer is selected.

According to the optical disc apparatus of the third embodiment, further, the optical pickup apparatus 23 outputs an optoelectronic conversion signal corresponding to the reflected light from the selected one of the two recording layers with sufficient precision, which makes it possible to reproduce information recorded in the selected recording layer with sufficient precision in the same manner as in the first embodiment. Namely, the reproduction of information from an optical disk having two recording layers can be achieved with satisfactory precision.

Further, the provision of the PP refractive index switching circuit 269 makes it possible to switch the refractive index of the liquid crystal device PP such that the photo detector PD is properly positioned between F1 and F2 regardless of which recording layer is selected. Accordingly, no matter which recording layer is selected, it is possible to reproduce the information recorded in the selected recording layer with sufficient precision.

The above embodiment has been described with reference to a case in which a liquid crystal device is used as an opto-electrical device. The present invention is not limited to this example, and an optical device based on opto-electrical crystal with a refractive index changing in response to an applied voltage may be used, for example.

Fourth Embodiment

In the following, a description will be given of a fourth embodiment of the present invention with reference to FIG. 19A through FIG. 23C.

Figure 19A:
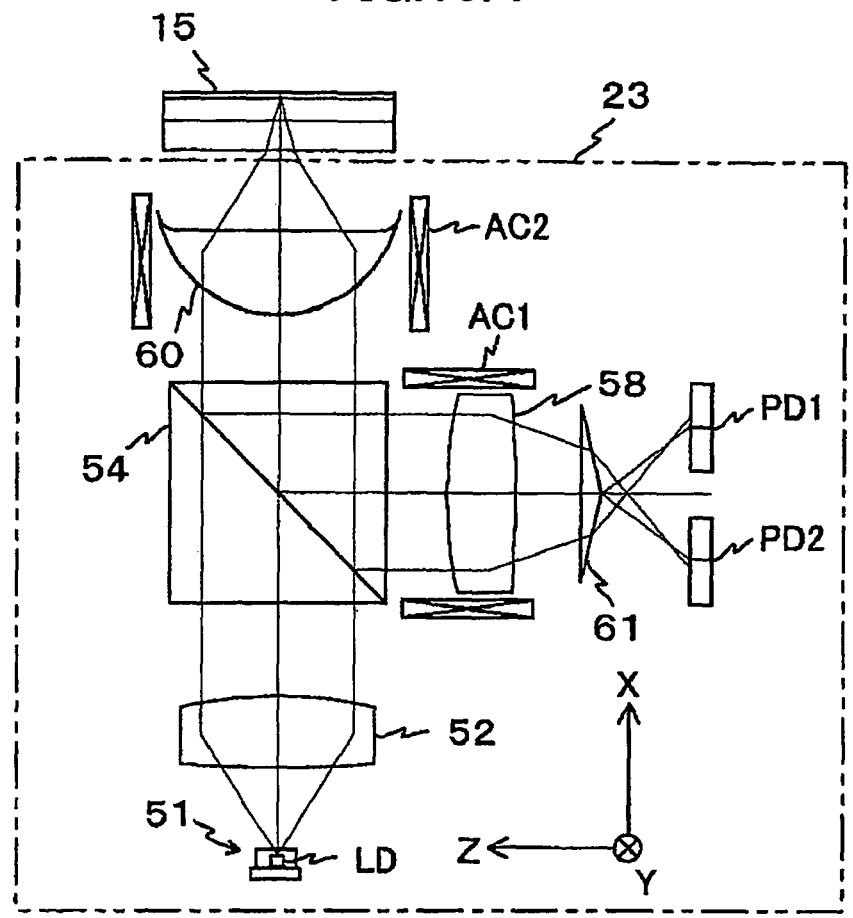
FIG. 19A is a drawing showing an example of the construction of the optical pickup apparatus according to a fourth embodiment of the present invention.

The fourth embodiment is a variation of the first embodiment. The fourth embodiment differs from the first embodiment in that a light splitting prism 61 serving as a light splitting device is used in place of the light blocking plate 59, and two photo detectors PD1 and PD2 are used in place of the photo detector PD in the optical pickup apparatus 23, as shown in FIG. 19A serving as a non-limiting example. Most other aspects of the construction are the same as in the first embodiment. In the following, a description will be given by focusing attention on the differences between the first embodiment and the fourth embodiment. The same or substantially same elements as those of the first embodiment are referred to by the same numerals, and a description thereof will be simplified or omitted.

The light splitting prism 61 splits the condensing light beam from the condenser lens 58 into a light beam on the +X side of the optical axis of the condenser lens 58 and a light beam on the −X side of the optical axis of the condenser lens 58. The light beam on the −X side of the optical axis of the condenser lens 58 travels as a first detection-purpose light beam (first light beam) towards the photo detecting surface of the photo detector PD1 (first photo detector). The light beam on the +X side of the optical axis of the condenser lens 58 travels as a second detection-purpose light beam (second light beam) towards the photo detecting surface of the photo detector PD2 (second photo detector). The photo detector PD1 is situated on the +X side of the optical axis of the condenser lens 58, and the photo detector PD2 is situated on the −X side of the optical axis of the condenser lens 58. Each photo detector is positioned substantially at the same distance from the light splitting prism 61 as far as the distance in the Z-axis direction is concerned.

Figure 19B:
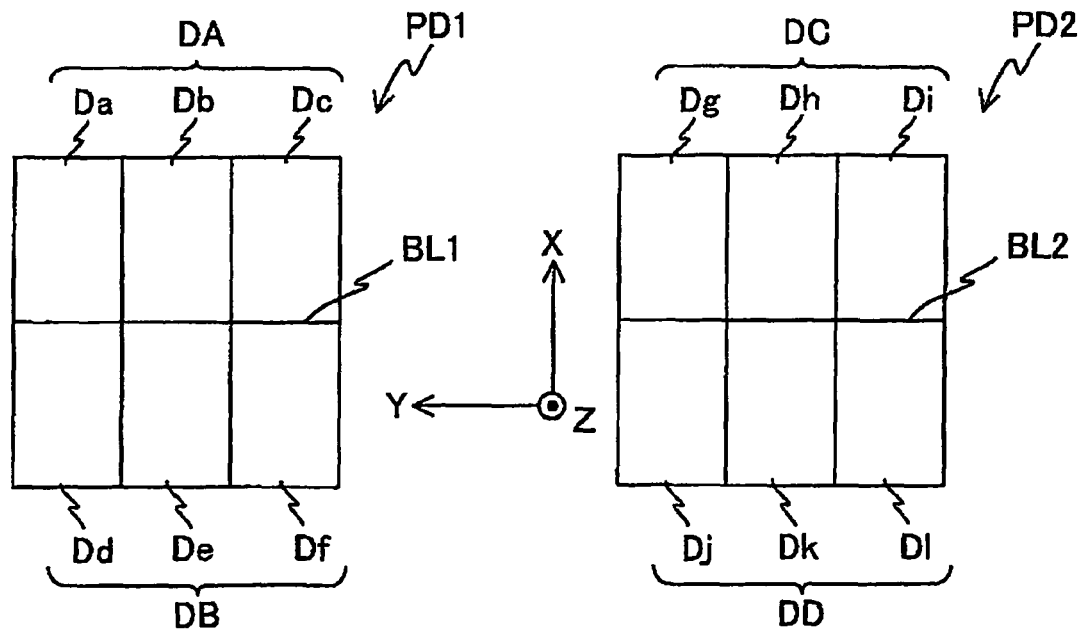
FIG. 19B is a drawing for explaining a photo detector shown in FIG. 19A.

The photo detecting surface of the photo detector PD1 is divided into a photo detecting area DA and a photo detecting area DB by a dividing line BL1 extending in the direction corresponding to the tangent direction of the track, as shown in FIG. 19B serving as a non-limiting example. The photo detecting area DA is further divided into three photo detecting sub-areas Da, Db, and Dc by two dividing lines perpendicular to the dividing line BL1. By the same token, the photo detecting area DB is further divided into three photo detecting sub-areas Dd, De, and Df by two dividing lines, perpendicular to the dividing line BL1. Each photo detecting sub-area generates an optoelectronic conversion signal responsive to the amount of received light. The generated optoelectronic conversion signals are supplied to the reproduced signal processing circuit 28.

The photo detecting surface of the photo detector PD2 is divided into a photo detecting area DC and a photo detecting area DD by a dividing line BL2 extending in the direction corresponding to the tangent direction of the track, as shown in FIG. 19B serving as a non-limiting example. The photo detecting area DC is further divided into three photo detecting sub-areas Dg, Dh, and Di by two dividing lines perpendicular to the dividing line BL2. By the same token, the photo detecting area DD is further divided into three photo detecting sub-areas Dj, Dk, and Dl by two dividing lines perpendicular to the dividing line BL2. Each photo detecting sub-area generates an optoelectronic conversion signal responsive to the amount of received light. The generated optoelectronic conversion signals are supplied to the reproduced signal processing circuit 28.

The I/V amplifier 28a converts the optoelectronic conversion signal from the photo detector PD1 and the optoelectronic conversion signal from the photo detector PD2 into voltage signals, and amplifies these signals with a predetermined gain.

The output signals of the I/V amplifier 28a corresponding to the optoelectronic conversion signals from the photo detecting sub-areas Da, Db, Dc, Dd, De, and Df of the photo detector PD1 are denoted as Va, Vb, Vc, Vd, Ve, and Vf, respectively. By the same token, the output signals of the I/V amplifier 28a corresponding to the optoelectronic conversion signals from the photo detecting sub-areas Dg, Dh, Di, Dj, Dk, and Dl of the photo detector PD2 are denoted as Vg, Vh, Vi, Vj, Vk, and Vl, respectively.

As shown in equation (3) shown below, the signal (denoted as VC) made by adding up the signals Vg, Vh, and Vi is the output signal of the I/V amplifier 28a corresponding to the photo detecting area DC. As shown in equation (4) shown below, the signal (denoted as VD) made by adding up the signals Vj, Vk, and Vl is the output signal of the I/V amplifier 28a corresponding to the photo detecting area DD. It should be noted that the signals VA and VB are represented in the same manner as in the first embodiment by the equations (1) and (2).

$$VC = Vg + Vh + Vi \qquad (3)$$

$$VD = Vj + Vk + Vl \qquad (4)$$

Between the light condensing position (denoted as $F1_1$) of the first reflected light beam contained in the first detection-purpose light beam and the light condensing position (denoted as $F2_1$) of the second reflected light beam, the first detection-purpose light beam is divided into the first reflected light beam and the second reflected light beam. The photo detector PD1 is positioned at such a position (hereinafter referred to as "first separating photo detecting position") between the light condensing position $F1_1$ and the light condensing position $F2_1$ that the photo detecting area DA receives the second reflected light beam, and the photo detecting area DB receives the first reflected light beam. This makes it possible to detect the first reflected light beam and the second reflected light beam contained in the first detection-purpose light beam separately from each other.

Between the light condensing position (denoted as $F1_2$) of the first reflected light beam contained in the second detection-purpose light beam and the light condensing position (denoted as $F2_2$) of the second reflected light beam, the second detection-purpose light beam is divided into the second reflected light beam and the first reflected light beam. The photo detector PD2 is positioned at such a position (hereinafter referred to as "second separating photo detecting position") between the light condensing position $F1_2$ and the light condensing position $F2_2$ that the photo detecting area DC receives the first reflected light beam, and the photo detecting area DD receives the second reflected light beam. This makes it possible to detect the first reflected light beam and the second reflected light beam contained in the second detection-purpose light beam separately from each other.

Figure 20A:
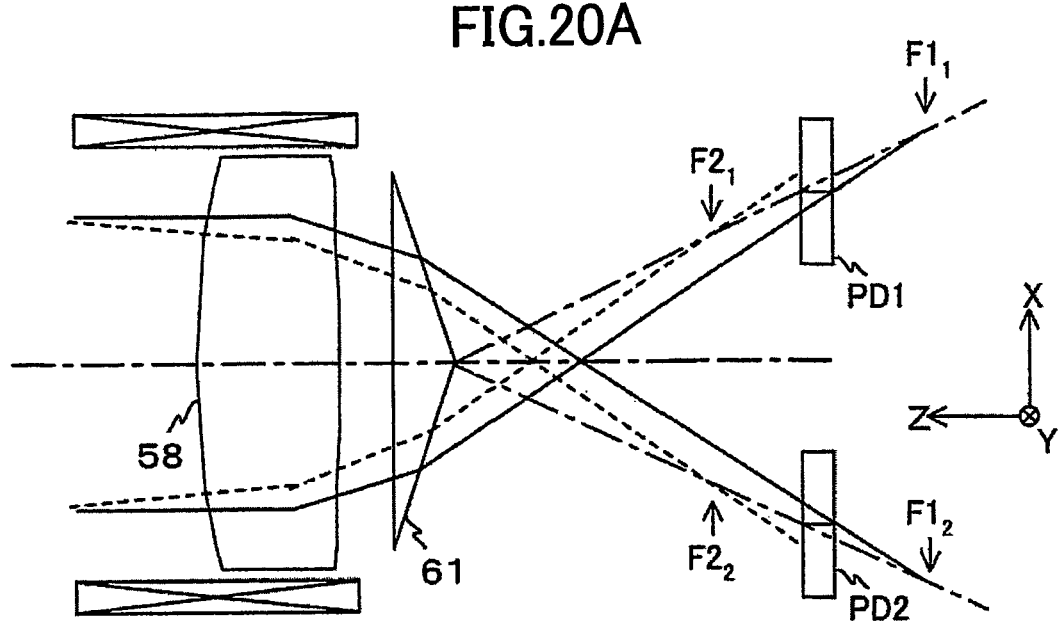
FIGS. 20A through 20C are illustrative drawings for explaining the relationship between the position of a photo detector and the condensing points of signal light and aberrant light, the signal light and aberrant light detected by each photo detecting area, and signals output from the respective photo detecting areas, respectively, when the selected recording layer is the recording layer M0 with respect to the optical pickup apparatus of FIG. 19A.
Figure 21A:
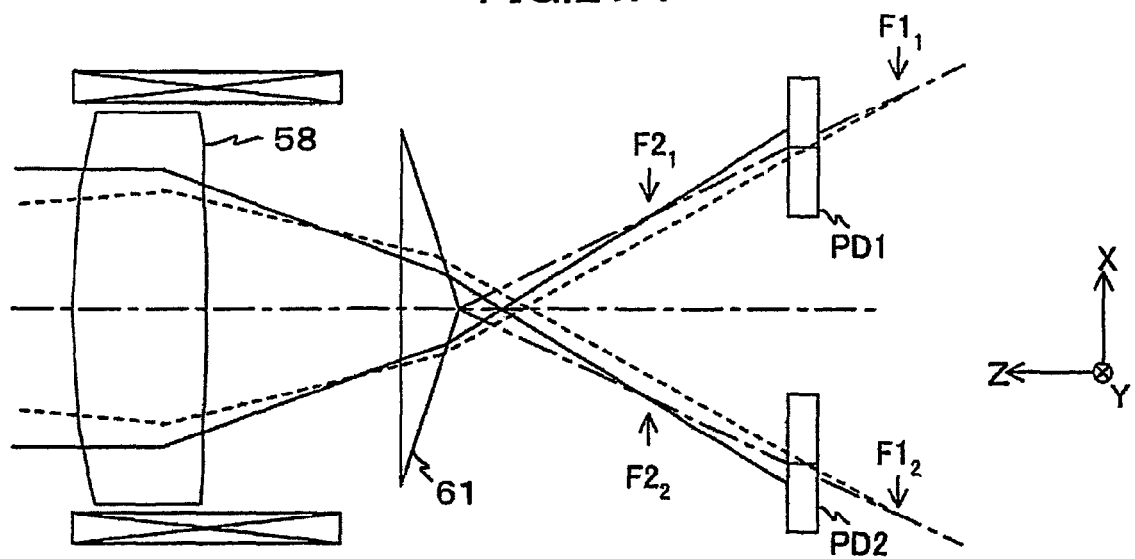
FIGS. 21A through 21C are illustrative drawings for explaining the relationship between the position of a photo detector and the condensing points of signal light and aberrant light, the signal light and aberrant light detected by each photo detecting area, and signals output from the respective photo detecting areas, respectively, when the selected recording layer is the recording layer M1 with respect to the optical pickup apparatus of FIG. 19A.

As shown in FIG. 20A serving as a non-limiting example, the condenser lens 58 is positioned at the first corresponding position such that the photo detector PD1 is positioned at the first separating photo detecting position and the photo detector PD2 is positioned at the second separating photo detecting position when the selected recording layer is the recording layer M0. As shown in FIG. 21A serving as a non-limiting example, the condenser lens 58 is positioned at the second corresponding position such that the photo detector PD1 is positioned at the first separating photo detecting position and the photo detector PD2 is positioned at the second separating photo detecting position when the selected recording layer is the recording layer M1.

Figure 20B:
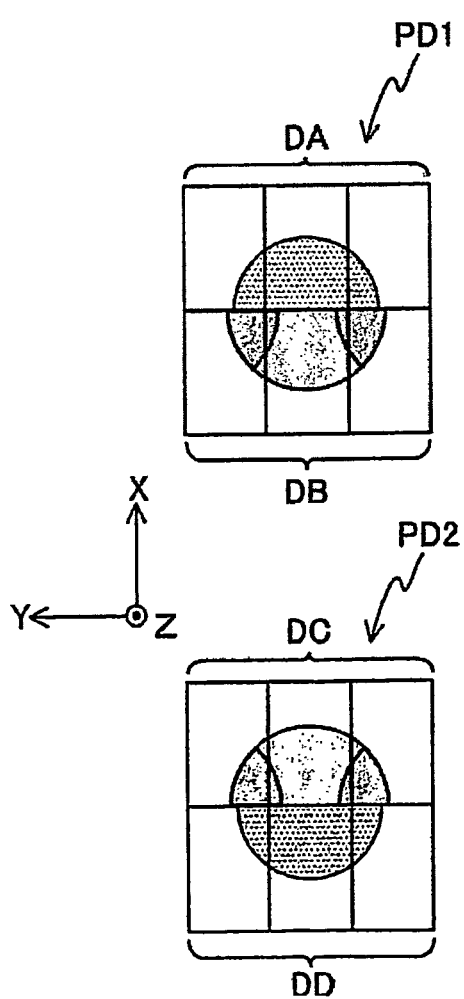
Figure 20C:
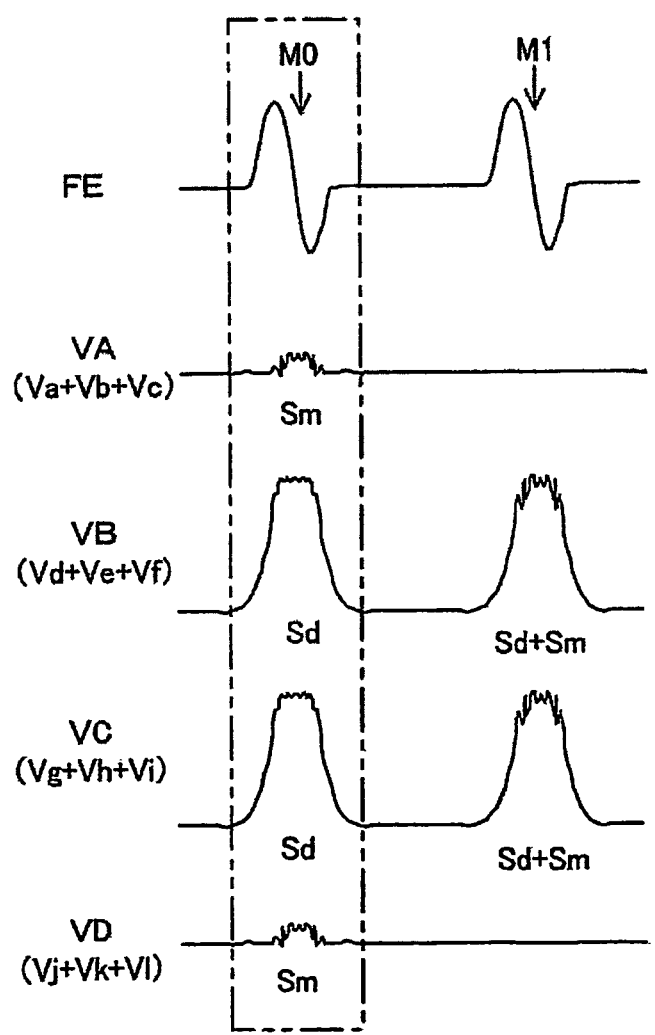

When the selected recording layer is the recording layer M0, the photo detecting areas DB and DC receive the signal light components, and the photo detecting areas DA and DD receive the aberrant light components, as shown in FIG. 20B serving as a non-limiting example. Namely, the signals VB and VC are a signal Sd that is almost entirely comprised of the signal light component with almost no aberrant light component, and the signals VA and VD are a signal Sm that is almost entirely comprised of the aberrant light component with almost no signal light component (see FIG. 20C).

Figure 21B:
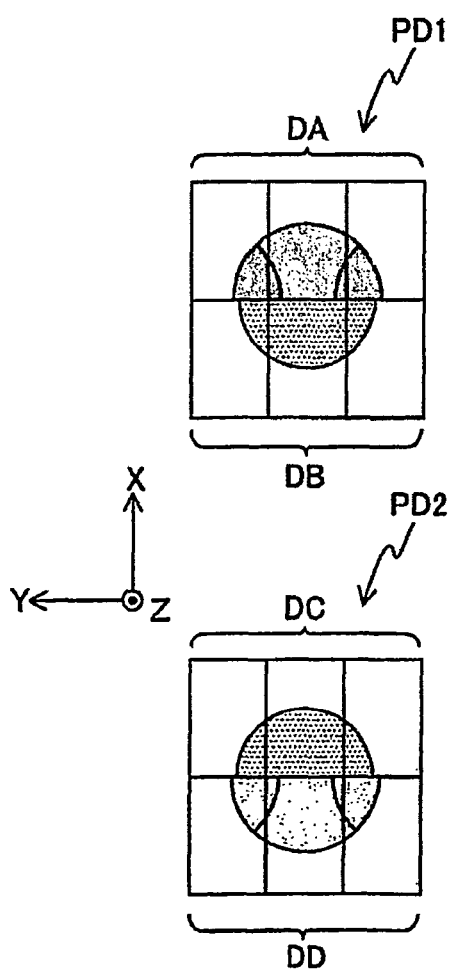
Figure 21C:
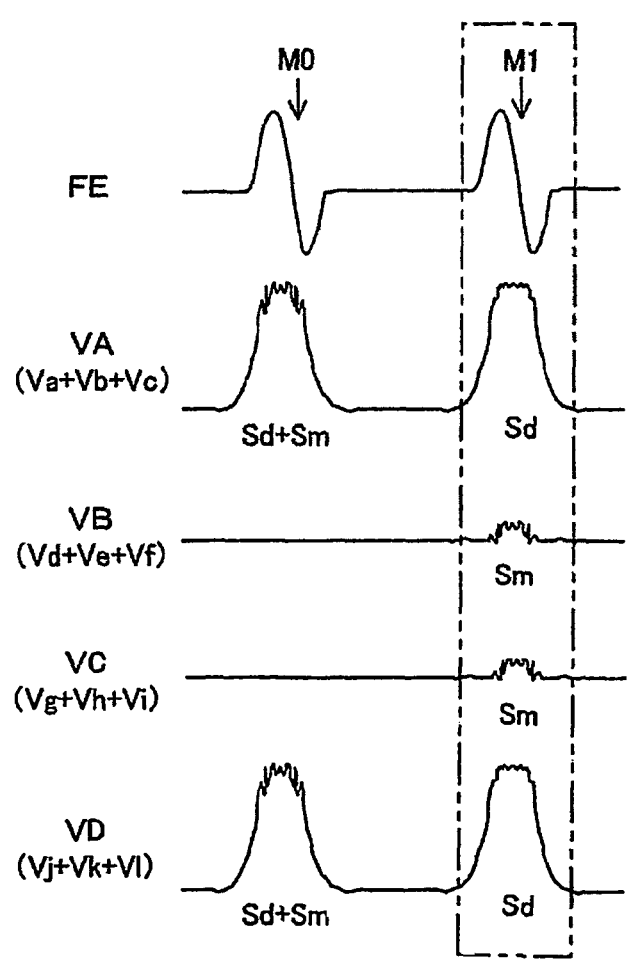

On the other hand, when the selected recording layer is the recording layer M1, the photo detecting areas DA and DD receive the signal light components, and the photo detecting areas DB and DC receive the aberrant light components, as shown in FIG. 21B serving as a non-limiting example. Namely, the signals VA and VD are a signal Sd that is almost entirely comprised of the signal light component with almost no aberrant light component, and the signals VB and VC are a signal Sm that is almost entirely comprised of the aberrant light component with almost no signal light component (see FIG. 21C).

Figure 22:
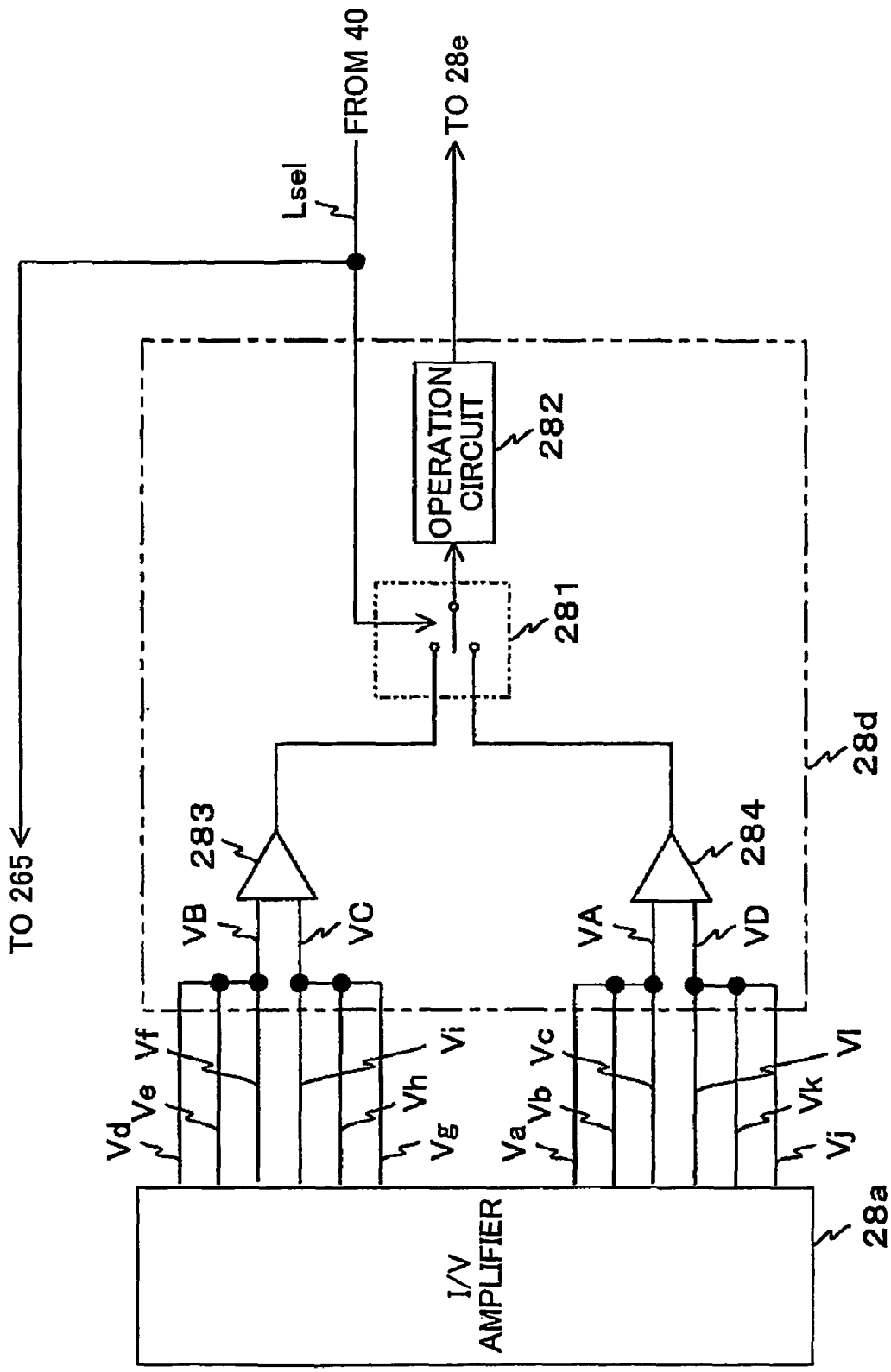
FIG. 22 is a block diagram showing an example of the construction of a RF signal detecting circuit for use with the optical pickup apparatus of FIG. 19A.

FIG. 22 is a drawing showing an example of the construction of the RF signal detecting circuit 28d. As shown in FIG. 22, the RF signal detecting circuit 28d includes an adder 283 for adding up the signal VB and the signal VC from the I/V amplifier 28a, an adder 284 for adding up the signal VA and the signal VD from the I/V amplifier 28a, the changeover switch 281 for selecting either the output signal of the adder 283 or the output signal of the adder 284 in response to the recording layer signal Lsel supplied from the CPU 40, and the operation circuit 282 for obtaining an RF signal based on the output signal of the changeover switch 281. The changeover switch 281 selects the output signal of the adder 283 when the selected recording layer is the recording layer M0, and selects the output signal of the adder 284 when the selected recording layer is the recording layer M1. Namely, the RF signal is detected based on a signal Vrf expressed by equation (5) in the following when the selected recording layer is the recording layer M0, and is detected based on a signal Vrf expressed by equation (6) in the following when the selected recording layer is the recording layer M1. With this provision, the RF signal is successfully obtained with sufficient precision.

$$Vrf = Vd + Ve + Vf + Vg + Vh + Vi \qquad (5)$$

$$Vrf = Va + Vb + Vc + Vj + Vk + Vl \qquad (6)$$

The servo signal detecting circuit 28b detects a track error signal based on a signal Vte expressed by equation (7) in the following when the selected recording layer is the recording layer M0, and detects a track error signal based on a signal Vte expressed by equation (8) in the following when the selected recording layer is the recording layer M1.

$$Vte=(Vd-Vf)+(Vg-Vi) \quad (7)$$

$$Vte=(Va-Vc)+(Vj-Vl) \quad (8)$$

The servo signal detecting circuit 28b detects a focus error signal FE based on a signal Vfe expressed by equation (9) in the following when the selected recording layer is the recording layer M0, and detects a focus error signal FE based on a signal Vfe expressed by equation (10) in the following when the selected recording layer is the recording layer M1. That is, a so-called W-beam-size method is employed for the purpose of detecting a focus error signal FE.

$$Vfe=(Vd+Vf-Ve)-(Vg+Vi-Vh) \quad (9)$$

$$Vfe=(Va+Vc-Vb)-(Vj+Vl-Vk) \quad (10)$$

Figure 23A:
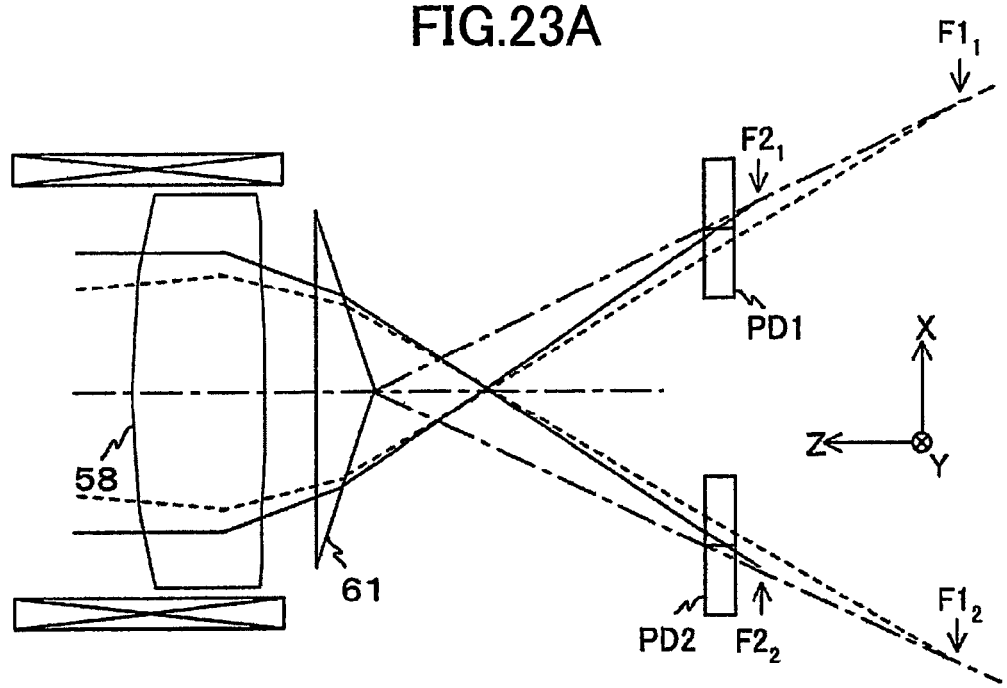
FIGS. 23A through 23C are illustrative drawings for explaining the relationship between the position a photo detector and the condensing points of signal light and aberrant light, the signal light and aberrant light detected by each photo detecting area, and signals output from the respective photo detecting areas, respectively, when the position of a condenser lens is not controlled in response to a change of the selected recording layer from the recording layer M0 to the recording layer M1 with respect to the optical pickup apparatus of FIG. 19A.
Figure 23B:
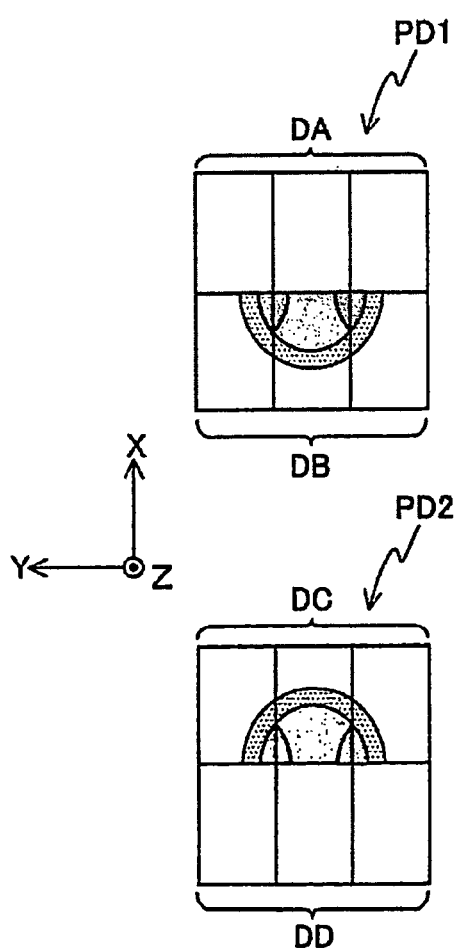
Figure 23C:
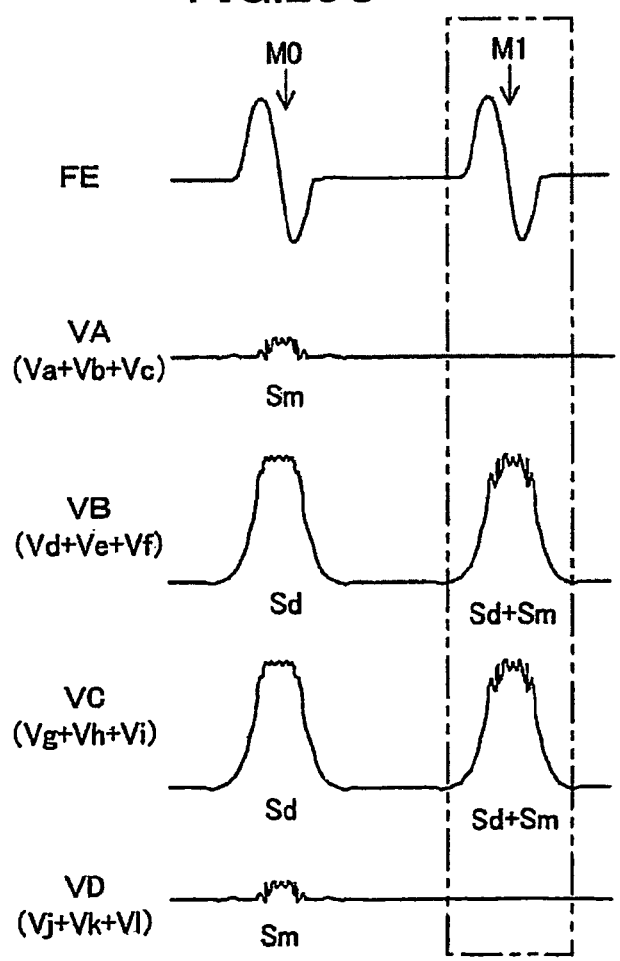

If the position of the condenser lens 58 is not changed when the selected recording layer is changed from the recording layer M0 to the recording layer M1, the light condensing positions $F1_1$ and $F2_1$ end up being positioned behind the photo detector PD1, and the light condensing positions $F1_2$ and $F2_2$ end up being positioned behind the photo detector PD2, as shown in FIG. 23A serving as a non-limiting example. In this case, as shown in FIG. 23B serving as a non-limiting example, the photo detecting areas DB and DC detect the signal light components mixed with the aberrant light components. The aberrant light components and signal light components cannot be separated from each other as shown in FIG. 23C serving as a non-limiting example.

According to the optical pickup apparatus 23 of the fourth embodiment as described above, a returning light beam from the optical disk 15 is turned by the condenser lens 58 into a condensing light beam, which is then divided by the light splitting prism 61 into the first detection-purpose light beam (first light beam) and the second detection-purpose light beam (second light beam). The first detection-purpose light beam includes the light reflected by the recording layer M0 condensing at $F1_1$ and the light reflected by the recording layer M1 condensing at $F2_1$. The second detection-purpose light beam includes the light reflected by the recording layer M0 condensing at $F1_2$ and the light reflected by the recording layer M1 condensing at $F2_2$. The photo detector PD1 (first photo detector) is positioned between $F1_1$ and $F2_1$, such that the photo detecting area DB detects the light reflected by the recording layer M0, and the photo detecting area DA detects the light reflected by the recording layer M1. The photo detector PD2 (second photo detector) is positioned between $F1_2$ and $F2_2$, such that the photo detecting area DC detects the light reflected by the recording layer M0, and the photo detecting area DD detects the light reflected by the recording layer M1. As a result, the light reflected by the recording layer M0 and the light reflected by the recording layer M1 can be separated from each other without mutual interference. This makes it possible to separate the reflected light components from the two recording layers of an optical disk with sufficient precision.

Further, the condenser lens actuator AC1 for driving the condenser lens 58 is provided. This provides for each photo detector to be positioned between the light condensing position of light reflected by the recording layer M0 and the light condensing position of light reflected by the recording layer M1.

According to the optical disc apparatus of the fourth embodiment, the optical pickup apparatus 23 outputs an opto-electronic conversion signal corresponding to the reflected light from the selected one of the two recording layers with sufficient precision, so that information recorded in the selected recording layer can be reproduced with sufficient precision. Namely, the reproduction of information from an optical disk having two recording layers can be achieved with satisfactory precision.

With the provision of the condenser lens ACT control circuit 265, further, the position of the condenser lens 58 is controlled such that each photo detector is situated between the light condensing position of light reflected by the recording layer M0 and the light condensing position of light reflected by the recording layer M1 regardless which one of the recording layers is selected. No matter which recording layer is selected, therefore, information recorded in the selected recording layer is reproduced with sufficient precision.

The optical disc apparatus according to the fourth embodiment uses signal light components contained in the first detection-purpose light beam and signal light components contained in the second detection-purpose light beam in the reproduced signal processing circuit 28. Provision is thus made to improve the efficiency of usage of light compared with the first through third embodiments.

If the signal light components contained in the returning light beam are large in the fourth embodiment, the reproduced signal processing circuit 28 may use only one of the first detection-purpose light beam and the second detection-purpose light beam to detect relevant signals.

In the fourth embodiment described above, the servo signal detecting circuit 28b detects the focus error signal FE by extracting lower-frequency components of the signal VB or the signal VC when the selected recording layer is the recording layer M0. The servo signal detecting circuit 28b detects the focus error signal FE by extracting lower-frequency components of the signal VA or signal VD when the selected recording layer is the recording layer M1.

Figure 24:
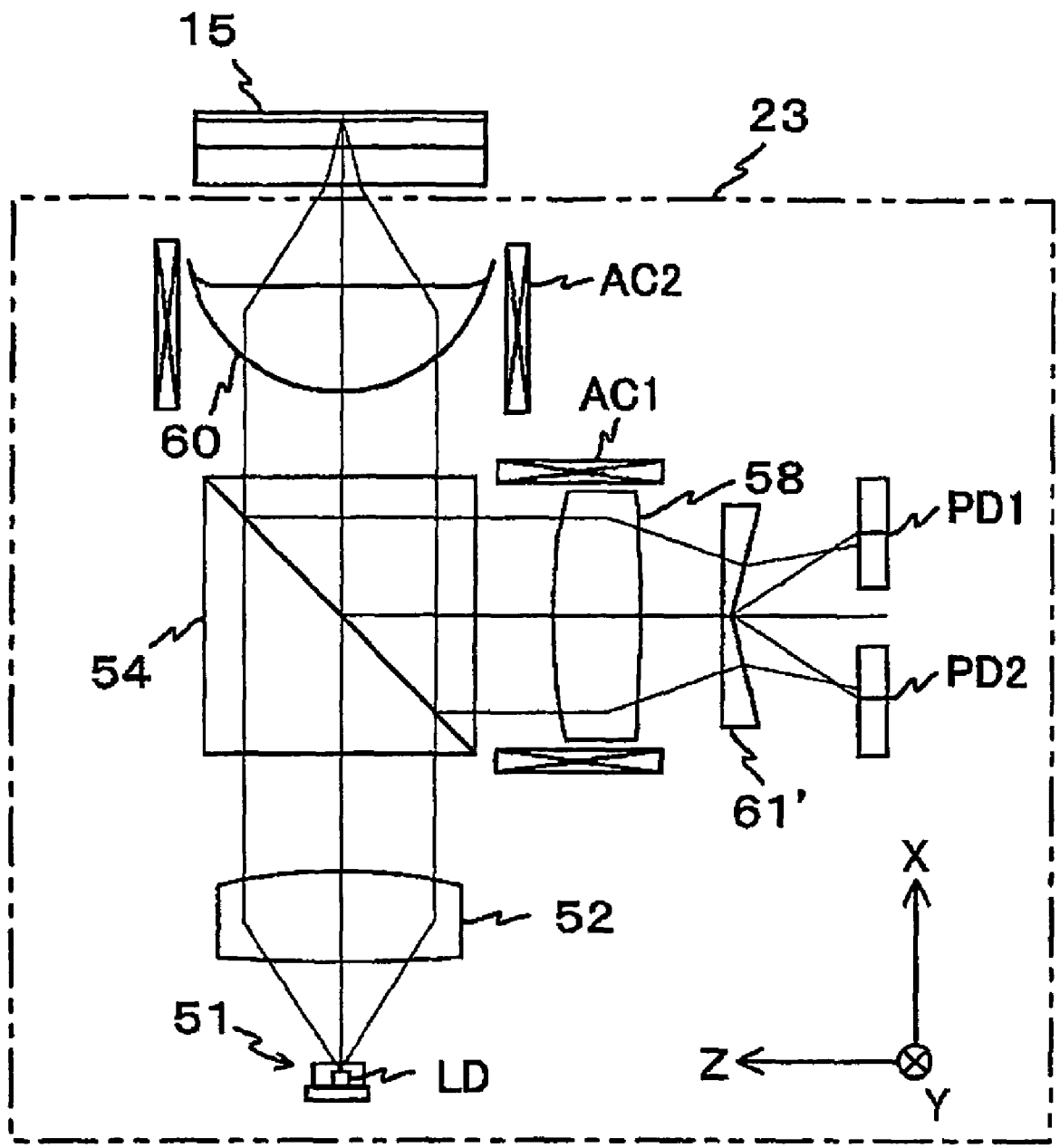
FIG. 24 is a drawing showing an example of a variation of the optical pickup apparatus shown in FIG. 19A.

FIG. 24 is a drawing showing an example of a variation of the fourth embodiment. As shown in FIG. 24, a light splitting prism 61' may be used in place of the light splitting prism 61. The light splitting prism 61' is configured such that a light beam on the +X side of the optical axis of the condenser lens 58 travels as the first detection-purpose light beam towards the photo detecting surface of the photo detector PD1, and that a light beam on the −X side of the optical axis of the condenser lens 58 travels as the second detection-purpose light beam towards the photo detecting surface of the photo detector PD2.

Fifth Embodiment

In the following, a description will be given of a fifth embodiment with reference to FIG. 25 through FIG. 29.

Figure 25:
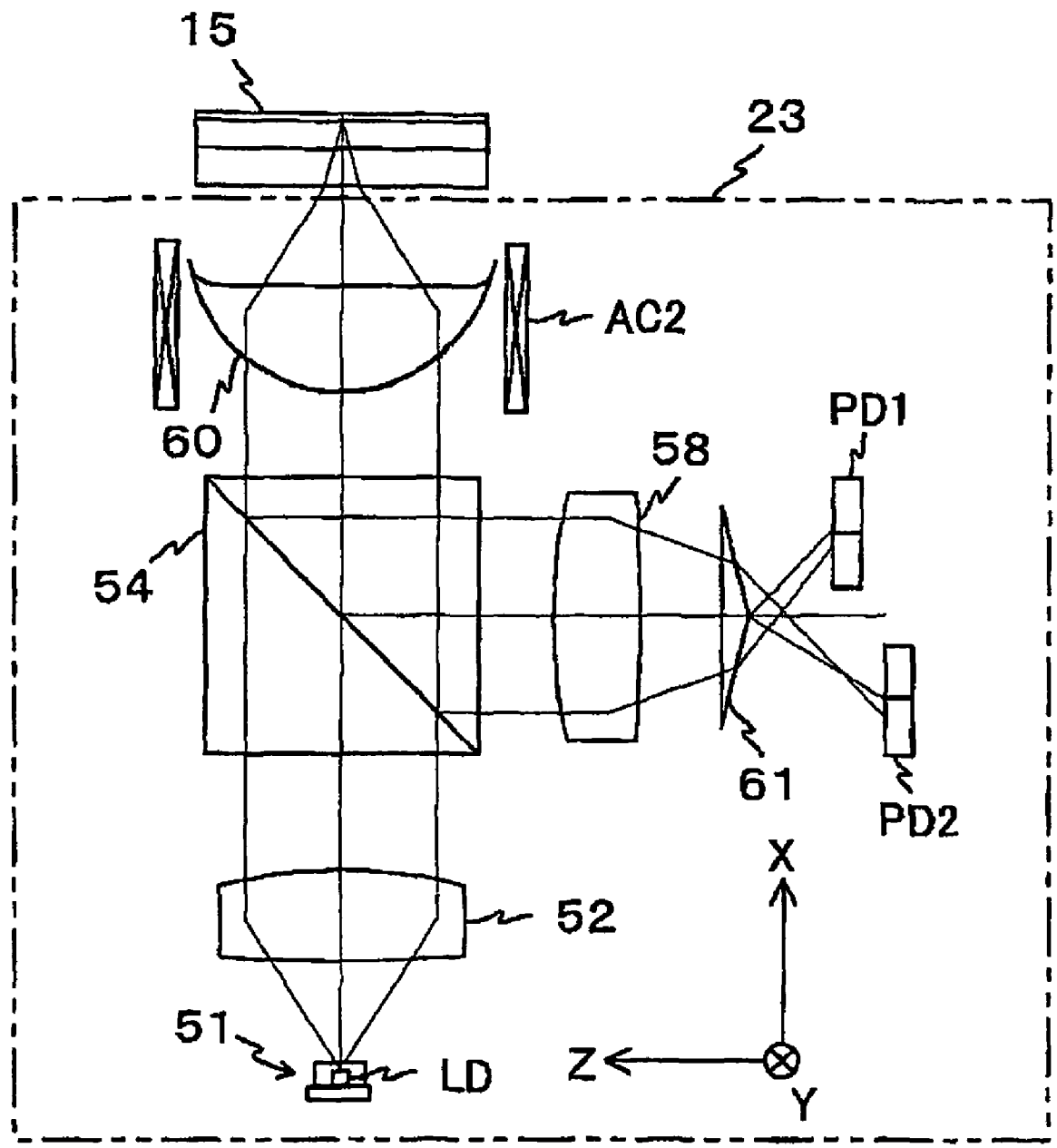
FIG. 25 is a drawing showing an example of the construction of the optical pickup apparatus according to a fifth embodiment of the present invention.

The fifth embodiment is directed to a first variation of the optical pickup apparatus of the fourth embodiment. In the fifth embodiment, the Z-direction distance between the light splitting prism 61 and the photo detector PD1 and the Z-direction distance between the light splitting prism 61 and the photo detector PD2 are set differently, thereby eliminating a need for the condenser lens actuator AC1 as shown in FIG. 25 serving as a non-limiting example.

Figure 26:
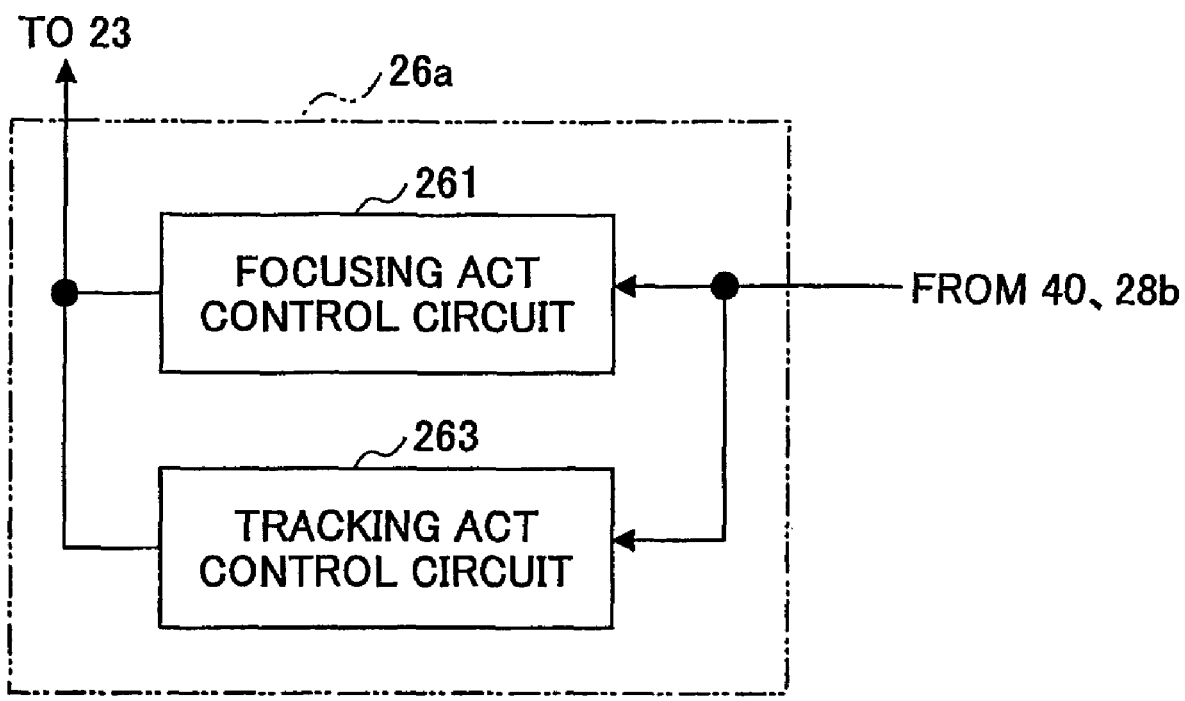
FIG. 26 is a block diagram showing an example of the construction of a PU control circuit for use with the optical pickup apparatus of FIG. 25.

FIG. 26 is a drawing showing an example of the construction of the PU control circuit 26a. As shown in FIG. 26, the PU control circuit 26a includes only the focusing ACT control circuit 261 and the tracking ACT control circuit 263. Namely, the condenser lens ACT control circuit 265 is not necessary.

Figure 27A:
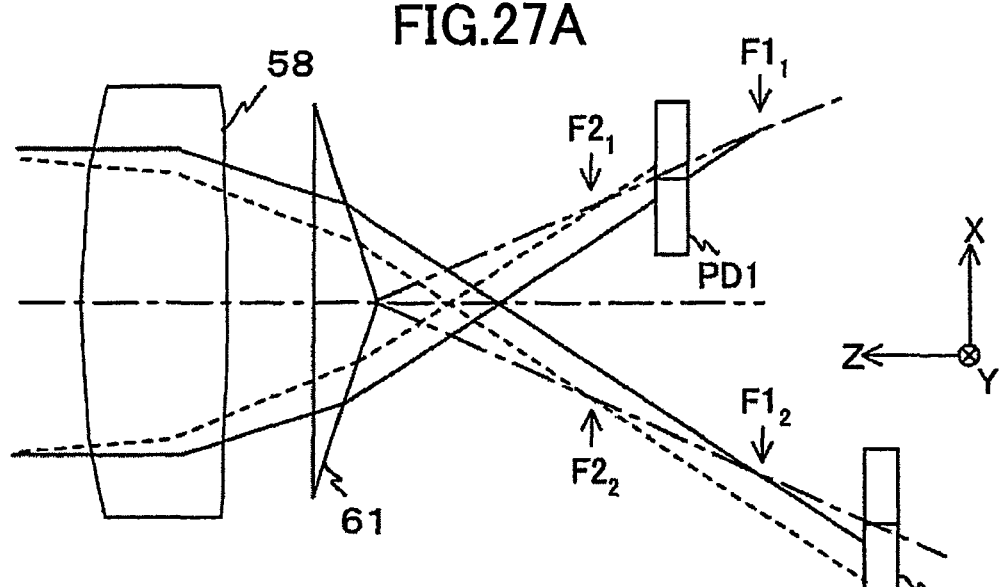
FIGS. 27A through 27C are illustrative drawings for explaining the relationship between the position of a photo detector and the condensing points of signal light and aberrant light, the signal light and aberrant light detected by each photo detecting area, and signals output from the respective photo detecting areas, respectively, when the selected recording layer is the recording layer M0 with respect to the optical pickup apparatus of FIG. 25.
Figure 28A:
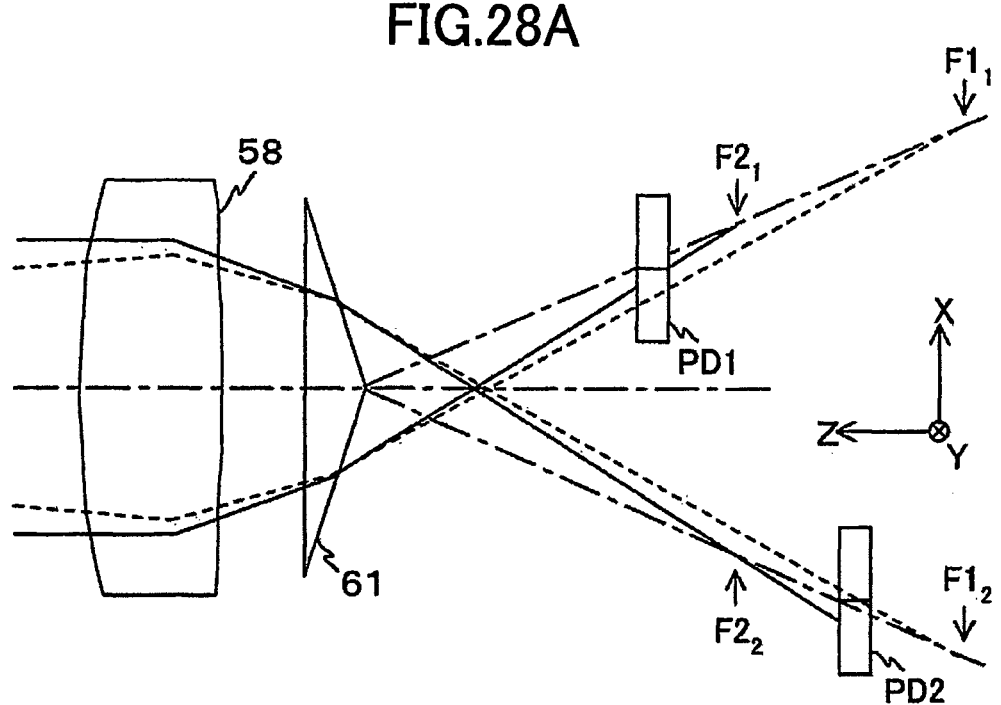
FIGS. 28A through 28C are illustrative drawings for explaining the relationship between the position of a photo detector and the condensing points of signal light and aberrant light, the signal light and aberrant light detected by each photo detecting area, and signals output from the respective photo detecting areas, respectively, when the selected recording layer is the recording layer M1 with respect to the optical pickup apparatus of FIG. 25.

As shown in FIG. 27A serving as a non-limiting example, the photo detector PD1 is positioned between the light condensing position $F1_1$ and the light condensing, position $F2_1$ when the selected recording layer is the recording layer M0. As shown in FIG. 28A serving as a non-limiting example, the photo detector PD2 is positioned between the light condensing position $F1_2$ and the light condensing position $F2_2$ when the selected recording layer is the recording layer M1.

Figure 27B:
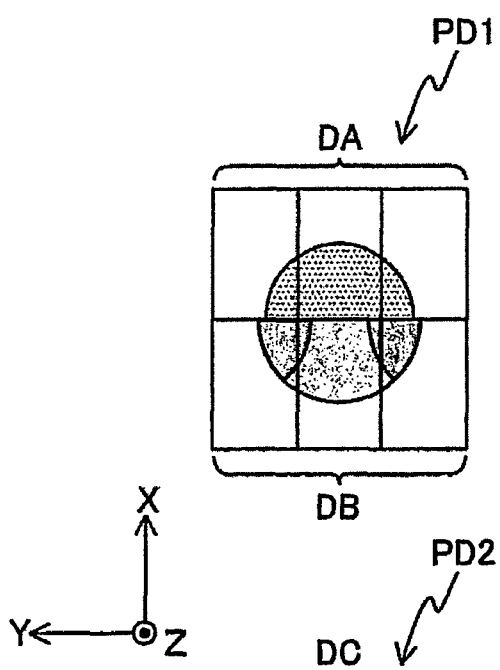
Figure 27C:
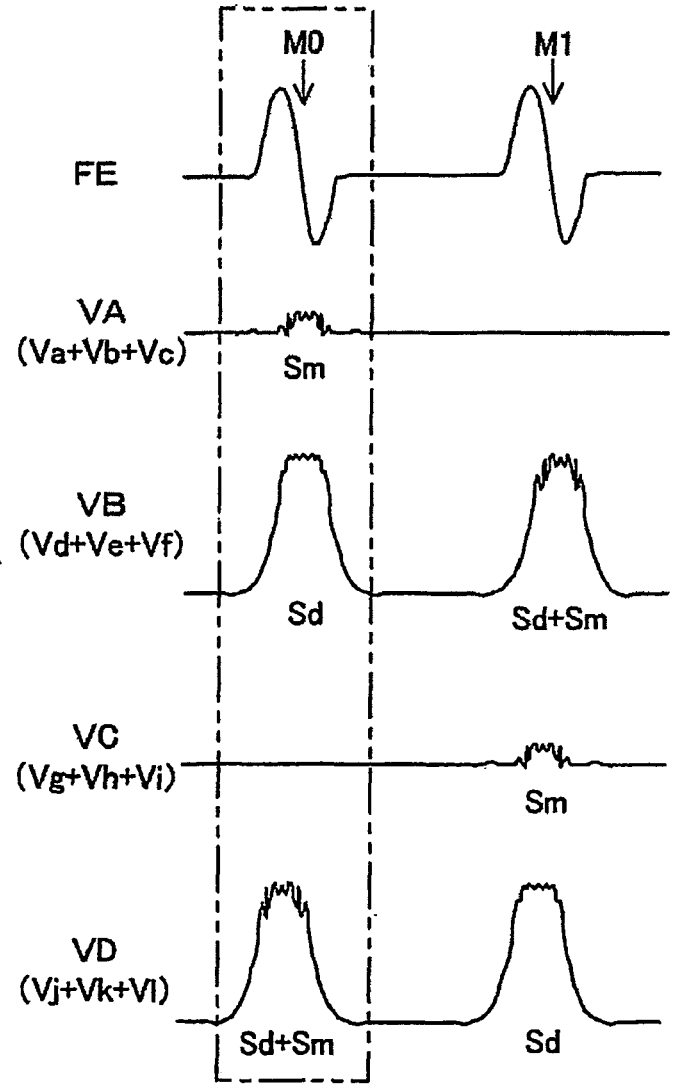

Accordingly, when the selected recording layer is the recording layer M0, the photo detecting area DA receives the aberrant light component, and the photo detecting area DB receives the signal light component, as shown in FIG. 27B serving as a non-limiting example. Namely, the signal VA is a signal Sm that is almost entirely comprised of the aberrant light component with almost no signal light component, and the signal VB is a signal Sd that is almost entirely comprised of the signal light component with almost no aberrant light component (see FIG. 27C). At this time, the photo detector PD2 is positioned behind the light condensing position $F1_2$ and the light condensing position $F2_2$, the photo detecting area DD detects the signal light component mixed with the aberrant light component.

Figure 28B:
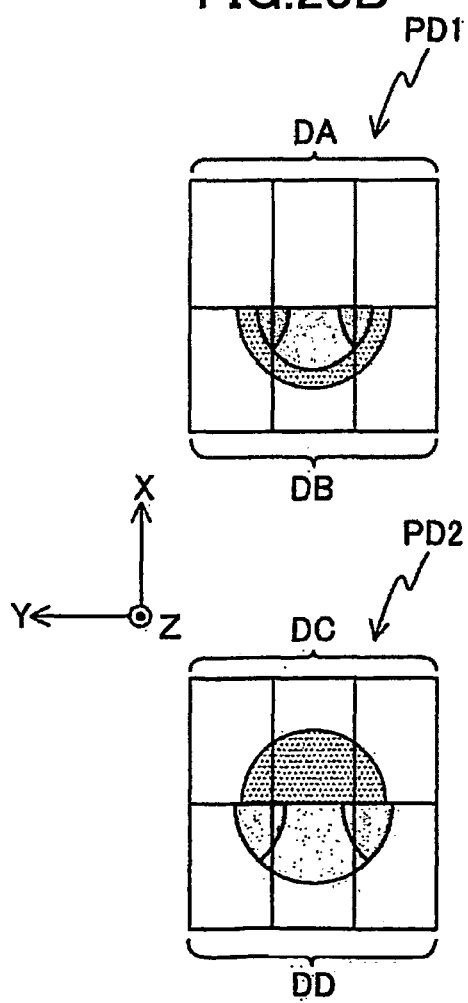
Figure 28C:
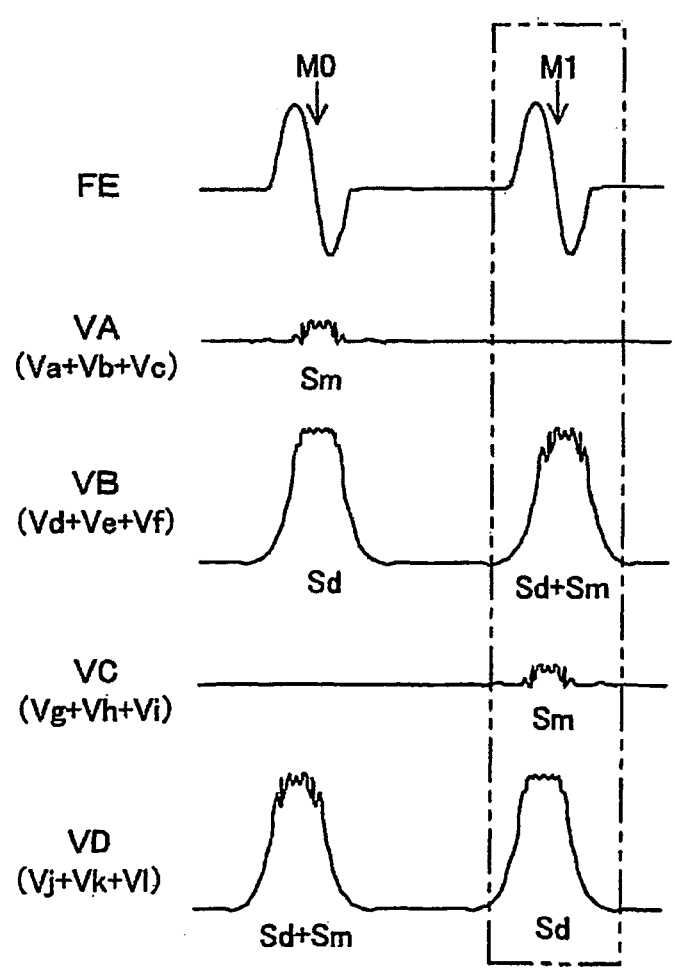

On the other hand, when the selected recording layer is the recording layer M1, the photo detecting area DC receives the aberrant light component, and the photo detecting area DD receives the signal light component, as shown in FIG. 28B serving as a non-limiting example. Namely, the signal VC is a signal Sm that is almost entirely comprised of the aberrant light component with almost no signal light component, and the signal VD is a signal Sd that is almost entirely comprised of the signal light component with almost no aberrant light component (see FIG. 28C). At this time, the photo detector PD1 is positioned behind the light condensing position $F1_1$, and the light condensing position $F2_1$, the photo detecting area DB detects the signal light component mixed with the aberrant light component.

Figure 29:
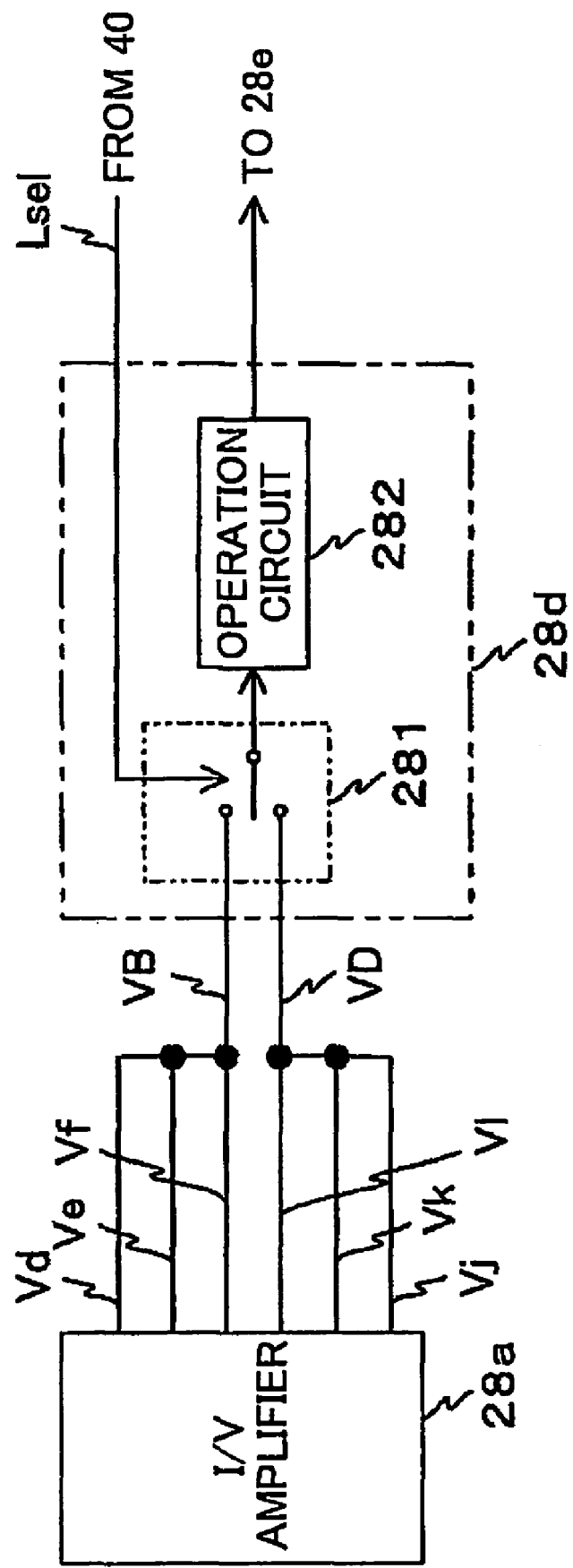
FIG. 29 is a block diagram showing an example of the construction of a RF signal detecting circuit for use with the optical pickup apparatus of FIG. 25.

FIG. 29 is a drawing showing an example of the construction of the RF signal detecting circuit 28d. As shown in FIG. 29, the RF signal detecting circuit 28d includes the changeover switch 281 for selecting either the signal VB or the signal VD from the I/V amplifier 28a in response to the recording layer signal Lsel supplied from the CPU 40, and further includes the operation circuit 282 for obtaining an RF signal based on the output signal of the changeover switch 281. The changeover switch 281 selects the signal VB when the selected recording layer is the recording layer M0, and selects the signal VD when the selected recording layer is the recording layer M1. With this provision, the RF signal is successfully obtained with sufficient precision.

The servo signal detecting circuit 28b detects a track error signal based on a differential between the signal Vd and the signal Vf from the I/V amplifier 28a when the selected recording layer is the recording layer M0. The servo signal detecting circuit 28b detects a track error signal based on a differential between the signal Vj and the signal V1 from the I/V amplifier 28a when the selected recording layer is the recording layer M1.

The servo signal detecting circuit 28b detects the focus error signal FE by extracting lower-frequency components of the signal VB when the selected recording layer is the recording layer M0. The servo signal detecting circuit 28b further detects the focus error signal FE by extracting lower-frequency components of the signal VD when the selected recording layer is the recording layer M1.

According to the fifth embodiment of the optical pickup apparatus as described above, the photo detector PD1 (first photo detector) is positioned between $F1_1$ and $F2_1$ when the selected recording layer is the recording layer M0, such that the photo detecting area DB detects the light reflected by the recording layer M0, and the photo detecting area DA detects the light reflected by the recording layer M1. When the selected recording layer is the recording layer M1, the photo detector PD2 (second photo detector) is positioned between $F1_2$ and $F2_2$, such that the photo detecting area DC detects the light reflected by the recording layer M0, and the photo detecting area DD detects the light reflected by the recording layer M1. As a result, the light reflected by the recording layer M0 and the light reflected by the recording layer M1 can be separated from each other without mutual interference. This makes it possible to separate the reflected light components from the two recording layers of an optical disk with sufficient precision.

According to the optical disc apparatus of the fifth embodiment, the optical pickup apparatus 23 outputs a signal from the selected one of the two recording layers with sufficient precision, so that information recorded in the selected recording layer can be reproduced with sufficient precision. Namely, the reproduction of information from an optical disk having two recording layers can be achieved with satisfactory precision.

In the fifth embodiment described above, the RF signal is detected by using the signal VB and signal VD supplied from the I/V amplifier 28a. Alternatively, the signals VA, VB, VC, and VD from the I/V amplifier 28a may be used to detect the RF signal. In this case, the RF signal detecting circuit 28d includes the adder 283 for adding up the signal VB and the signal VD from the I/V amplifier 28a, the adder 284 for adding up the signal VA and the signal VC from the I/V amplifier 28a, a subtraction unit 285 for subtracting the output signal of the adder 284 from the output signal of the adder 283, and the operation circuit 282 for obtaining an RF signal based on the output signal of the subtraction unit 285, as shown in FIG. 30 serving as a non-limiting example. This increases the efficiency of use of light. In this case, the RF signal detecting circuit 28d functions as a signal obtaining unit.

Sixth Embodiment

In the following, a description will be given of a sixth embodiment with reference to FIG. 31A through FIG. 35C.

Figure 31A:
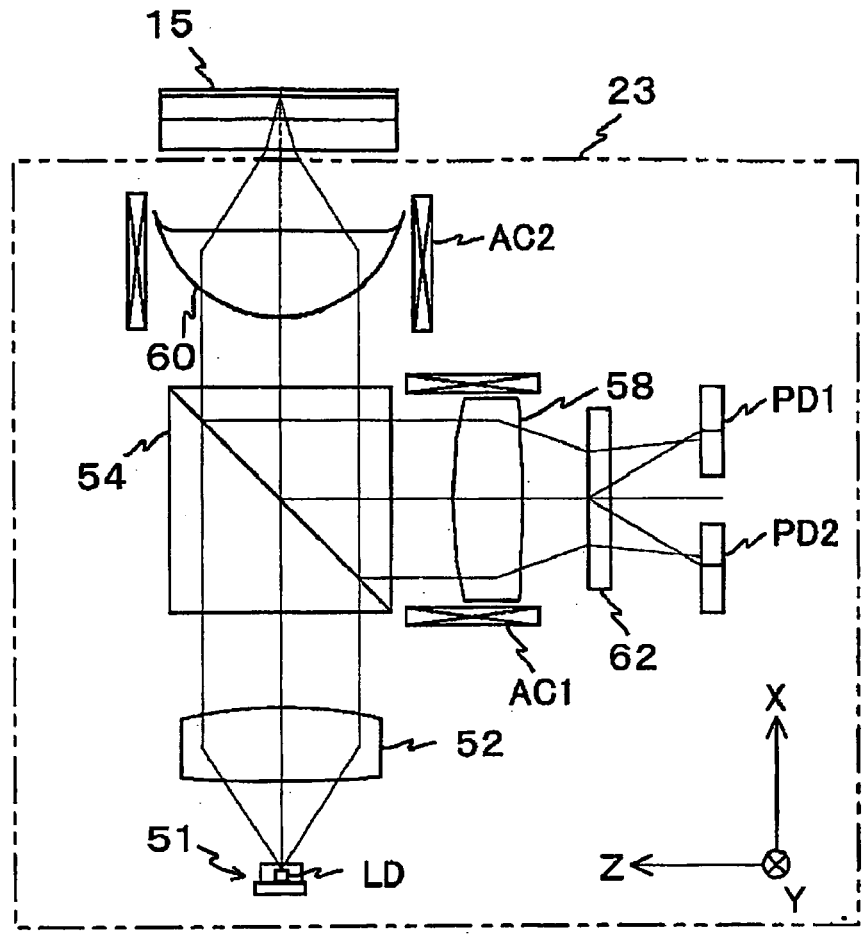
FIG. 31A is a drawing showing an example of the construction of the optical pickup apparatus according to a sixth embodiment of the present invention.

The sixth embodiment is directed to a second variation of the optical pickup apparatus of the fourth embodiment. The sixth embodiment differs from the fourth embodiment in that a hologram 62 is used in place of the light splitting prism 61, as shown in FIG. 31A serving as a non-limiting example.

Figure 31B:
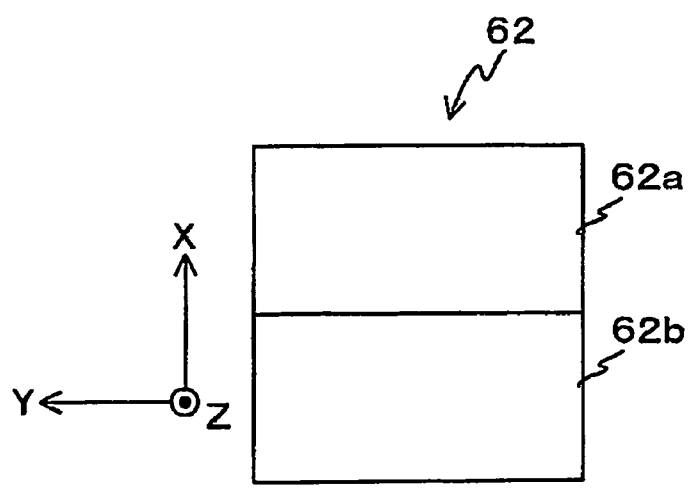
FIG. 31B is a drawing for explaining a hologram shown in FIG. 31A.

As shown in FIG. 31B as a non-limiting example, the hologram 62 is divided into two by a dividing line extending in the Y-axis direction. The divided portion on the +X side of the dividing line is a hologram area 62a (first hologram area), and the divided portion on the −X side of the dividing line is a hologram area 62b (second hologram area). As the condensing light beam arrives from the condenser lens 58, the hologram area 62a diffracts the condensing light beam on the +X side of the optical axis of the condenser lens 58, and the hologram area 62b diffracts the condensing light beam on the −X side of the optical axis of the condenser lens 58.

The light of +1st order diffraction from the hologram area 62a travels as a first detection-purpose light beam (first light beam) towards the photo detecting surface of the photo detector PD1 (first photo detector). The light of −1st order diffraction from the hologram area 62b travels as a second detection-purpose light beam (second light beam) towards the photo detecting surface of the photo detector PD2 (second photo detector). In this manner, the first detection-purpose light beam and the second detection-purpose light beam are light beams of different orders of diffraction.

In the same manner as in the fourth embodiment, the photo detector PD1 is positioned at such a position (first separating photo detecting position) between the light condensing position $F1_1$ and the light condensing position $F2_1$ that the photo detecting area DA receives the second reflected light beam, and the photo detecting area DB receives the first reflected light beam. This makes it possible to detect the first reflected light beam and the second reflected light beam contained in the first detection-purpose light beam separately from each other. Further, in the same manner as in the fourth embodiment, the photo detector PD2 is positioned at such a position (second separating photo detecting position) between the light condensing position $F1_2$ and the light condensing position $F2_2$ that the photo detecting area DC receives the first reflected light beam, and the photo detecting area DD receives the second reflected light beam. This makes it possible to detect the first reflected light beam and the second reflected light beam contained in the second detection-purpose light beam separately from each other.

Figures 32A, 32B, 32C:
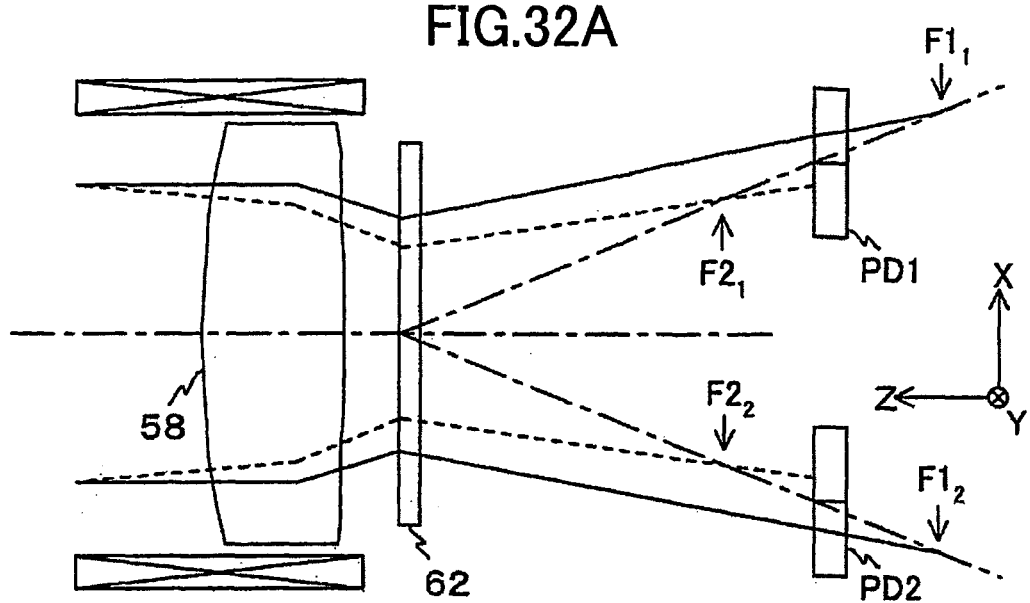
FIGS. 32A through 32C are illustrative drawings for explaining the relationship between the position of a photo detector and the condensing points of signal light and aberrant light, the signal light and aberrant light detected by each photo detecting area, and signals output from the respective photo detecting areas, respectively, when the selected recording layer is the recording layer M0 with respect to the optical pickup apparatus of FIG. 31A.
Figure 33A:
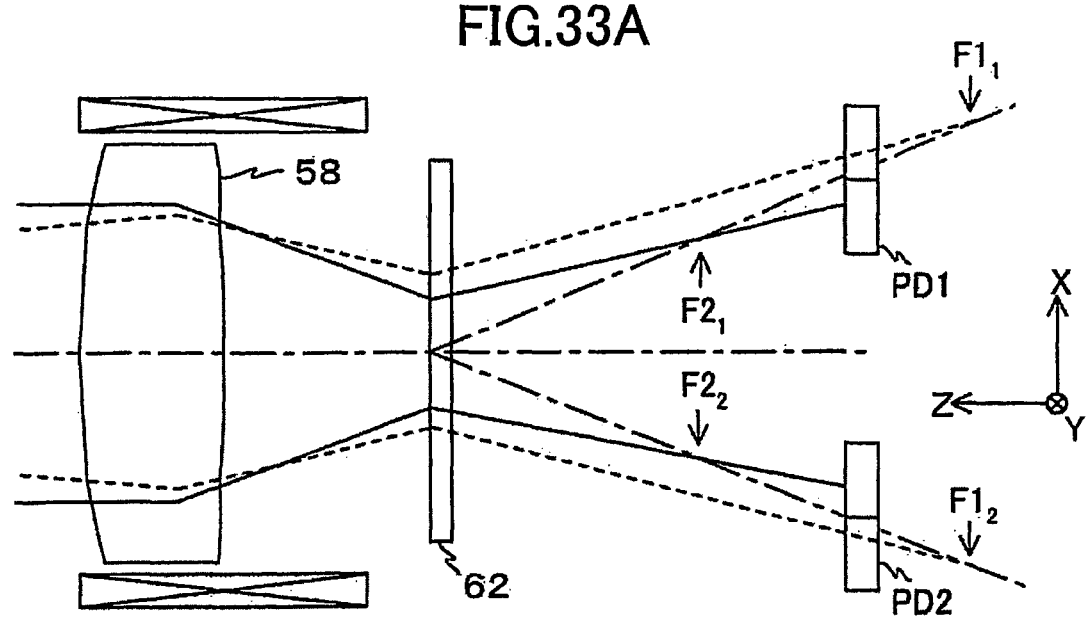
FIGS. 33A through 33C are illustrative drawings for explaining the relationship between the position of a photo detector and the condensing points of signal light and aberrant light, the signal light and aberrant light detected by each photo detecting area, and signals output from the respective photo detecting areas, respectively, when the selected recording layer is the recording layer M1 with respect to the optical pickup apparatus of FIG. 31A.

As shown in FIG. 32A serving as a non-limiting example, the condenser lens 58 is positioned at the first corresponding position such that the photo detector PD1 is positioned at the first separating photo detecting position and the photo detector PD2 is positioned at the second separating photo detecting position when the selected recording layer is the recording layer M0. As shown in FIG. 33A serving as a non-limiting example, the condenser lens 58 is positioned at the second corresponding position such that the photo detector PD1 is positioned at the first separating photo detecting position and the photo detector PD2 is positioned at the second separating photo detecting position when the selected recording layer is the recording layer M1.

When the selected recording layer is the recording layer M0, the photo detecting areas DA and DD receive the signal light components, and the photo detecting areas DB and DC receive the aberrant light components, as shown in FIG. 32B serving as a non-limiting example. Namely, the signals VA and VD are a signal Sd that is almost entirely comprised of the signal light component with almost no aberrant light component, and the signals VB and VC are a signal Sm that is almost entirely comprised of the aberrant light component with almost no signal light component (see FIG. 32C).

Figure 33B:
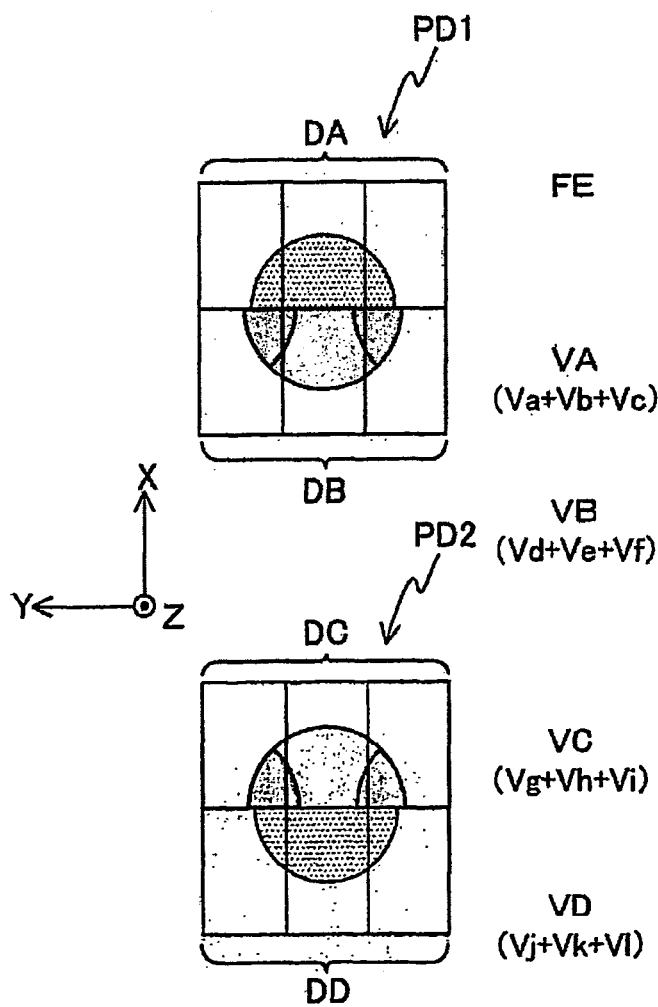
Figure 33C:
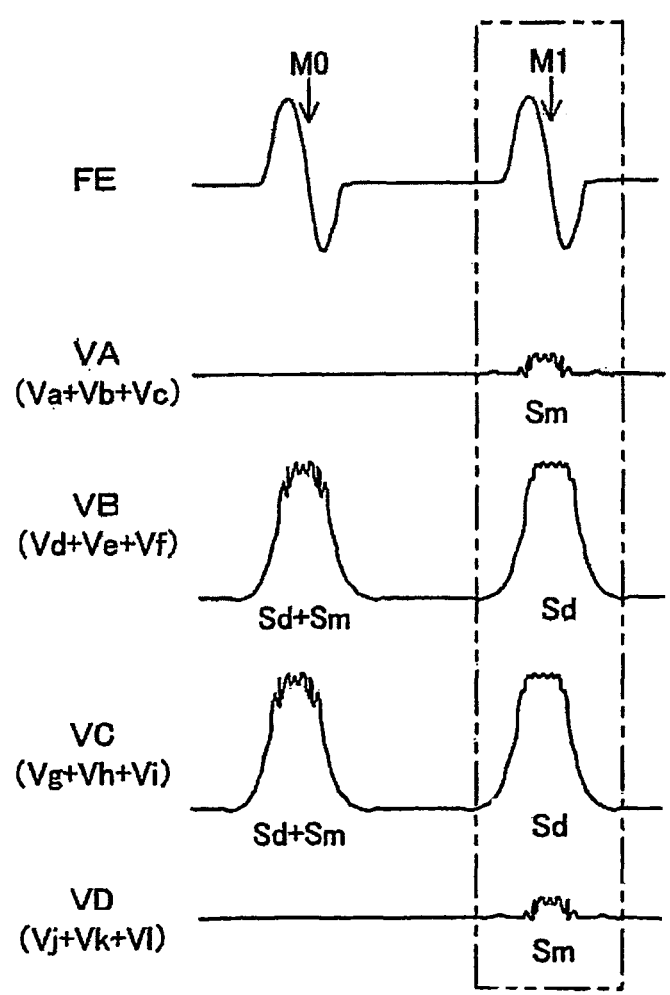

On the other hand, when the selected recording layer is the recording layer M1, the photo detecting areas DB and DC receive the signal light components, and the photo detecting areas DA and DD receive the aberrant light components, as shown in FIG. 33B serving as a non-limiting example. Namely, the signals VB and VC are a signal Sd that is almost entirely comprised of the signal light component with almost no aberrant light component, and the signals VA and VD are a signal Sm that is almost entirely comprised of the aberrant light component with almost no signal light component (see FIG. 33C).

Figure 34:
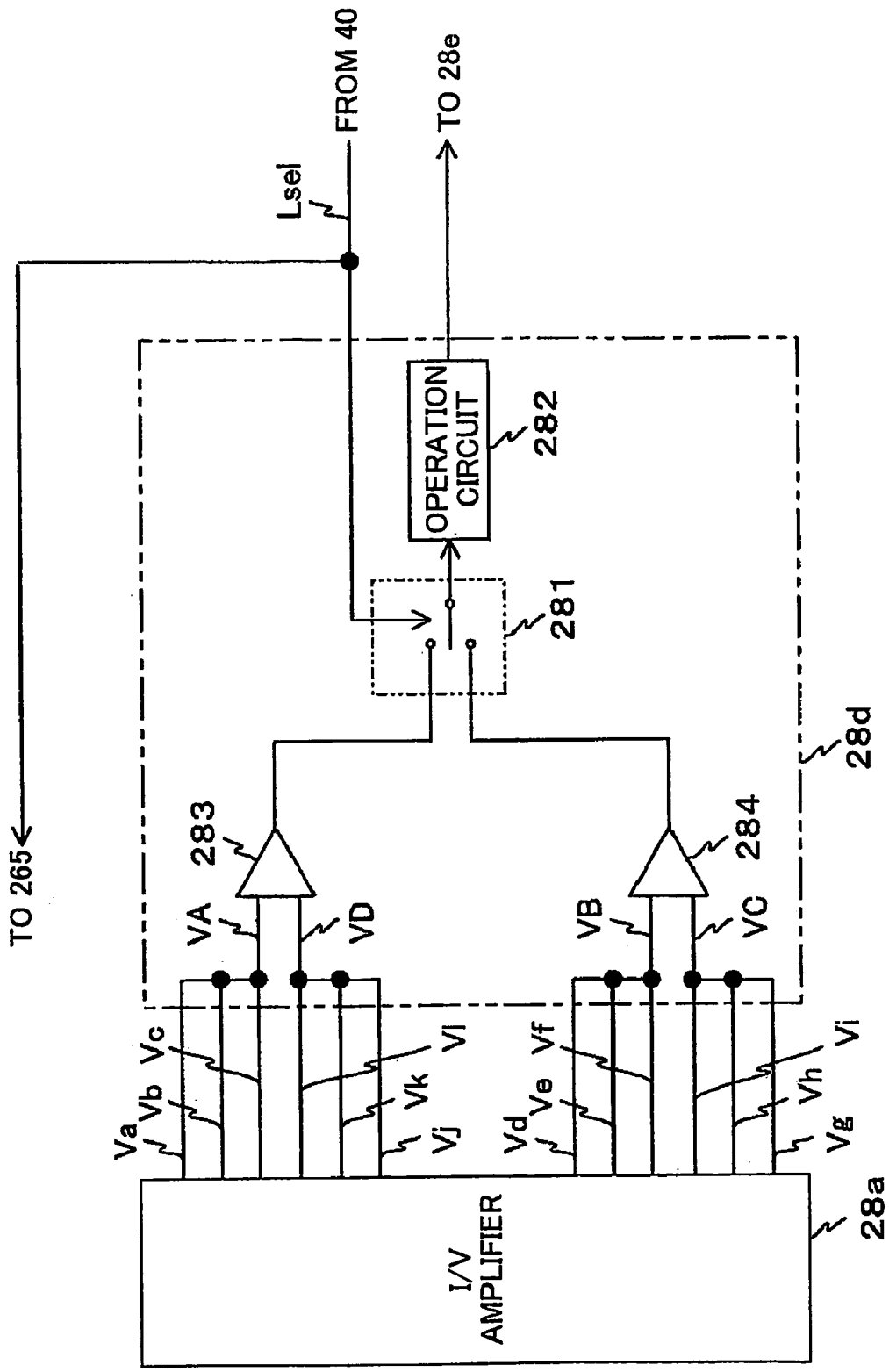
FIG. 34 is a block diagram showing an example of the construction of a RF signal detecting circuit for use with the optical pickup apparatus of FIG. 31A.

FIG. 34 is a drawing showing an example of the construction of the RF signal detecting circuit 28d. As shown in FIG. 34, the RF signal detecting circuit 28d includes the adder 283 for adding up the signal VA and the signal VD from the I/V amplifier 28a, the adder 284 for adding up the signal VB and the signal VC from the I/V amplifier 28a, the changeover switch 281 for selecting either the output signal of the adder 283 or the output signal of the adder 284 in response to the recording layer signal Lsel supplied from the CPU 40, and the operation circuit 282 for obtaining an RF signal based on the output signal of the changeover switch 281. The changeover switch 281 selects the output signal of the adder 283 when the selected recording layer is the recording layer M0, and selects the output signal of the adder 284 when the selected recording layer is the recording layer M1. Namely, the RF signal is detected based on the signal Vrf expressed by the above-noted equation (6) when the selected recording layer is the recording layer M0, and is detected based on the signal Vrf expressed by the above-noted equation (5) when the selected recording layer is the recording layer M1. With this provision, the RF signal is successfully obtained with sufficient precision.

The servo signal detecting circuit 28b detects a track error signal based on the signal Vte expressed by the above-noted equation (8) when the selected recording layer is the recording layer M0, and detects a track error signal based on the signal Vte expressed by the above-noted equation (7) when the selected recording layer is the recording layer M1.

The servo signal detecting circuit 28b detects a focus error signal FE based on the signal Vfe expressed by the above-noted equation (10) when the selected recording layer is the recording layer M0, and detects a focus error signal FE based on the signal Vfe expressed by the above-noted equation (9) when the selected recording layer is the recording layer M1.

Figure 35A:
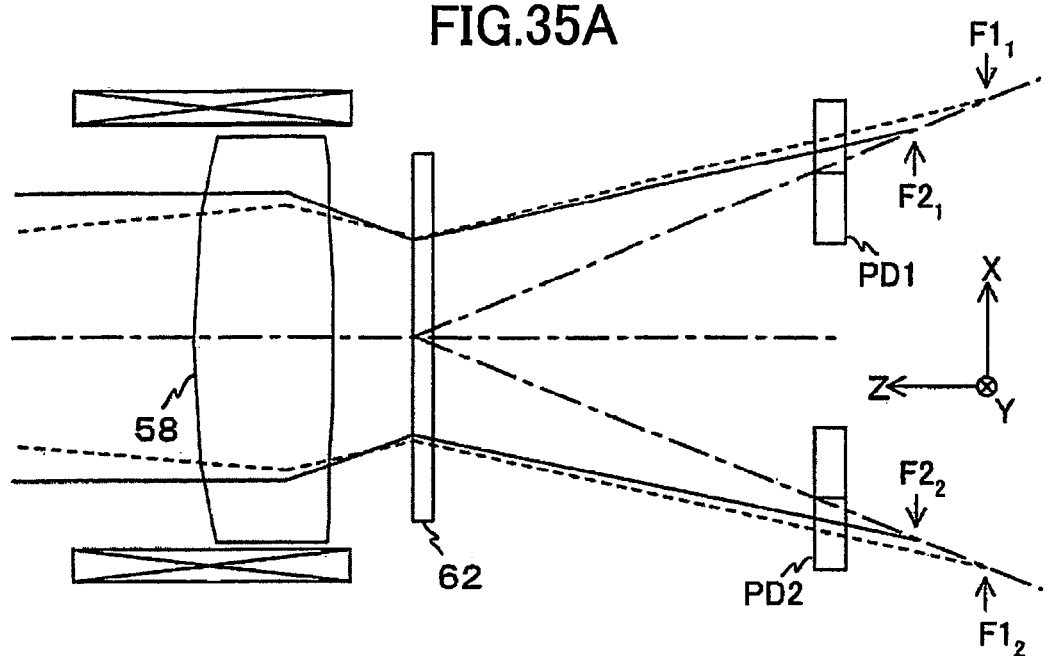
FIGS. 35A through 35C are illustrative drawings for explaining the relationship between the position a photo detector and the condensing points of signal light and aberrant light, the signal light and aberrant light detected by each photo detecting areas, and signals output from the respective photo detecting areas, respectively, when the position of a condenser lens is not controlled in response to a change of the selected recording layer from the recording layer M0 to the recording layer M1 with respect to the optical pickup apparatus of FIG. 31A.
Figure 35B:
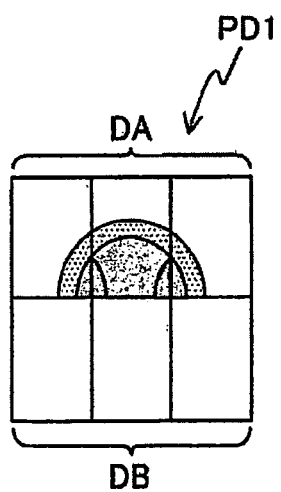
Figure 35C:
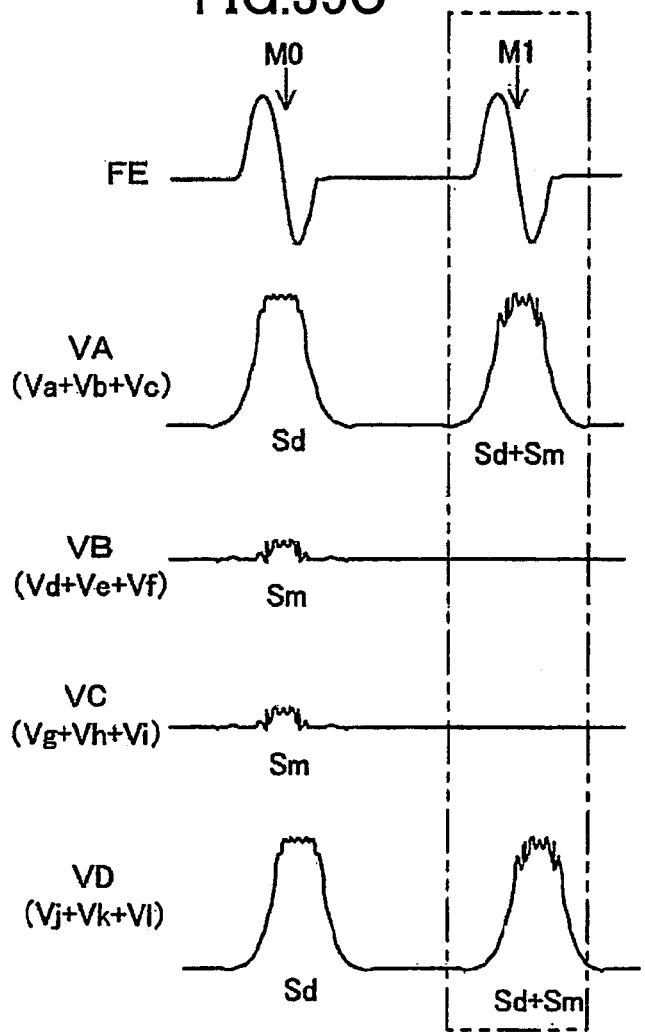

If the position of the condenser lens 58 is not changed when the selected recording layer is changed from the recording layer M0 to the recording layer M1, the light condensing positions $F1_1$ and $F2_1$ end up being positioned behind the photo detector PD1, and the light condensing positions $F1_2$ and $F2_2$ end up being positioned behind the photo detector PD2, as shown in FIG. 35A serving as a non-limiting example. In this case, as shown in FIG. 35B serving as a non-limiting example, the photo detecting areas DA and DD detect the signal light components mixed with the aberrant light components. The aberrant light components and signal light components cannot be separated from each other as shown in FIG. 35C serving as a non-limiting example.

According to the optical pickup apparatus of the sixth embodiment as described above, a returning light beam from the optical disk 15 is turned by the condenser lens 58 into a condensing light beam, which is then divided by the hologram 62 into the first detection-purpose light beam (first light beam) and the second detection-purpose light beam (second light beam). The first detection-purpose light beam includes the light reflected by the recording layer M0 condensing at $F1_1$ and the light reflected by the recording layer M1 condensing at $F2_1$. The second detection-purpose light beam includes the light reflected by the recording layer M0 condensing at $F1_2$ and the light reflected by the recording layer M1 condensing at $F2_2$. The photo detector PD1 (first photo detector) is positioned between $F1_1$ and $F2_1$, such that the photo detecting area DB detects the light reflected by the recording layer M0, and the photo detecting area DA detects the light reflected by the recording layer M1. The photo detector PD2 (second photo detector) is positioned between $F1_2$ and $F2_2$, such that the photo detecting area DC detects the light reflected by the recording layer M0, and the photo detecting area DD detects the light reflected by the recording layer M1. As a result, the light reflected by the recording layer M0 and the light reflected by the recording layer M1 can be separated from each other without mutual interference. This makes it possible to separate the reflected light components from the two recording layers of an optical disk with sufficient precision.

According to the optical disc apparatus of the sixth embodiment, the optical pickup apparatus 23 outputs a signal from the selected one of the two recording layers with sufficient precision, so that information recorded in the selected recording layer can be reproduced with sufficient precision. Namely, the reproduction of information from an optical disk having two recording layers can be achieved with satisfactory precision.

In the sixth embodiment as described above, the photo detector PD1 receives the light of the +1st order diffraction from the hologram area 62a, and the photo detector PD2 receives the light of −1st order diffraction from the hologram area 62b. This embodiment is not limited to this example. The photo detector PD1 may receive −1st order diffraction from the hologram area 62a, and the photo detector PD2 may receive the light of +1st order diffraction from the hologram area 62b.

The sixth embodiment has been described with reference to a case in which the semiconductor laser LD, the hologram 62, and each photo detector are arranged separately from each other. Without being limited to this example, the semiconductor laser LD, the hologram 62, and each photo detector may all be placed in the same housing and provided as a single package.

In the sixth embodiment described above, the servo signal detecting circuit 28b detects the focus error signal FE by extracting lower-frequency components of the signal. VA or the signal VD when the selected recording layer is the recording-layer M0. The servo signal detecting circuit 28b detects the focus error signal FE by extracting lower-frequency components of the signal VB or signal VC when the selected recording layer is the recording layer M1.

Seventh Embodiment

In the following, a description will be given of a seventh embodiment with reference to FIG. 36A through FIG. 39.

Figure 36A:
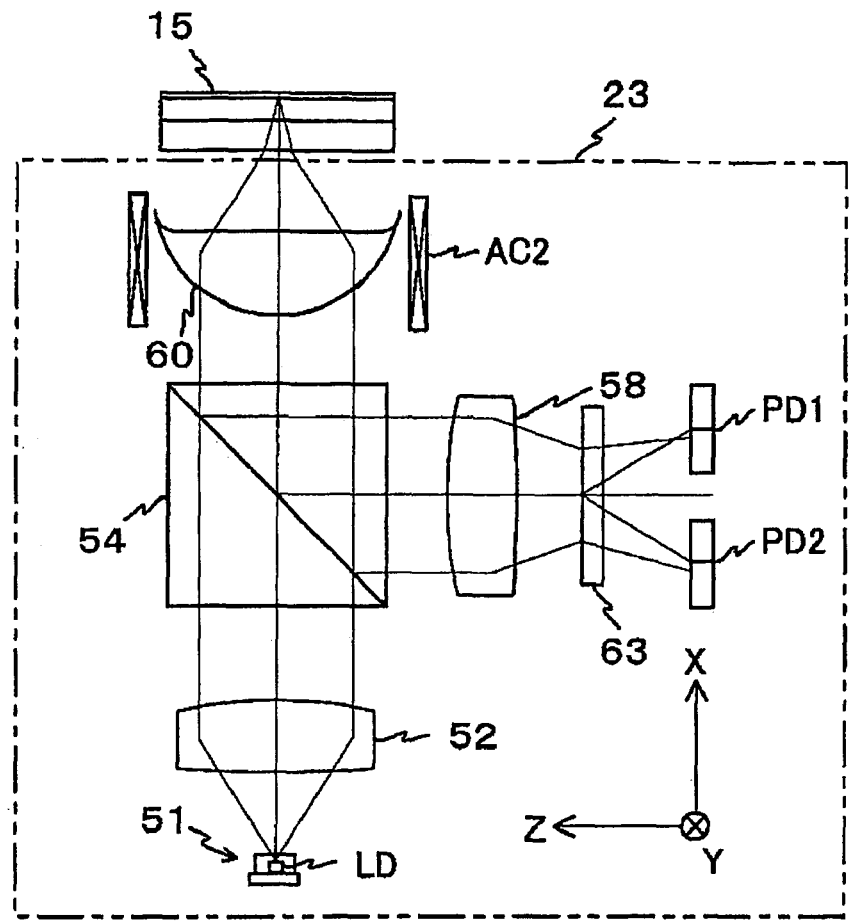
FIG. 36A is a drawing showing an example of the construction of the optical pickup apparatus according to a seventh embodiment of the present invention.

The seventh embodiment is directed to a variation of the optical pickup apparatus of the sixth embodiment. The seventh embodiment uses a hologram 63 having two areas with different lens functions, which replaces the hologram 62, thereby eliminating a need for the condenser lens actuator AC1 as shown in FIG. 36A serving as a non-limiting example.

Figure 36B:
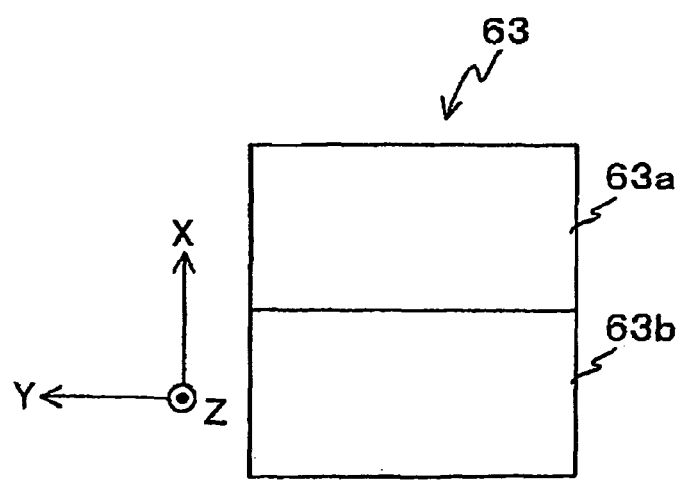
FIG. 36B is a drawing for explaining a hologram shown in FIG. 36A.

As shown in FIG. 36B as a non-limiting example, the hologram 63 is divided into two by a dividing line extending in the Y-axis direction. The divided portion on the +X side of the dividing line is a hologram area 63a (first hologram area), and the divided portion on the −X side of the dividing line is a hologram area 63b (second hologram area). As the condensing light beam arrives from the condenser lens 58, the hologram area 63a diffracts the condensing light beam on the +X side of the optical axis of the condenser lens 58, and the hologram area 63b diffracts the condensing light beam on the −X side of the optical axis of the condenser lens 58

The light of +1st order diffraction from the hologram area 63a travels as a first detection-purpose light beam (first light beam) towards the photo detecting surface of the photo detector PD1 (first photo detector). The light of +1st order diffraction from the hologram area 63b travels as a second detection-purpose light beam (second light beam) towards the photo detecting surface of the photo detector PD2 (second photo detector). In this manner, the first detection-purpose light beam and the second detection-purpose light beam are light beams of the same order of diffraction.

In the same manner as in the fourth embodiment, the photo detector PD1 is positioned at such a position (first separating photo detecting position) between the light condensing position $F1_1$ and the light condensing position $F2_1$ that the photo detecting area DA receives the second reflected light beam, and the photo detecting area DB receives the first reflected light beam. This makes it possible to detect the first reflected light beam and the second reflected light beam contained in the first detection-purpose light beam separately from each other. Further, in the same manner as in the fourth embodiment, the photo detector PD2 is positioned at such a position (second separating photo detecting position) between the light condensing position $F1_2$ and the light condensing position $F2_2$ that the photo detecting area DC receives the first reflected light beam, and the photo detecting area DD receives the second reflected light beam. This makes it possible to detect the first reflected light beam and the second reflected light beam contained in the second detection-purpose light beam separately from each other.

Figure 37A:
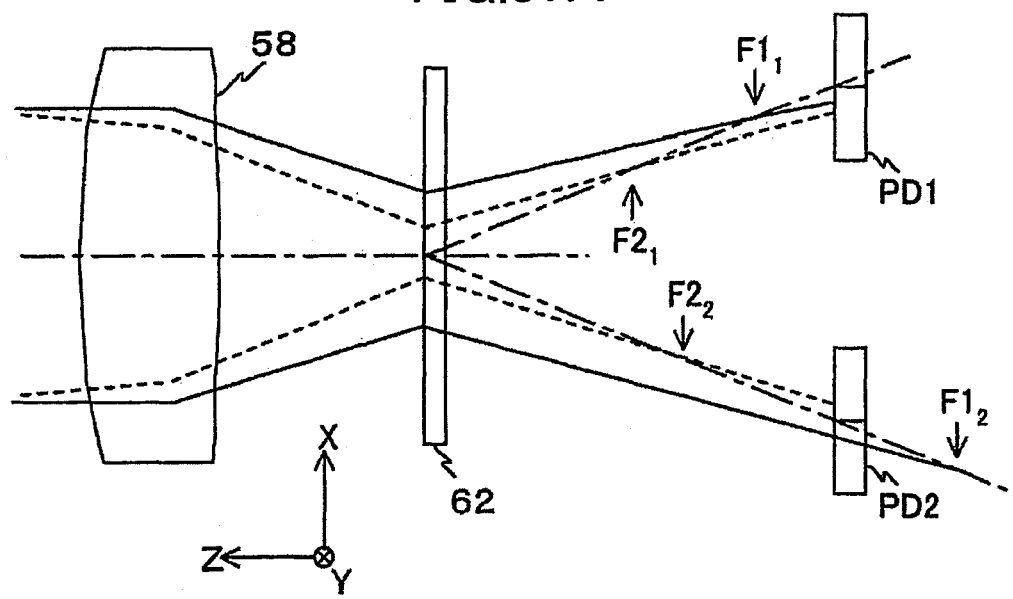
FIGS. 37A through 37C are illustrative drawings for explaining the relationship between the position of a photo detector and the condensing points of signal light and aberrant light, the signal light and aberrant light detected by each photo detecting area, and signals output from the respective photo detecting areas, respectively, when the selected recording layer is the recording layer M0 with respect to the optical pickup apparatus of FIG. 36A.

As shown in FIG. 37A serving as a non-limiting example, when the selected recording layer is the recording layer M0, the lens function of the hologram area 63b is configured such that the photo detector PD2 is situated at such a position between the light condensing position $F1_2$ and the light condensing position $F2_2$ that the photo detecting area DD detects the first reflected light beam, and the photo detecting area DC detects the second reflected light beam.

Figure 38A:
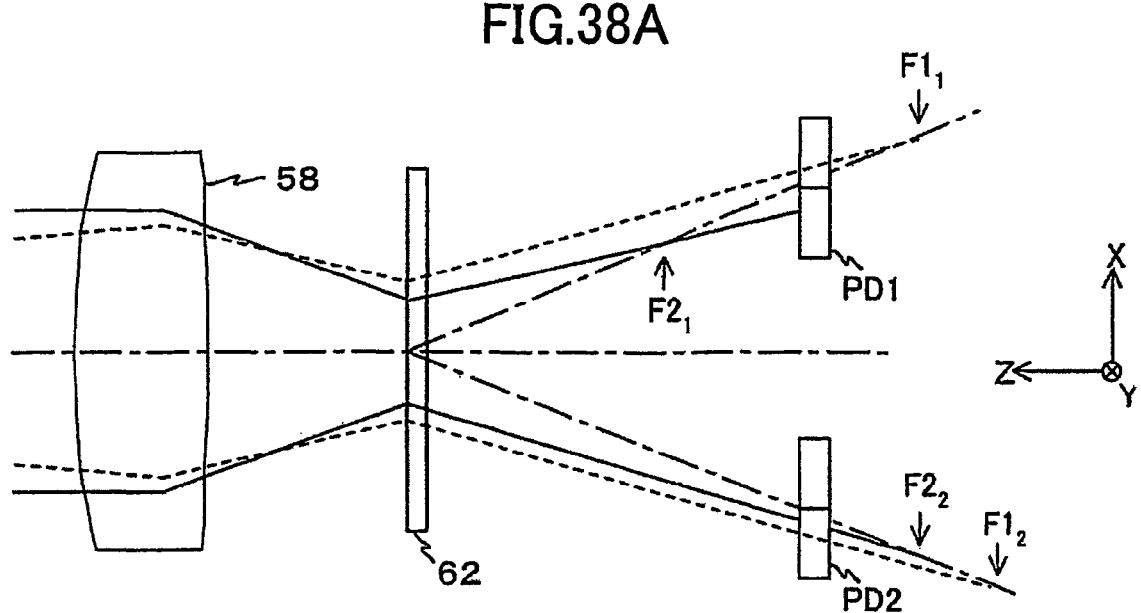
FIGS. 38A through 38C are illustrative drawings for explaining the relationship between the position of a photo detector and the condensing points of signal light and aberrant light, the signal light and aberrant light detected by each photo detecting area, and signals output from the respective photo detecting areas, respectively, when the selected recording layer is the recording layer M1 with respect to the optical pickup apparatus of FIG. 36A.

As shown in FIG. 38A serving as a non-limiting example, when the selected recording layer is the recording layer M1, the lens function of the hologram area 63a is configured such that the photo detector PD1 is situated at such a position between the light condensing position $F1_1$ and the light condensing position $F2_1$ that the photo detecting area DA detects the first reflected light beam, and the photo detecting area DB detects the second reflected light beam. Namely, the hologram area 63a and the hologram area 63b have different lens functions.

Figure 37B:
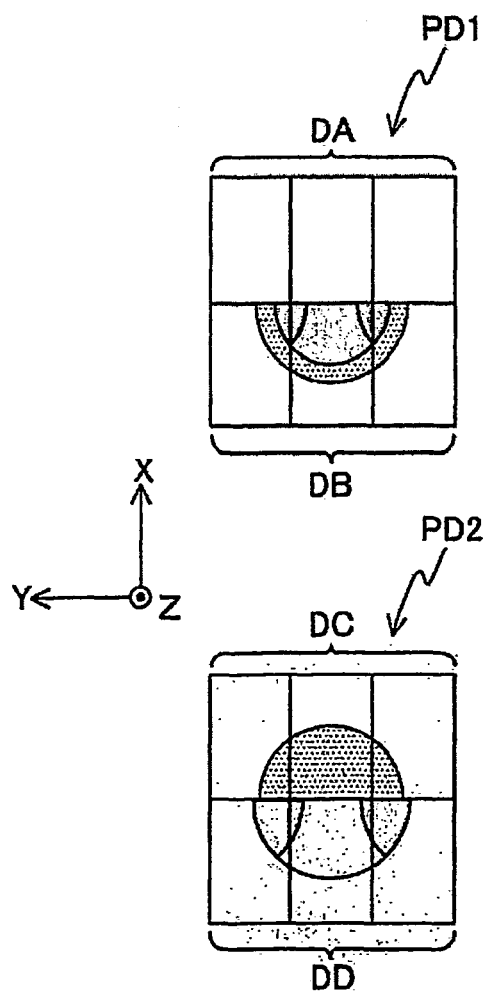
Figure 37C:
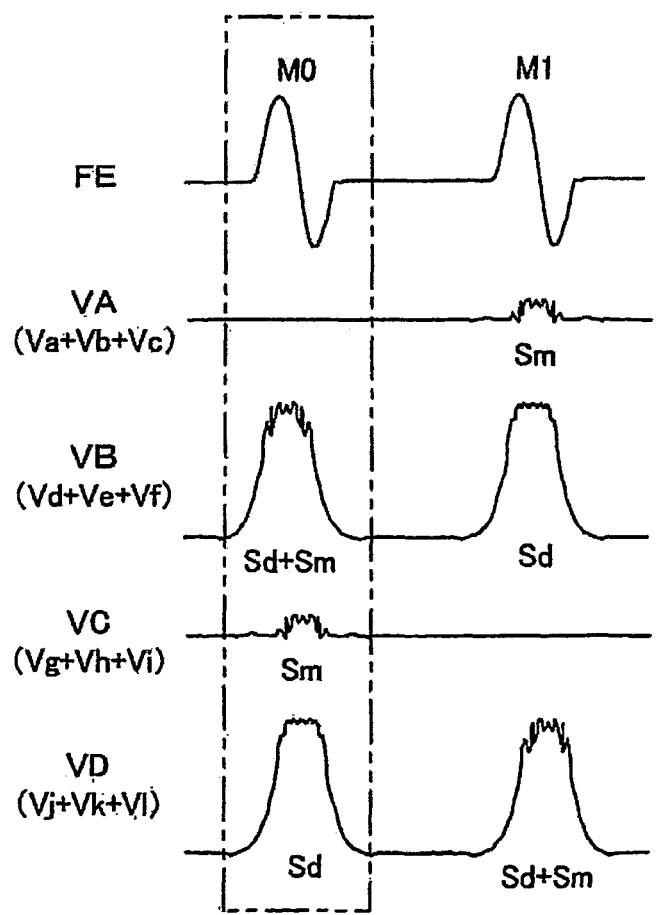

When the selected recording layer is the recording layer M0, the photo detecting area DD detects the signal light component, and the photo detecting area DC detects the aberrant light component, as shown in FIG. 37B serving as a non-limiting example. Namely, the signal VD is a signal Sd that is almost entirely comprised of the signal light component with almost no aberrant light component, and the signal VC is a signal Sm that is almost entirely comprised of the aberrant light component with almost no signal light component (see FIG. 37C). At this time, the photo detector PD1 is positioned behind the light condensing position $F1_1$ and the light condensing position $F2_1$, the photo detecting area DB detects the signal light component mixed with the aberrant light component.

Figure 38B:
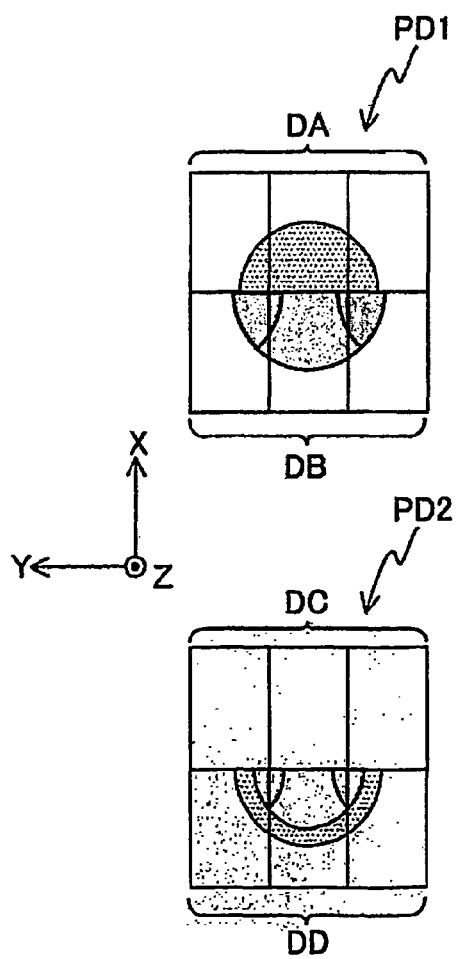
Figure 38C:
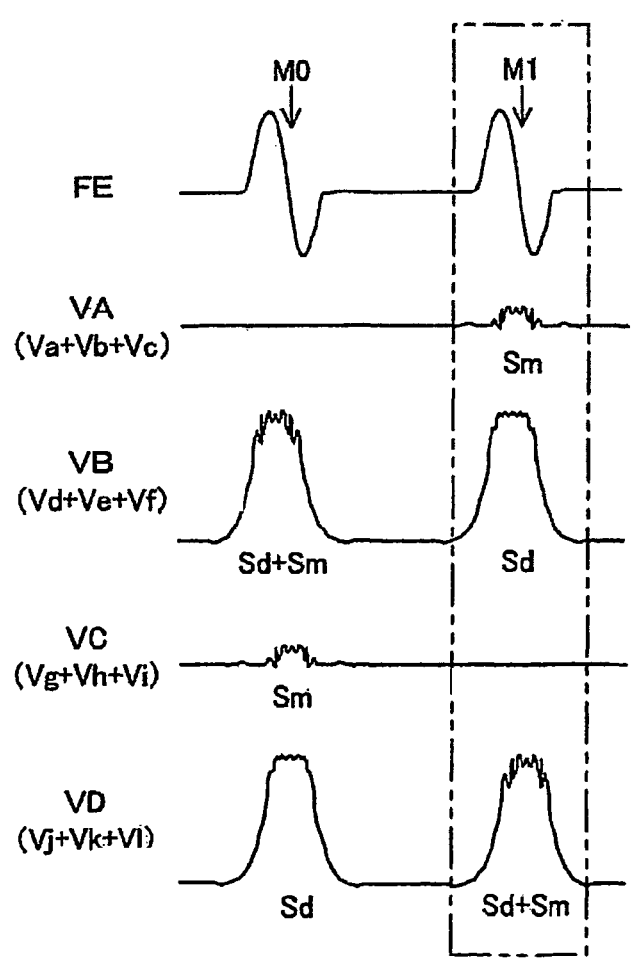

On the other hand, when the selected recording layer is the recording layer M1, the photo detecting area DB receives the signal light component, and the photo detecting area DA receives the aberrant light components, as shown in FIG. 38B serving as a non-limiting example. Namely, the signal VB is a signal Sd that is almost entirely comprised of the signal light component with almost no aberrant light component, and the signal VA is a signal Sm that is almost entirely comprised of the aberrant light component with almost no signal light component (see FIG. 38C). At this time, the photo detector PD2 is positioned ahead the light condensing position $F1_2$ and the light condensing position $F2_2$, the photo detecting area DD detects the signal light component mixed with the aberrant light component.

Figure 39:
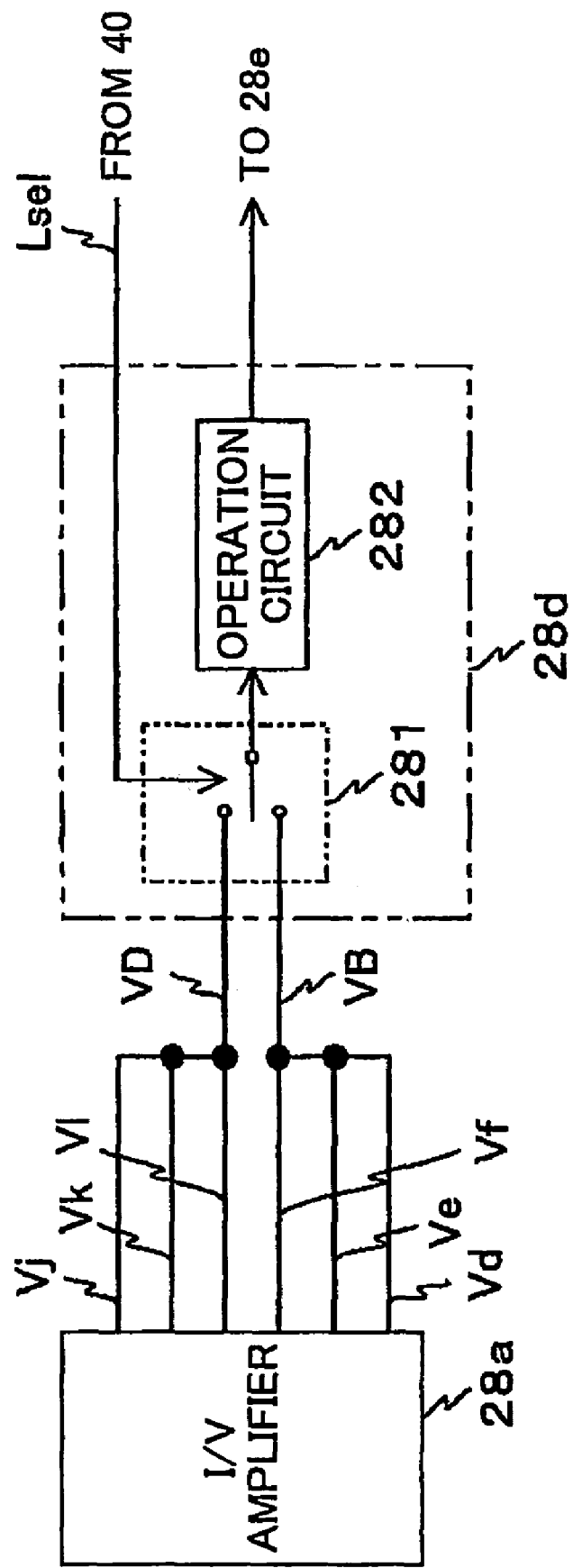
FIG. 39 is a block diagram showing an example of the construction of a RF signal detecting circuit for use with the optical pickup apparatus of FIG. 36A.
Figure 40A:
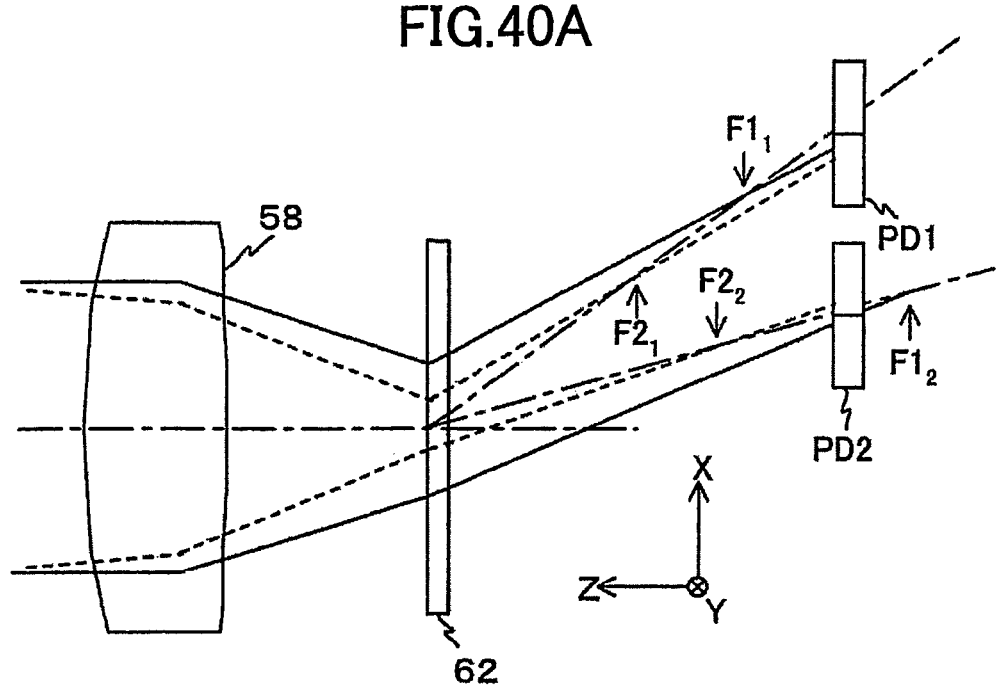
FIGS. 40A and 40B are illustrative drawings for explaining the relationship between the position of a photo detector and the condensing points of signal light and aberrant light, and the signal light and aberrant light detected by each photo detecting area, respectively, when the selected recording layer is the recording layer M0 with respect to a variation of the optical pickup apparatus of FIG. 36A.
Figure 40B:
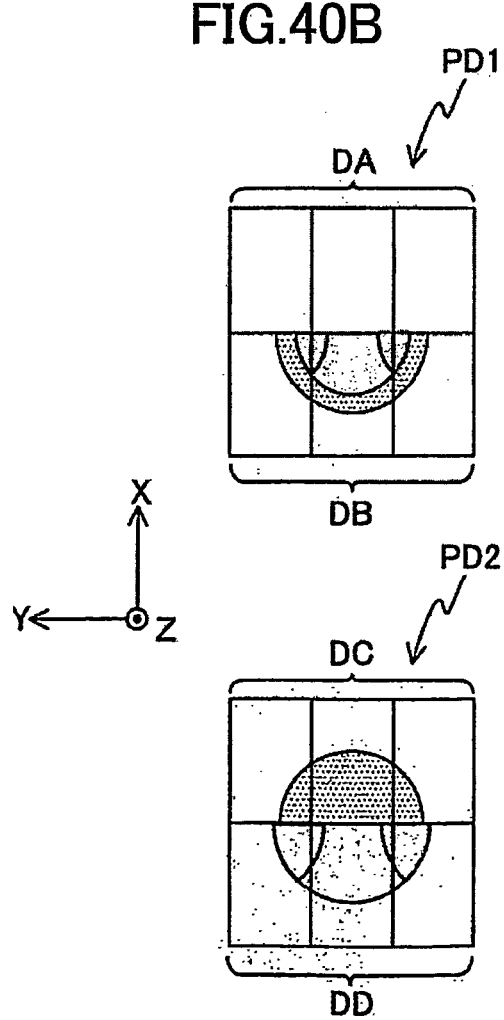
Figure 41A:
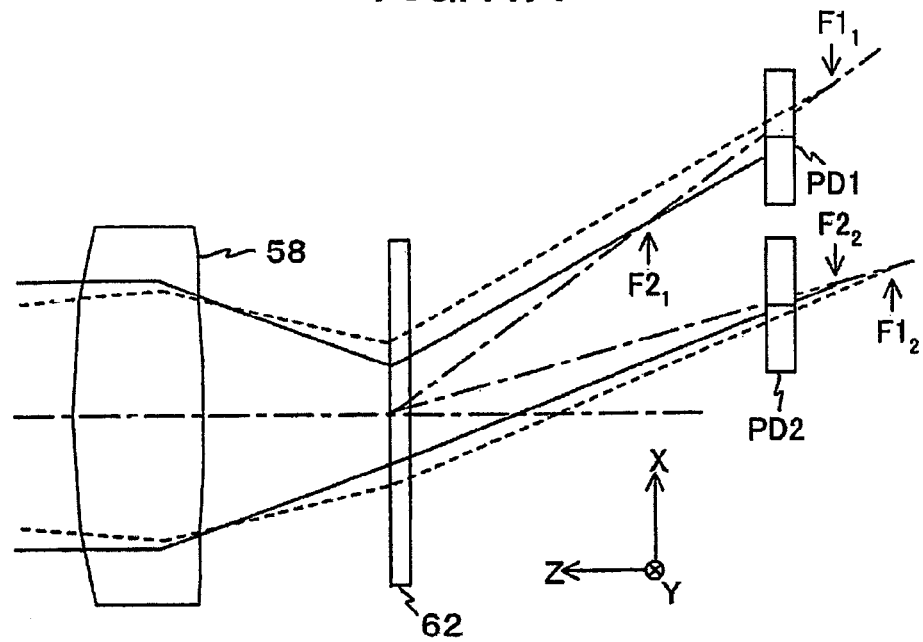
FIGS. 41A and 41B are illustrative drawings for explaining the relationship between the position of a photo detector and the condensing points of signal light and aberrant light, and the signal light and aberrant light detected by each photo detecting area, respectively, when the selected recording layer is the recording layer M1 with respect to the variation of the optical pickup apparatus of FIG. 36A.
Figure 41B:
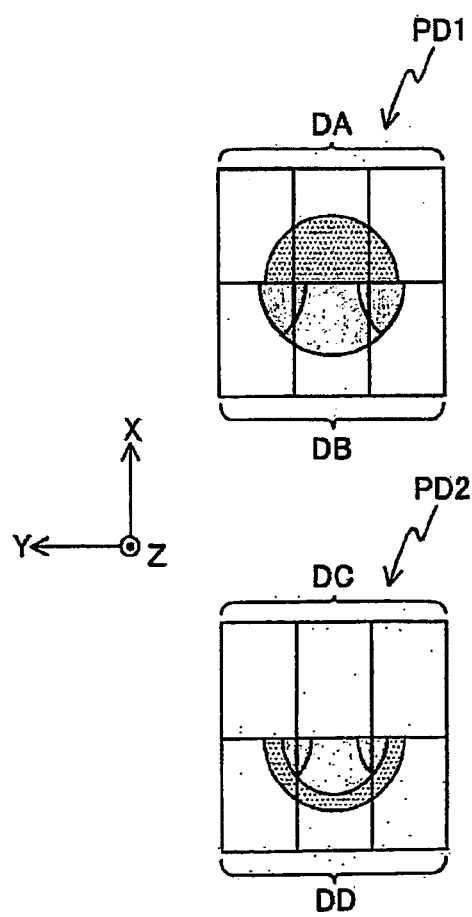

FIG. 39 is a drawing showing an example of the construction of the RF signal detecting circuit 28d. As shown in FIG. 39, the RF signal detecting circuit 28d includes the changeover switch 281 for selecting either the signal VD or the signal VB from the I/V amplifier 28a in response to the recording layer signal Lsel supplied from the CPU 40, and also includes the operation circuit 282 for obtaining an RF signal based on the output signal of the changeover switch 281. The changeover switch 281 selects the signal VD when the selected recording layer is the recording layer M0, and selects the signal VB when the selected recording layer is the recording layer M1. With this provision, the RF signal is successfully obtained with sufficient precision.

The servo signal detecting circuit 28b detects a track error signal based on a differential between the signal Vj and signal V1 from the I/V amplifier 28a when the selected recording layer is the recording layer M0, and detects a track error signal based on a differential between the signal Vd and signal Vf from the I/V amplifier 28a when the selected recording layer is the recording layer M1.

The servo signal detecting circuit 28b detects a focus error signal FE by extracting lower-frequency components of the signal VD when the selected recording layer is the recording layer M0. The servo signal detecting circuit 28b detects the focus error signal FE by extracting lower-frequency components of the signal VB when the selected recording layer is the recording layer M1.

In the optical pickup apparatus of the seventh embodiment as described above, the photo detector PD2 (second photo detector) is positioned between the light condensing position $F1_2$ and light condensing position $F2_2$ when the selected recording layer is the recording layer M0 such that the photo detecting area DC detects the reflected light from the recording layer M1, and the photo detecting area DD detects the reflected light from the recording layer M0. Further, the photo detector PD1 (first photo detector) is positioned between the light condensing position $F1_1$ and light condensing position $F2_1$ when the selected recording layer is the recording layer M1 such that the photo detecting area DA detects the reflected light from the recording layer M0, and the photo detecting area DB detects the reflected light from the recording layer M1. This achieves substantially the same results as the optical pickup apparatus of the sixth embodiment.

According to the optical disc apparatus of the seventh embodiment, the optical pickup apparatus 23 outputs a signal from the selected one of the two recording layers with sufficient precision, so that substantially the same results as in the optical pickup apparatus of the sixth embodiment are achieved.

In the seventh embodiment, the RF signal is detected by using the signal VD and signal VB supplied from the I/V amplifier 28a. Alternatively, the signals VA, VB, VC, and VD from the I/V amplifier 28a may be used to detect the RF signal as was described in connection with the fifth embodiment (see FIG. 30). In this case, the RF signal detecting circuit 28d is used as a signal obtaining unit.

The seventh embodiment has been described with reference to a case in which the direction of diffraction of the hologram area 63a and the direction of diffraction of the hologram area 63b are opposite to each other in the X-axis direction. Without being limited to this example, the direction of diffraction of the hologram area 63a and the direction of diffraction of the hologram area 63b may be the same in the X-axis direction as shown in FIG. 40A through FIG. 41B, for example.

Further, the seventh embodiment has been described with reference to a case in which the semiconductor laser LD, the hologram 63, and each photo detector are arranged separately from each other. Without being limited to this example, the semiconductor laser LD, the hologram 63, and each photo detector may all be placed in the same housing and provided as a single package.

The above embodiments have been described with reference to a case in which the optical disk 15 is designed for light having a wavelength of about 660 nm. The present invention is not limited to this example, and may be used with light having a wavelength of about 780 nm or light having a wavelength of about 405 nm. In such a case, the light source unit 51 emits light having substantially the same wavelength as the light suitable for the optical disk 15.

The above embodiments have been described with reference to a case in which the optical disk 15 is recordable. The present invention is not limited to this example, and may be applied to a reproduction-only apparatus.

The above embodiments have been described with reference to a case in which the optical disc apparatus 20 has an information recording function and an information reproducing function. This is not a limiting example, and it suffices to have at least a reproduction function among the functions for recording, reproducing, and erasing of information.

The above embodiments have been described with reference to a case in which the optical pickup apparatus has a single semiconductor laser. This is not a limiting example, and a plurality of semiconductor lasers for emitting light of respective, different wavelengths may be provided. In this case, the wavelength of a semiconductor laser for emitting light with a wavelength of about 405 nm may include at least one of a semiconductor laser for emitting light with a wavelength of about 660 nm and a semiconductor laser for emitting light with a wavelength of about 780 nm. Namely, the optical disc apparatus may be designed to conform to a plurality of different types of optical disks that comply with respective, different standards. In this case, at least one of the plurality of types of optical disks may be a multi-layered disk.

Further, the present invention is not limited to these embodiments, but various variations and modifications may be made without departing from the scope of the present invention.

The present application is based on Japanese priority application No. 2004-037814 filed on Feb. 16, 2004, with the Japanese Patent Office, the entire contents of which are hereby incorporated by reference.

The invention claimed is:

1. An optical pickup apparatus for shining light on an optical disk having two recording layers and for detecting reflected light from the optical disk, comprising:
   a light source configured to shine the light on the optical disk;
   an optical system situated on a path of a light beam returning from the optical disk inclusive of light reflected by a first recording layer of the optical disk and light reflected by a second recording layer of the optical disk, said optical system including:
   a light condensing optical unit to turn the returning light beam into a condensing light beam; and
   a light beam regulating unit to extract from the condensing light beam a partial-cross-section light beam corresponding to only a part of a cross section of the condensing light beam; and
   one or more photo detectors, situated between a first position where the light reflected by the first recording layer contained in the partial-cross-section light beam is condensed and a second position where the light reflected by the second recording layer contained in the partial-cross-section light beam is condensed, said one or more photo detectors having a first photo detecting section to detect the light reflected by the first recording layer and a second photo detecting section to detect the light reflected by the second recording layer, and the first and second positions being spaced apart from each other along an optical axis of the light condensing optical unit, wherein substantially no light reflected by the first recording layer reaches the second photo detecting section, and substantially no light reflected by the second recording layer reaches the first photo detecting section that is in contact with and adjoins the second photo detecting section, the light shone by the light source on the optical disk being focused selectively on one of the first recording layer and the second recording layer.

2. The optical pickup apparatus as claimed in claim 1, wherein said light beam regulating unit is a light splitting unit configured to split the condensing light beam into a plurality of light beams, said partial-cross-section light beam corresponding to at least one of the plurality of light beams.

3. The optical pickup apparatus as claimed in claim 2, wherein the plurality of light beams includes a first light beam and a second light beam, and said one or more photo detectors includes:
- a first photo detector having a photo detecting section to detect the light reflected by the first recording layer contained in the first light beam and a photo detection section to detect the light reflected by the second recording layer contained in the first light beam; and
- a second photo detector having a photo detecting section to detect the light reflected by the first recording layer contained in the second light beam and a photo detection section to detect the light reflected by the second recording layer contained in the second light beam.

4. The optical pickup apparatus as claimed in claim 2, wherein said light splitting unit is a light splitting prism.

5. The optical pickup apparatus as claimed in claim 2, wherein said light splitting unit is a hologram having a first hologram area and a second hologram area, the first light beam being diffraction created by the first hologram area, and the second light beam being diffraction created by the second hologram area.

6. The optical pickup apparatus as claimed in claim 5, wherein the first light beam and the second light beam are diffractions of different orders.

7. The optical pickup apparatus as claimed in claim 5, wherein the first hologram area and the second hologram area have respective, different lens functions.

8. The optical pickup apparatus as claimed in claim 7, wherein the first light beam and the second light beam are diffractions of an identical order.

9. The optical pickup apparatus as claimed in claim 1, further comprising a drive unit configured to drive said light condensing unit in a direction of an optical axis of said light condensing unit.

10. An optical disc apparatus for reproducing information from an optical disk having two recording layers, comprising:
- said optical pickup apparatus of claim 9;
- a drive control unit configured to control said drive unit in response to a signal indicative of which one of the two recording layers is selected for reproduction;
- a signal selecting unit configured to select an output signal inclusive of only a signal from the selected one of the two recording layers among output signals of said optical pickup apparatus; and
- a reproducing unit configured to reproduce the information based on the signal obtained by said signal selecting unit.

11. The optical pickup apparatus as claimed in claim 1, further comprising a drive unit configured to drive said one or more photo detectors in a direction of an optical axis in respect of a photo detecting surface of said one or more photo detectors.

12. An optical disc apparatus for reproducing information from an optical disk having two recording layers, comprising:
- said optical pickup apparatus of claim 11;
- a drive control unit configured to control said drive unit in response to a signal indicative of which one of the two recording layers is selected for reproduction;
- a signal selecting unit configured to select an output signal inclusive of only a signal from the selected one of the two recording layers among output signals of said optical pickup apparatus; and
- a reproducing unit configured to reproduce the information based on the signal selected by said signal selecting unit.

13. The optical pickup apparatus as claimed in claim 1, further comprising an opto-electrical device having a refractive index changing in response to an applied voltage, said opto-electrical device situated on a path of the condensing light beam traveling from said light condensing unit.

14. An optical disk apparatus for reproducing information from an optical disk having two recording layers, comprising:
- said optical pickup apparatus of claim 13;
- a switching unit configured to control the refractive index of said opto-electrical device in response to a signal indicative of which one of the two recording layers is selected for reproduction;
- a signal selecting unit configured to select an output signal inclusive of only a signal from the selected one of the two recording layers among output signals of said optical pickup apparatus; and
- a reproducing unit configured to reproduce the information based on the signal selected by said signal selecting unit.

15. An optical disc apparatus for reproducing information from an optical disk having two recording layers, comprising:
- said optical pickup apparatus of claim 1;
- a signal obtaining unit configured to obtain a signal from a selected one of the two recording layers of the optical disk in response to an output signal of said optical pickup apparatus; and
- a reproducing unit configured to reproduce the information based on the signal obtained by said signal obtaining unit.

16. The optical disc apparatus as claimed in claim 15, wherein said signal obtaining unit is configured to select an output signal inclusive of only the signal from the selected one of the two recording layers among output signals of said optical pickup apparatus.

17. The optical disc apparatus as claimed in claim 15, wherein said signal obtaining unit is configured to subtract a signal component corresponding to another one of the two recording layers from the output signal of the optical pickup apparatus.

18. An optical pickup apparatus for shining light on an optical disk having two recording layers and for detecting reflected light from the optical disk, comprising:
- a light source configured to shine the light on the optical disk;
- an optical system situated on a path of a light beam returning from the optical disk inclusive of light reflected by a first recording layer of the optical disk and light reflected by a second recording layer of the optical disk, said optical system including:
- a light condensing optical unit to turn the returning light beam into a condensing light beam; and
- a light beam regulating unit to extract from the condensing light beam a partial-cross-section light beam corresponding to only a part of a cross section of the condensing light beam not exceeding half of the cross section as divided by a straight line passing through a center of the cross section; and one or more photo detectors, situated between a first position where the light reflected by the first recording layer contained in the partial-cross-section light beam is condensed and a second position where the light reflected by the second recording layer contained in the partial-cross-section light beam is condensed, said one or more photo detectors having a first photo detecting section to detect the light reflected by the first recording layer and a second photo detecting section to detect the light reflected by the second recording layer, and the first and second positions being spaced apart from each other along an optical axis of the light condensing optical unit, wherein substantially no light reflected by the first recording layer reaches the second photo detecting section, and substantially no light reflected by the second recording layer reaches the first photo detecting section that is in contact with and adjoins the second photo detecting section, the light shone by the light source on the optical disk being focused on one of the first recording layer and the second recording layer.

* * * * *